US011143847B1

(12) United States Patent
Mercado

(10) Patent No.: US 11,143,847 B1
(45) Date of Patent: Oct. 12, 2021

(54) OPTICAL SYSTEM

(71) Applicant: Apple Inc., Cupertino, CA (US)

(72) Inventor: Romeo I. Mercado, Fremont, CA (US)

(73) Assignee: Apple Inc., Cupertino, CA (US)

(*) Notice: Subject to any disclaimer, the term of this patent is extended or adjusted under 35 U.S.C. 154(b) by 218 days.

(21) Appl. No.: 16/143,364

(22) Filed: Sep. 26, 2018

Related U.S. Application Data

(60) Provisional application No. 62/564,948, filed on Sep. 28, 2017.

(51) Int. Cl.
| | |
|---|---|
| *G02B 27/10* | (2006.01) |
| *G02B 13/14* | (2006.01) |
| *G02B 27/12* | (2006.01) |
| *G02B 5/20* | (2006.01) |
| *G02B 9/34* | (2006.01) |

(52) U.S. Cl.
CPC ............. *G02B 13/14* (2013.01); *G02B 5/208* (2013.01); *G02B 9/34* (2013.01); *G02B 27/12* (2013.01)

(58) Field of Classification Search
CPC .... G02B 23/00; G02B 23/04; G02B 23/2407; G02B 27/00; G02B 27/10; G02B 27/1006; G02B 27/1013; G02B 27/106; G02B 27/12; G02B 27/126; G02B 27/14; G02B 27/141; G02B 5/208; G02B 13/14; G02B 9/34
USPC .......................... 359/350–361, 618, 629, 634
See application file for complete search history.

(56) References Cited

U.S. PATENT DOCUMENTS

| | | | | |
|---|---|---|---|---|
| 6,781,127 B1* | 8/2004 | Wolff | ..................... | G01J 3/2803 250/332 |
| 6,999,231 B2* | 2/2006 | Bryant | ................. | G02B 13/146 359/353 |
| 7,054,069 B1* | 5/2006 | Gupta | .................. | G02B 27/102 359/649 |
| 7,248,401 B2* | 7/2007 | Bryant | ................... | G02B 13/14 359/351 |
| 8,026,971 B2 | 9/2011 | Mitsumine et al. | | |
| 8,755,123 B2 | 6/2014 | Heimer | | |
| 8,824,055 B2* | 9/2014 | Cook | ..................... | G02B 13/04 359/634 |
| 9,188,662 B2 | 11/2015 | You et al. | | |
| 9,900,579 B2 | 2/2018 | Takagi | | |
| 9,918,024 B2 | 3/2018 | Ko et al. | | |
| 2011/0051229 A1* | 3/2011 | Alexay | ............... | G02B 13/146 359/356 |
| 2011/0079713 A1* | 4/2011 | Kim | ......................... | G01J 3/36 250/330 |

(Continued)

*Primary Examiner* — Thong Q Nguyen
(74) *Attorney, Agent, or Firm* — Robert C. Kowert; Kowert, Hood, Munyon, Rankin & Goetzel, P.C.

(57) ABSTRACT

A compact, small form factor optical system for cameras that provides multiple optical paths to capture images of an object field in different portions of the light spectrum. The optical system includes a front lens group that captures visible and near-infrared (NIR) light from an object field and refracts the light to a beam splitter that splits the visible light and the NIR light onto two paths. On the visible light path, a visible light lens group refracts the visible light to form an image of the object field at a visible light sensor. On the NIR light path, a NIR light lens group refracts the NIR light to form an image of the object field at an NIR light sensor. The optical system thus provides images of the object field at two sensor planes, one image in the visible spectrum and the other image in the NIR spectrum.

25 Claims, 53 Drawing Sheets

(56) References Cited

U.S. PATENT DOCUMENTS

2011/0200319 A1\* 8/2011 Kravitz .................. G03B 17/02
                                                    396/333
2016/0232828 A1  8/2016 Jia et al.
2016/0291332 A1\* 10/2016 Moore ................... G02B 13/04

\* cited by examiner

F/2.0 Visible path
4.4 mm diagonal image

F/1.8 NIR path
3.6 mm diagonal image

Plots of LSA, AST, and DST

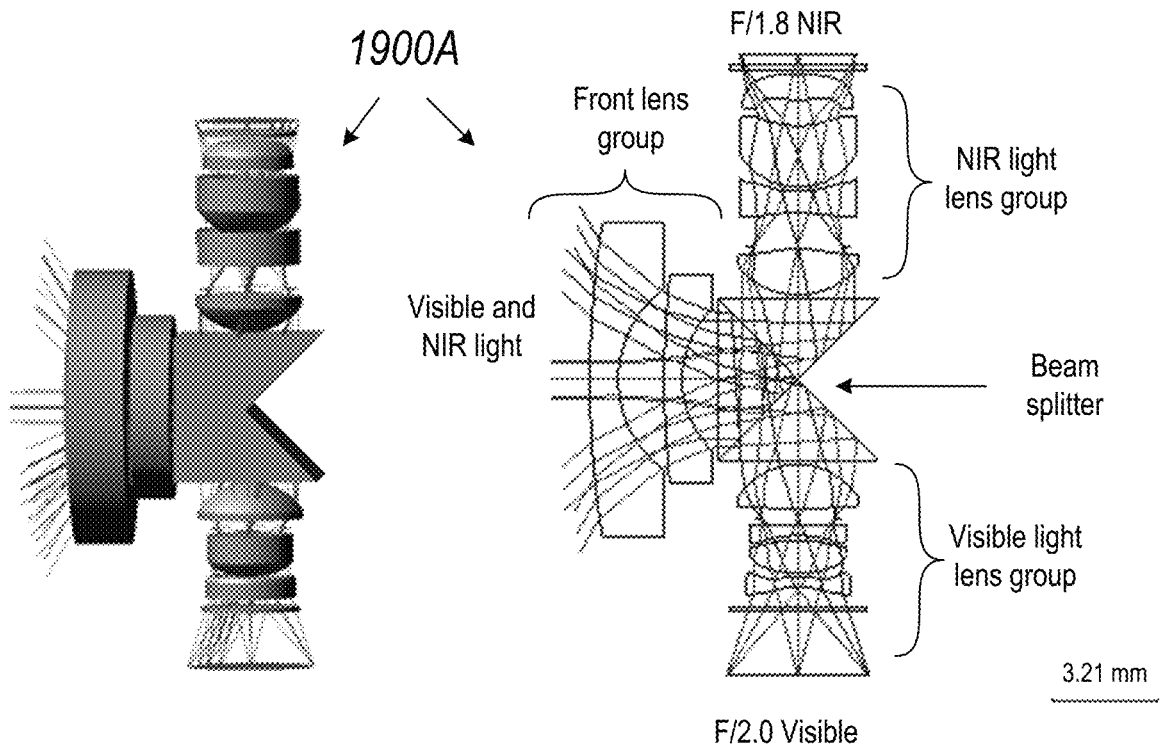
FIG. 19A
FIG. 19B
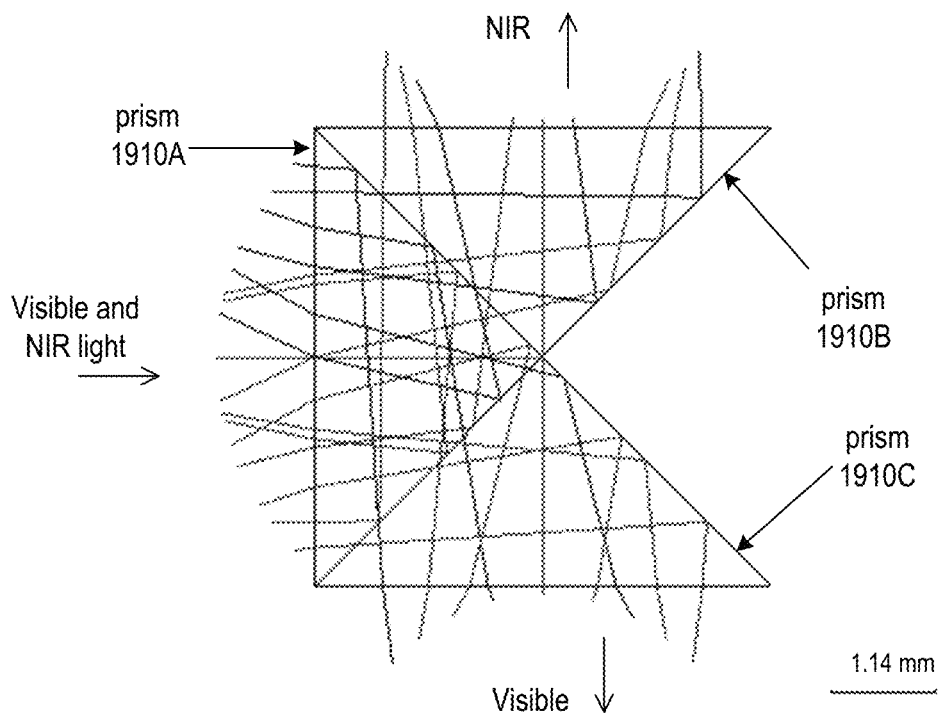
FIG. 19C

F/2.0_Visible imaging system

F/1.8_NIR imaging system

2000A

F/2.0 Visible imaging system

F/1.8 NIR imaging system

*2100A*

2100B

F/2.0 Visible imaging system

F/1.8 NIR imaging system

F/2.0 Visible imaging system

F/1.8 NIR imaging system

F/2.0 Visible imaging system

F/1.8 NIR imaging system

Visible imaging system

NIR imaging system

Visible imaging system

NIR imaging system

Visible imaging system

NIR imaging system

Visible imaging system

NIR imaging system

Visible imaging system

NIR imaging system

OPTICAL SYSTEM

PRIORITY INFORMATION

This application claims benefit of priority of U.S. Provisional Application Ser. No. 62/564,948 entitled "OPTICAL SYSTEM" filed Sep. 28, 2017, the content of which is incorporated by reference herein in its entirety.

BACKGROUND

The advent of small, mobile multipurpose devices such as smartphones and tablet or pad devices has resulted in a need for high-resolution, small form factor cameras for integration in the devices. Achieving higher resolution with small package size cameras generally requires use of a photosensor with small pixel size and a good, compact imaging lens system. Advances in technology have achieved reduction of the pixel size in photosensors. However, as photosensors become more compact and powerful, demand for compact imaging lens system with improved imaging quality performance has increased.

SUMMARY

Embodiments of a compact, small form factor optical system for cameras that provides multiple optical paths to capture images of an object field in different portions of the light spectrum. The optical system includes a front lens group that captures visible and near-infrared (NIR) light from an object field and refracts the light to an element that splits the visible light and the NIR light onto two paths, referred to herein as a beam splitter. On the visible light path, a visible light lens group refracts the visible light to form an image of the object field at a visible light sensor. On the NIR light path, a NIR light lens group refracts the NIR light to form an image of the object field at an NIR light sensor. The optical system thus provides images of the object field at two sensor planes, one image in the visible region of the spectrum and the other image in the NIR region of the spectrum.

In an example embodiment, the beam splitter may include two prisms that are formed as one unit; one of the prisms includes a surface that reflects visible light and passes NIR light, while the other prism includes a surface that reflects NIR light and passes visible light. The prisms may be arranged so that visible light is reflected towards the visible light lens group at a 90 degree angle from the optical axis of the front lens group, and NIR light is reflected towards the NIR light lens group at a 90 degree angle from the optical axis of the front lens group. Viewed from above, the NIR light lens group may be positioned at 180 degrees from the visible light lens group. However, the configuration of the beam splitter can be varied to provide different configurations and orientations for the lens groups depending on packaging and other requirements.

In some embodiments, while the two light paths share the same front lens group, the visible light lens group and the NIR light lens group may be configured to provide different fields of view (FOVs) at the respective sensors. In some embodiments, the visible light lens group and the NIR light lens group may provide different F/numbers. In some embodiments, the visible light lens group and the NIR light lens group may provide different effective focal lengths (EFLs).

In some embodiments, an NIR light source may be used with the optical system to illuminate the object field. The NIR light source may be located within the camera so that the NIR light is emitted through the front lens group of the optical system to the object field, or alternatively may be located external to the camera. A portion of the NIR light that is reflected from the object field is captured by the front lens group of the optical system, redirected to the NIR light path by the beam splitter, and captured by the NIR light sensor as an NIR light image of the object field. A visible light image of the object field is also captured via the visible light path and visible light sensor. The NIR light path may thus serve as a range finding/depth sensing system for the object field, while the visible light path captures visible light images of the object field.

In some embodiments, the optical system may be configured to capture NIR light in the 930-950 nm band. However, embodiments may be configured to capture a different or broader IR or NIR band, for example 780-1140 nm. More generally, the optical system may be configured to capture various different portions of the spectrum on the two light paths.

The visible light and NIR light images captured using embodiments of the optical system can be used in a number of applications, for example applications that analyze the visible light image to locate objects in the object field and the NIR light image to provide depth information for the located objects.

In an example embodiment, the visible light path may use a 4.4 mm diagonal visible light sensor, and the visible light lens group in combination with the front lens group may provide 1.96 mm EFL, F/2.0, with a 120 degree FOV at the visible light sensor, while the NIR light path may use a 3.6 mm diagonal NIR sensor, and the NIR light lens group in combination with the front lens group may provide 2.42 mm EFL, F/1.8, with an 83.17 degree FOV at the NIR light sensor.

In another example embodiment, the visible light path may use a 4.4 mm diagonal visible light sensor, and the visible light lens group in combination with the front lens group may provide 2.0 mm EFL, F/2.0, with a 118.9 degree FOV at the visible light sensor, while the NIR light path may use a 3.6 mm diagonal NIR sensor, and the NIR light lens group in combination with the front lens group may provide 1.95 mm EFL, F/1.8, with a 101 degree FOV at the NIR light sensor.

In various embodiments, sensor sizes, lens parameters, lens spacings, apertures, and other parameters of the visible and NIR lens groups may be varied to provide different characteristics (e.g., EFL, FOV, F/number, etc.) on one or both of the light paths according to the design requirements for particular applications.

BRIEF DESCRIPTION OF THE DRAWINGS

FIGS. 19A and 19B illustrate a first example optical system, according to some embodiments.

FIG. 19C illustrates a beam splitter used in the optical system of FIGS. 19A and 19B, according to some embodiments.

Figure 1:
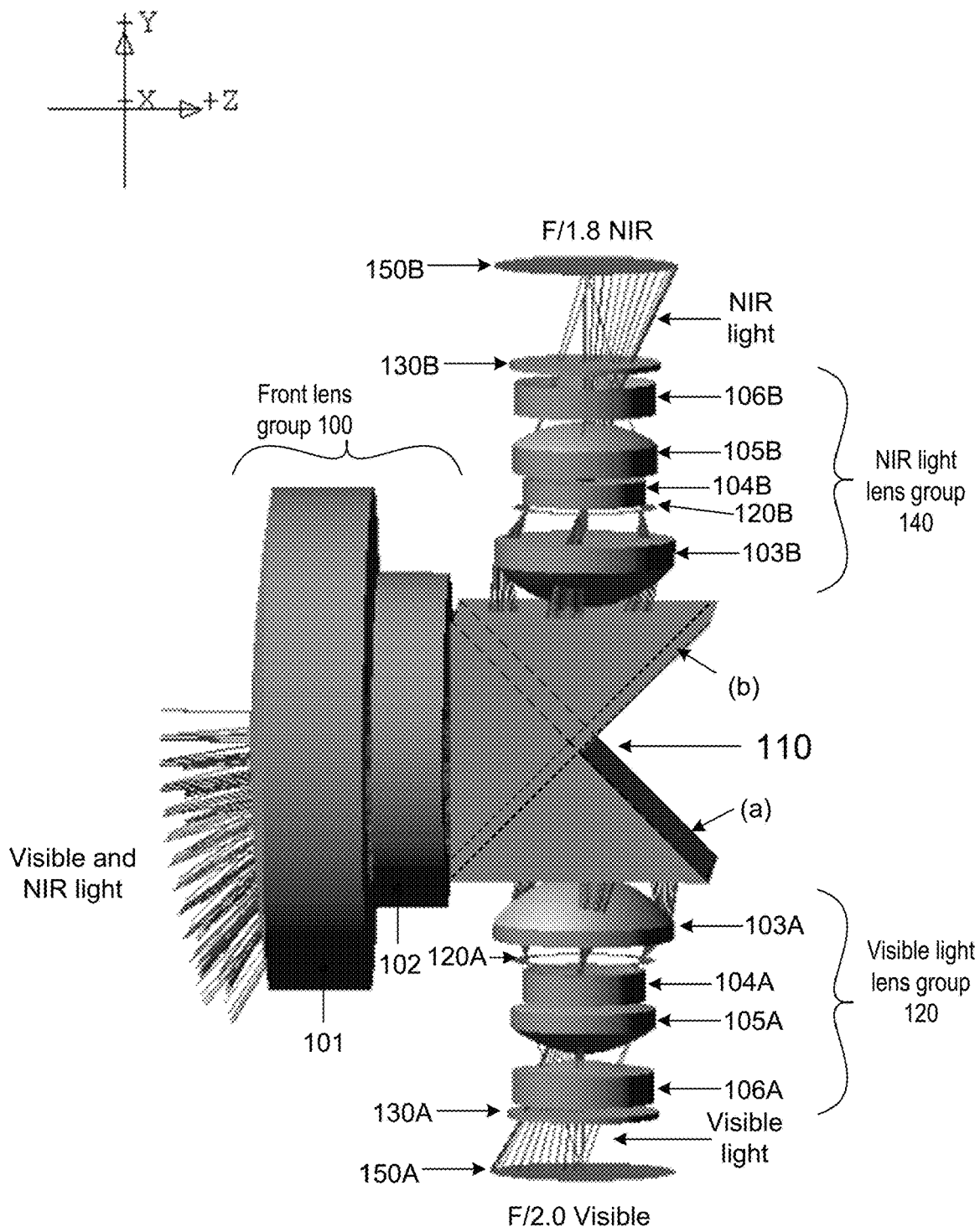
FIG. 1 is a three-dimensional illustration of an example optical system, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Embodiments of a compact, small form factor optical system for cameras that provides multiple optical paths to capture images of an object field in different portions of the light spectrum. The optical system includes a front lens group that captures visible and near-infrared (NIR) light from an object field and refracts the light to an element that splits the visible light and the NIR light onto two paths, referred to herein as a beam splitter. On the visible light path, a visible light lens group refracts the visible light to form an image of the object field at a visible light sensor. On the NIR light path, a NIR light lens group refracts the NIR light to form an image of the object field at an NIR light sensor. The optical system thus provides images of the object field at two sensor planes, one image in the visible region of the spectrum and the other image in the NIR region of the spectrum.

In some embodiments, the front lens group may include two negative refractive lens elements configured to capture a wide field of view (FOV). However, in some embodiments, more or fewer lenses may be used in the front lens group, and different combinations of lenses (e.g., one negative and one positive lens) may be used. In some embodiments, the lenses in the front lens group may be composed of the same plastic material with similar optical characteristics. However, in some embodiments, the lenses may be composed of plastic materials with different optical characteristics, or of other materials (e.g., glass).

Various configurations for splitting light received through the front lens group into the multi-spectral optical paths can be implemented depending on packaging and other requirements. In some embodiments, the beam splitter may include two prisms that are formed as one unit; one of the prisms includes a surface that reflects visible light and passes NIR light, while the other prism includes a surface that reflects NIR light and passes visible light. In some embodiments, the prisms may be arranged so that visible light is reflected towards the visible light lens group at a 90 degree angle from the optical axis of the front lens group, and NIR light is reflected towards the NIR light lens group at a 90 degree angle from the optical axis of the front lens group. In some embodiments, viewed from above, the NIR light lens group may be positioned at 180 degrees from the visible light lens group. However, depending on packaging requirements, the beam splitter may be configured so that the two lens groups are positioned differently, for example at an angle of 90 degrees when viewed from above.

In some embodiments, the beam splitter may include a single prism that includes a surface that reflects visible light towards the visible light lens group and passes NIR light to the NIR light lens group, or alternatively that reflects NIR light towards the NIR light lens group and passes visible light to the visible lens group. In some embodiments, the beam splitter may include a prism that includes a surface that reflects light received from the front lens group towards a second prism that reflects visible light towards the visible light lens group and passes NIR light to the NIR light lens group, or alternatively that reflects NIR light towards the NIR light lens group and passes visible light to the visible lens group.

In some embodiments, the beam splitter may include one or more glass prisms. However, other materials than glass may be used. In addition, other types of beam splitting technology than prisms may be used in some embodiments, for example mirrors, gratings, etc.

The visible light lens group and the NIR light lens group may each include at least one refractive lens element. In an example embodiment, the visible light lens group and the NIR light lens group both include four refractive lens elements. In some embodiments, the lens elements in the two lens groups are composed of the same plastic material. In some embodiments, all of the lens elements in the visible light lens group have different design parameters and optical characteristics than the corresponding lens elements in the NIR light lens group. In some embodiments, the lens elements in the visible light lens group all have the same design parameters and optical characteristics as the corresponding lens elements in the NIR light lens group. In some embodiments, at least one lens element in the visible light lens group has the same design parameters as its corresponding lens element in the NIR light lens group, and at least one other lens element in the visible light lens group has different design parameters than its corresponding lens element in the NIR light lens group. For example, in an example embodiment with four lens elements in each of the visible light and NIR light lens groups, the first (object side) lens elements in both lens groups are the same, the last (image side) lens elements in both lens group are the same, while the second and third lens elements are different in the two lens groups. In any of the examples, spacing between the lens elements in the two lens groups may be the same, or may be different, depending on the design parameters for a particular application.

In some embodiments, the visible light lens group and the NIR light lens group both include an aperture stop. For example, in an example embodiment, the visible light lens group and the NIR light lens group both include four refractive lens elements, and both include an aperture stop between the first lens element and the second lens element from the object side. Alternatively, the aperture stops may be located between the beam splitter and the first lens element. The aperture stops may differ in diameter and/or location in the two lens groups, for example to provide different F/numbers for the two lens groups, or may be the same.

In some embodiments, one or both of the visible light lens group and the NIR light lens group include a filter, for example located between the last (image side) lens element and the respective sensor. The filter may, for example, filter out light that is outside the desired portion of the spectrum of the respective sensor.

In some embodiments, an NIR light source may be used with the optical system to illuminate the object field; a portion of the NIR light that is reflected from the object field is captured by front lens group of the optical system, redirected to the NIR light path by the beam splitter, and captured by the NIR light sensor as an NIR light image of the object field. A visible light image of the object field is also captured via the visible light path and visible light sensor. The NIR light path may thus serve as a range finding/depth sensing system for the object field, while the visible light path captures visible light images of the object field. The NIR light source may be located within the camera so that the NIR light is emitted through the front lens group of the optical system to the object field, or alternatively may be located external to the camera. In some embodiments, a visible light source may instead or also be included to illuminate the object field; a portion of the visible light that is reflected from the object field is captured by front lens group of the optical system, redirected to the visible light path by the beam splitter, and captured by the visible light sensor as a visible light image of the object field.

In some embodiments, the optical system may be configured to capture NIR light in the 930-950 nm band. However, embodiments may be configured to capture a broader IR or NIR band, for example 780-1140 nm.

The visible light and NIR light images captured using embodiments of the optical system can be used in a number of applications, for example applications that analyze the visible light image to locate objects in the object field and the NIR light image to provide depth information for the located objects.

Example Embodiments

FIG. 1 is a three-dimensional illustration of an example optical system, according to some embodiments. The optical system may include a front lens group 100, a beam splitter 110, a visible light lens group 120, and an NIR light lens group 140. The front lens group 100 captures visible and NIR light from an object field and refracts the light to beam splitter 110 that splits the visible light and the NIR light onto two paths, a visible light path and an NIR light path. On the visible light path, visible light lens group 120 refracts the visible light to form an image 150A of the object field at a visible light sensor. On the NIR light path, NIR light lens group 140 refracts the NIR light to form an image 150B of the object field at an NIR light sensor. The optical system thus provides images of the object field at two sensor planes, one image in the visible region of the spectrum and the other image in the NIR region of the spectrum.

In some embodiments, the front lens group 100 may include two negative refractive lens elements 101 and 102 configured to capture a wide field of view (FOV). However, in some embodiments, more or fewer lenses may be used in the front lens group 100, and different combinations of lenses (e.g., one negative and one positive lens) may be used. In some embodiments, lens elements 101 and 102 may be composed of the same plastic material with similar optical characteristics. However, in some embodiments, lens elements 101 and 102 may be composed of plastic materials with different optical characteristics, or of other materials (e.g., glass).

In this example embodiment, the beam splitter 110 may include two prisms that are formed as one unit; one of the prisms includes a surface (a) that reflects visible light and passes NIR light, while the other prism includes a surface (b) that reflects NIR light and passes visible light. The prisms may be arranged so that visible light is reflected towards the visible light lens group 120 at a 90 degree angle from the optical axis of the front lens group 100, and NIR light is reflected towards the NIR light lens group 140 at a 90 degree angle from the optical axis of the front lens group 100. Viewed from above, the NIR light lens group 140 is positioned at 180 degrees from the visible light lens group 120. However, depending on packaging requirements, the beam splitter 110 may be configured so that the two lens groups 120 and 140 are positioned differently, for example at an angle of 90 degrees when viewed from above.

In this example embodiment, the visible light lens group 120 includes four refractive lens elements 103A, 104A, 105A, and 106A, and the NIR light lens group 140 includes four refractive lens elements 103B, 104B, 105B, and 106B. In some embodiments, the lens elements in the two lens groups are composed of the same plastic material. In some embodiments, all of the lens elements in the visible light lens group 120 have different design parameters and optical characteristics than the corresponding lens elements in the NIR light lens group 140. In some embodiments, the lens elements in the visible light lens group 120 all have the same design parameters and optical characteristics as the corresponding lens elements in the NIR light lens group 140. In some embodiments, at least one lens element in the visible light lens group 120 has the same design parameters as its corresponding lens element in the NIR light lens group 140, and at least one other lens element in the visible light lens group 120 has different design parameters than its corresponding lens element in the NIR light lens group 140. For example, in an example embodiment, lens elements 103A and 103B are the same and lens elements 106A and 106B are the same, while lens elements 104A and 104B are different and lens elements 105A and 105B are different. In any of the examples, spacing between the lens elements in the two lens groups 120 and 140 may be the same, or may be different, depending on the design parameters for a particular application.

In some embodiments, the visible light lens group 120 includes an aperture stop 120A located between lens elements 103A and 104A, and the NIR light lens group 140 includes an aperture stop 120B located between lens elements 103B and 104B. However, the aperture stops may be located at other positions in their respective lens groups. The aperture stops may differ in diameter, for example to provide different F/numbers for the two lens groups, or may be the same.

In some embodiments, a filter 130A is located between lens element 106A and the visible light sensor on the visible light path, and a filter 130B is located between lens element 106B and the NIR light sensor on the NIR light path. The filters may, for example, filter out light that is outside the desired portion of the spectrum of the respective sensor.

In some embodiments, while the two light paths share the same front lens group 100, the visible light lens group 120 and the NIR light lens group 140 may provide different fields of view (FOVs) at the respective sensors. In some embodiments, the visible light lens group 120 and the NIR light lens group 140 may provide different F/numbers. In some embodiments, the visible light lens group 120 and the NIR light lens group 140 may provide different effective focal lengths (EFLs). In various embodiments, sensor sizes, lens parameters, lens spacings, apertures, and other parameters of the visible 120 and NIR 140 lens groups may be varied to provide different characteristics (e.g., EFL, FOV, F/number, etc.) on one or both of the light paths according to the design requirements for particular applications.

Figure 2:
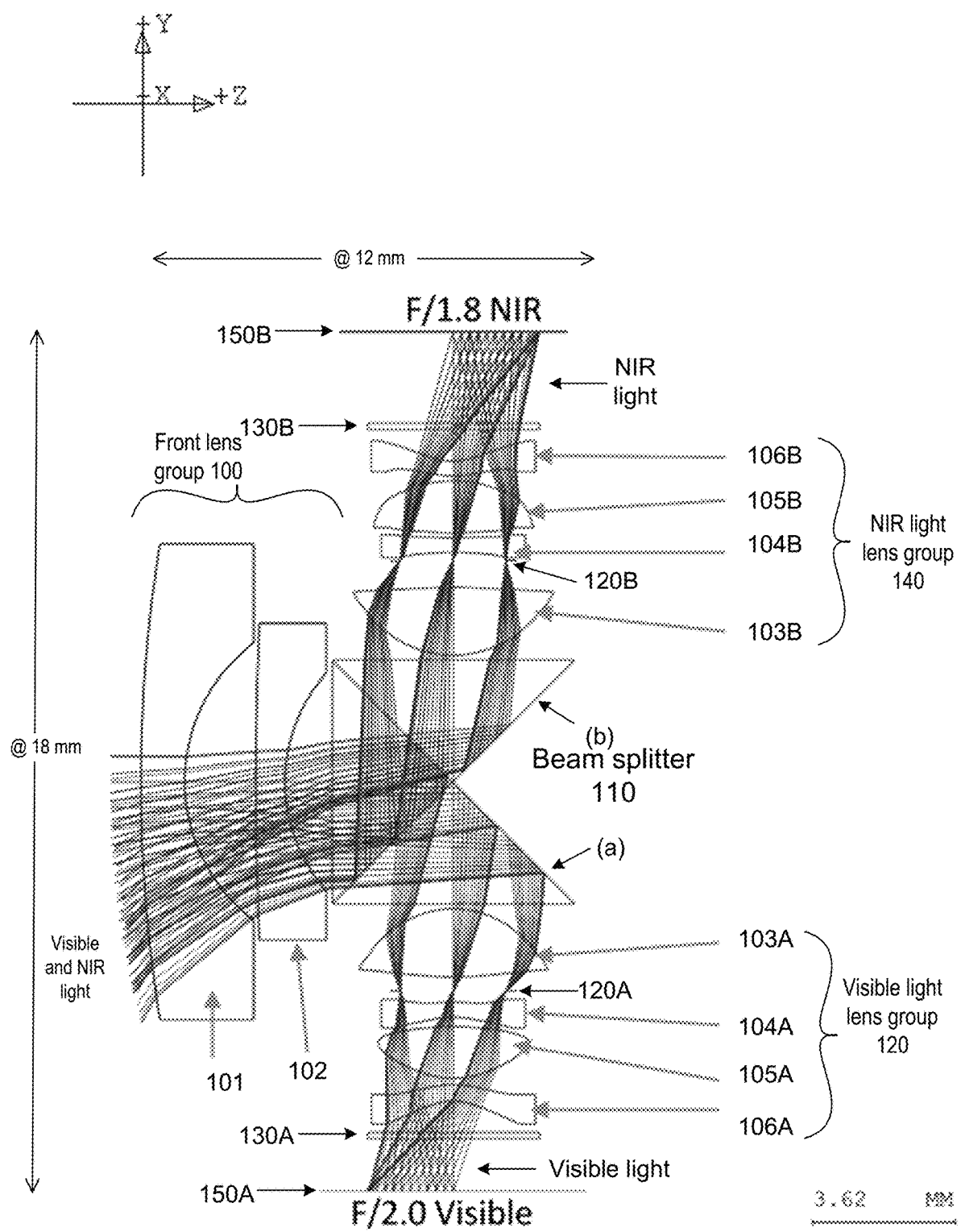
FIG. 2 is a two-dimensional illustration of an example optical system as illustrated in FIG. 1, according to some embodiments.

FIG. 2 is a two-dimensional illustration of an example optical system as illustrated in FIG. 1, according to some embodiments. FIG. 2 shows example shapes and refractive characteristics of the lens elements in the three lens groups. In this example, lens elements 101 and 102 have negative refractive power. On the visible light path, lens element 103A has positive refractive power, lens element 104A has negative refractive power, lens element 105A has positive refractive power, and lens element 106A has negative refractive power. On the NIR light path, lens element 103B has positive refractive power, lens element 104B has negative refractive power, lens element 105B has positive refractive power, and lens element 106B has negative refractive power. At least some of the lens elements may have at least one aspheric surface.

In an example embodiment, the visible light path may use a 4.4 mm diagonal visible light sensor, and the visible light lens group 120 in combination with the front lens group 100 may provide 1.96 mm EFL, F/2.0, with a 120 degree FOV at the visible light sensor, while the NIR light path may use a 3.6 mm diagonal NIR sensor, and the NIR light lens group 140 in combination with the front lens group 100 may provide 2.42 mm EFL, F/1.8, with an 83.17 degree FOV at the NIR light sensor. In this embodiment, the lens elements in the two lens groups may be composed of the same plastic material; however all of the lens elements in the visible light lens group 120 have different design parameters, spacings, and optical characteristics than the corresponding lens elements in the NIR light lens group 140.

In another example embodiment, the visible light path may use a 4.4 mm diagonal visible light sensor, and the visible light lens group 120 in combination with the front lens group 100 may provide 2.0 mm EFL, F/2.0, with a 118.9 degree FOV at the visible light sensor, while the NIR light path may use a 3.6 mm diagonal NIR sensor, and the NIR light lens group 140 in combination with the front lens group 100 may provide 1.95 mm EFL, F/1.8, with a 101 degree FOV at the NIR light sensor. In this embodiment, the lens elements in the two lens groups may be composed of the same plastic material. In this embodiment, lens elements 103A and 103B are the same and lens elements 106A and 106B are the same, while lens elements 104A and 104B are different and lens elements 105A and 105B are different. Spacing of the lens elements in MR light lens group 140 may be the same as spacing of the lens elements in the visible light lens group 120.

In the example configuration of an optical system shown in FIG. 2, the optical system may have a Z-axis height of approximately 12 mm, while the Y-axis dimension may be approximately 18 mm. However, sizes and configurations of the various elements of the optical system may be varied to provide different dimensions on one or more axes according to packaging and other requirements.

Figure 3A:
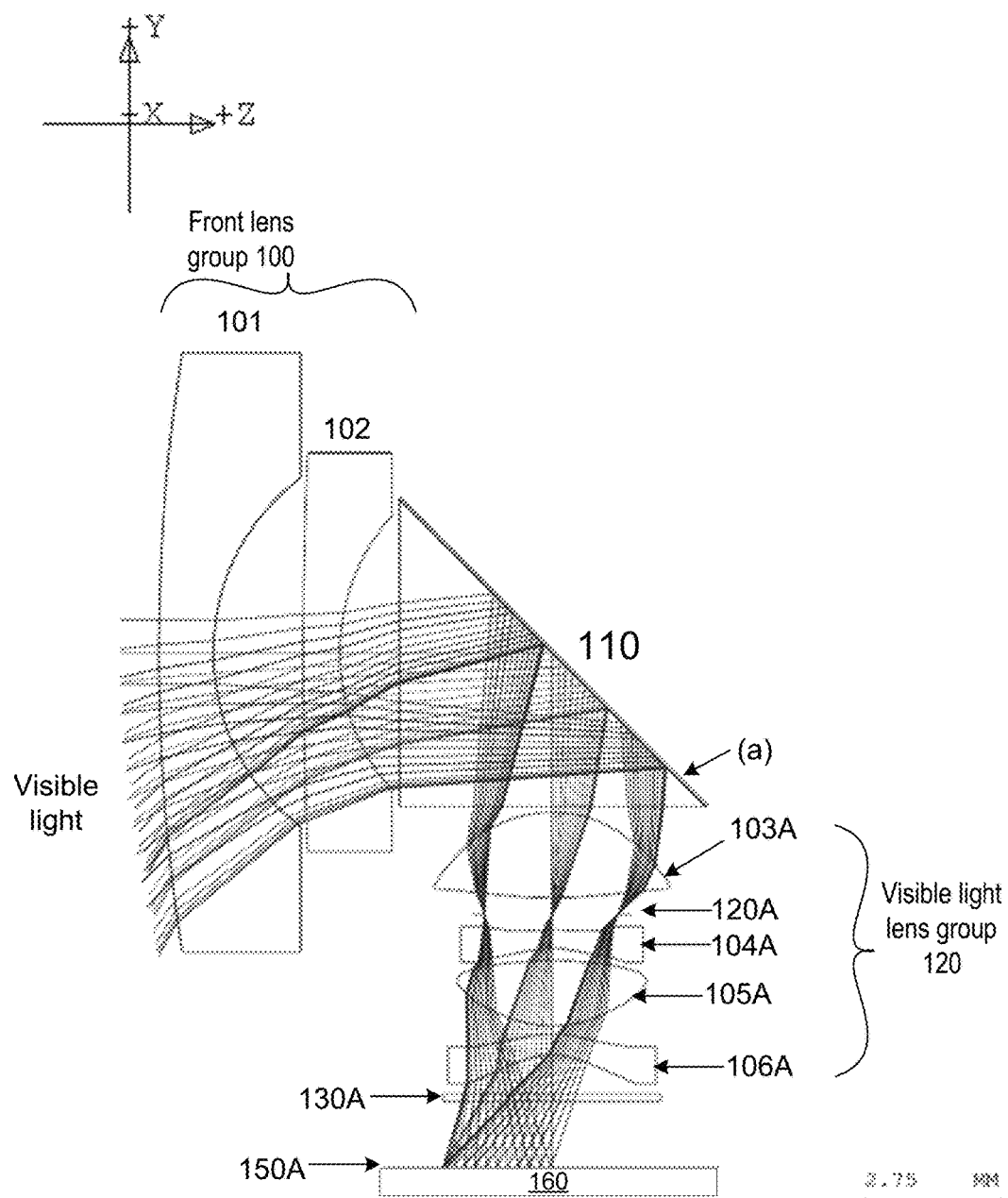
FIG. 3A illustrates the visible light path of an example optical system as illustrated in FIGS. 1 and 2, according to some embodiments.

FIG. 3A illustrates the visible light path of an example optical system as illustrated in FIGS. 1 and 2, according to some embodiments. Visible light is received at lens element 101 and refracted to lens element 102. Lens element 102 refracts the visible light to beam splitter 110. Surface (a) of beam splitter 110 reflects the visible light to the visible light lens group 120. Lens element 103A refracts the visible light through aperture 120A to lens element 104A. Lens element 104A refracts the visible light to lens element 105A. Lens element 105A refracts the visible light through filter 130A to form an image 150A at a surface of visible light sensor 160.

Figure 3B:
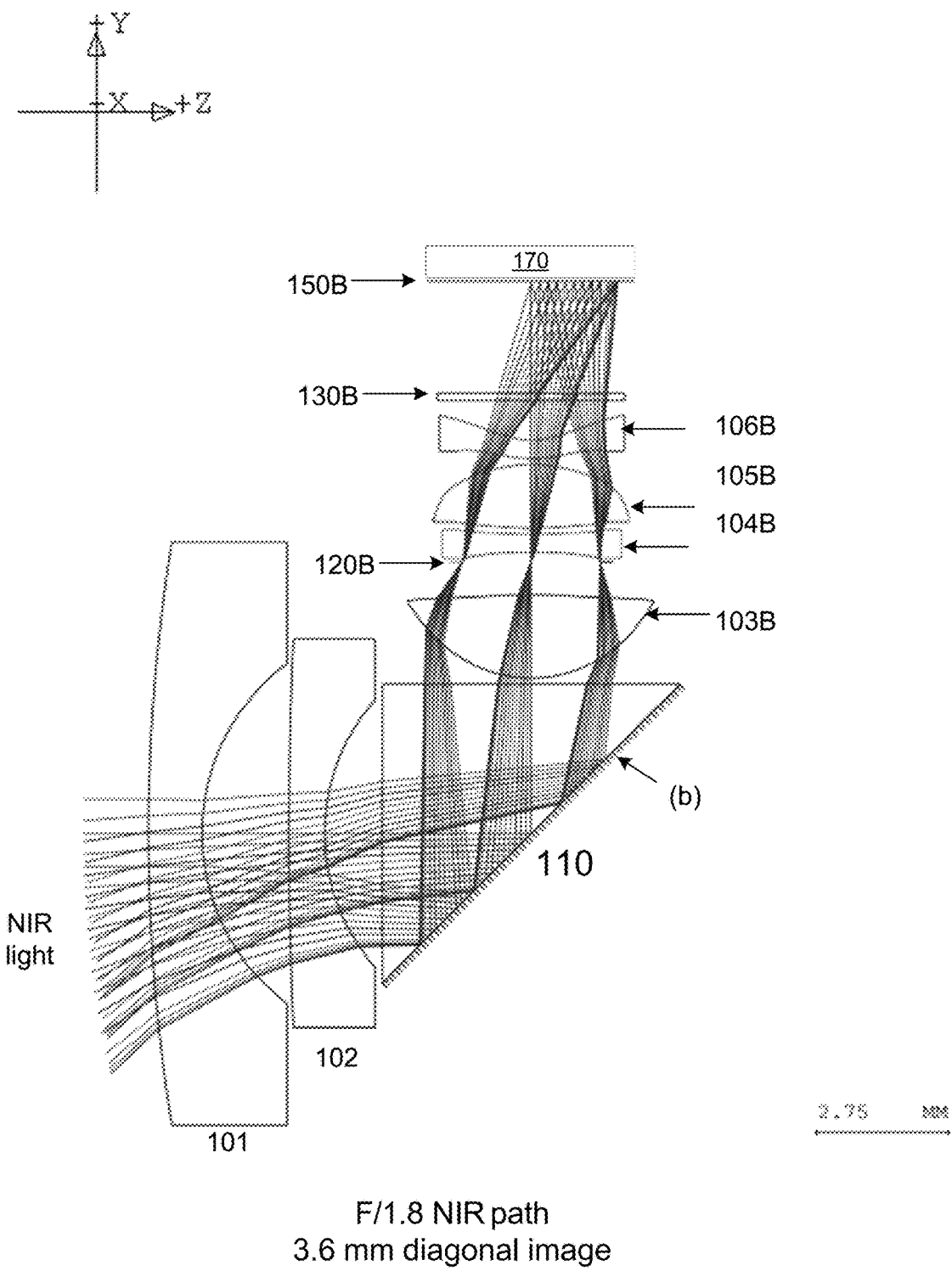
FIG. 3B illustrates the near-infrared (NIR) light path of an example optical system as illustrated in FIGS. 1 and 2, according to some embodiments.

FIG. 3B illustrates the near-infrared (NIR) light path of an example optical system as illustrated in FIGS. 1 and 2, according to some embodiments. NIR light is received at lens element 101 and refracted to lens element 102. Lens element 102 refracts the NIR light to beam splitter 110. Surface (b) of beam splitter 110 reflects the NIR light to the NIR light lens group 140. Lens element 103B refracts the NIR light through aperture 120B to lens element 104B. Lens element 104B refracts the NIR light to lens element 105B. Lens element 105B refracts the NIR light through filter 130B to form an image 150B at a surface of NIR light sensor 170.

Figure 4A:
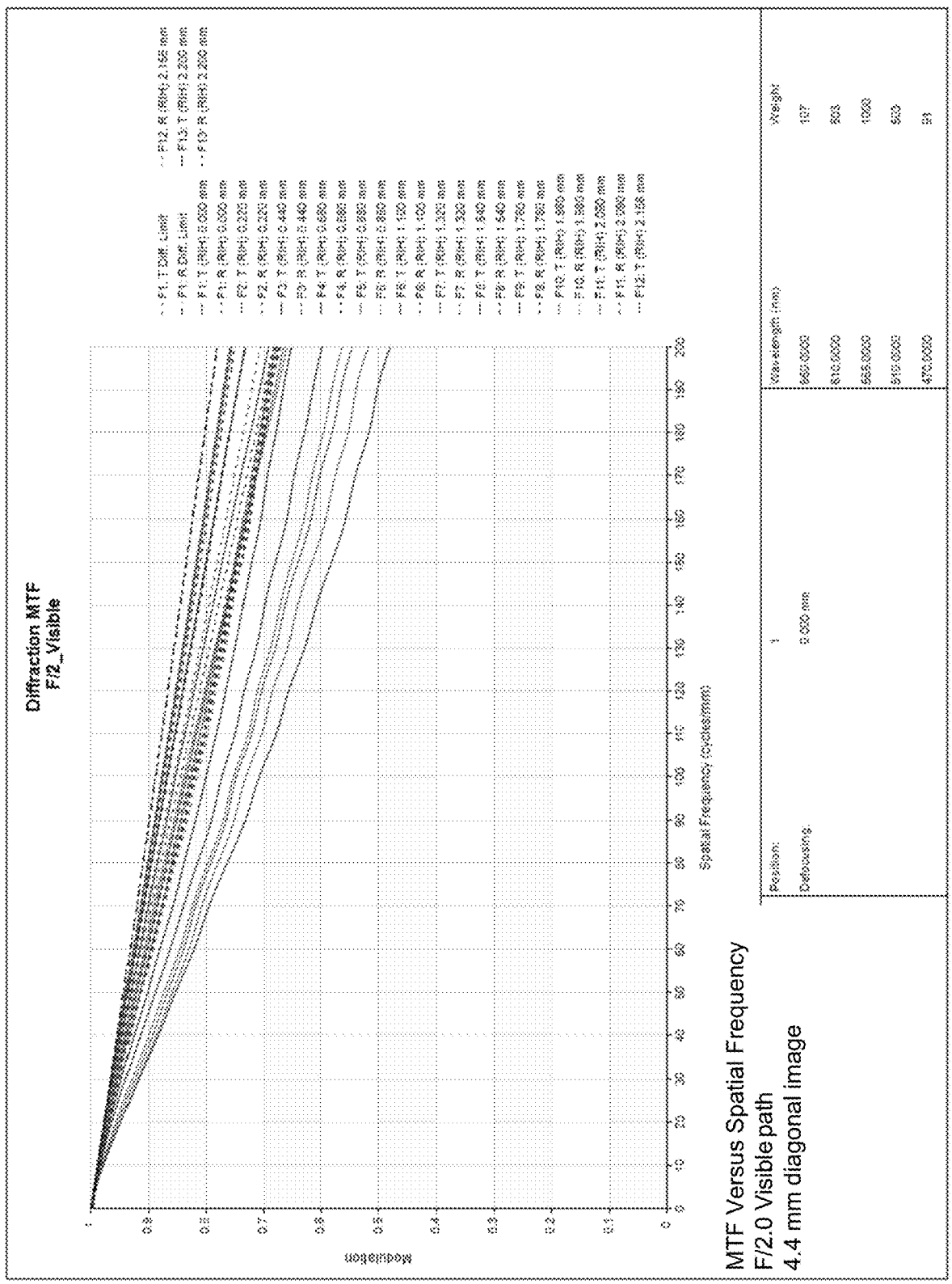
FIGS. 4A and 4B are graphs of the modulation transfer function (MTF) vs. spatial frequency for the visible and NIR light paths of an example optical system as illustrated in FIGS. 1 through 3B, according to some embodiments.
Figure 4B:
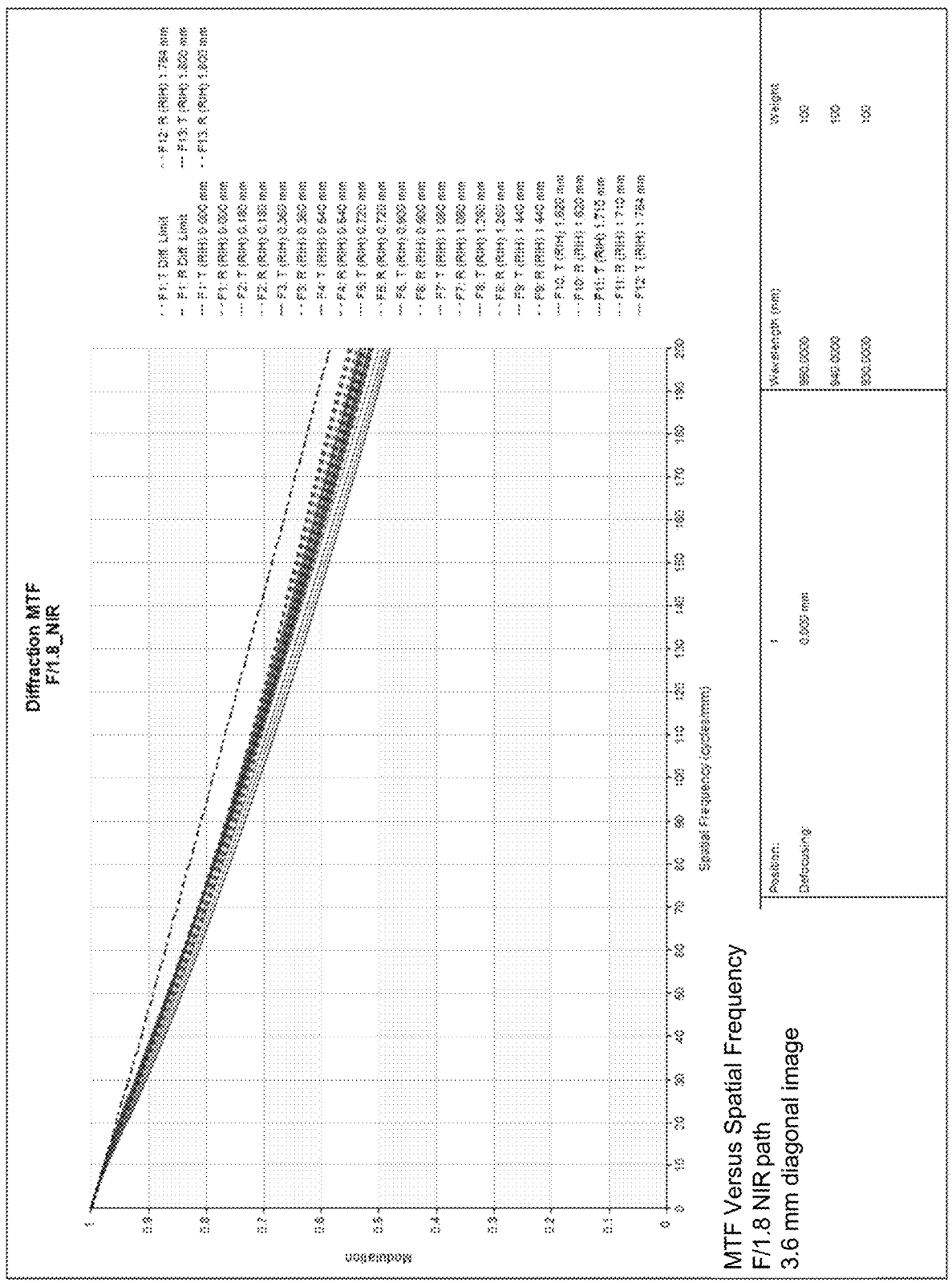
Figure 5A:
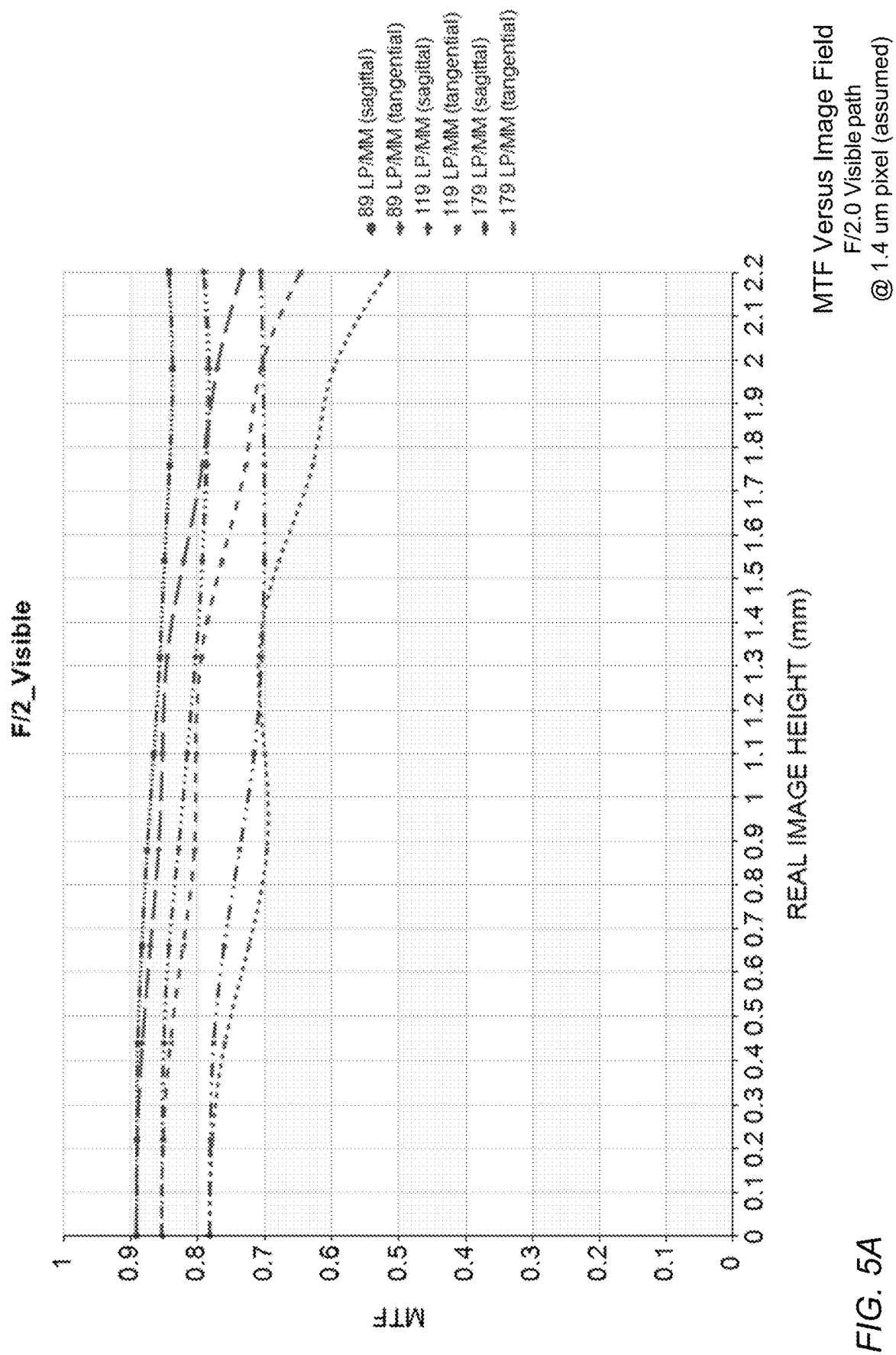
FIGS. 5A and 5B are graphs of the MTF vs. image field for the visible and NIR light paths of an example optical system as illustrated in FIGS. 1 through 3B, according to some embodiments.
Figure 5B:
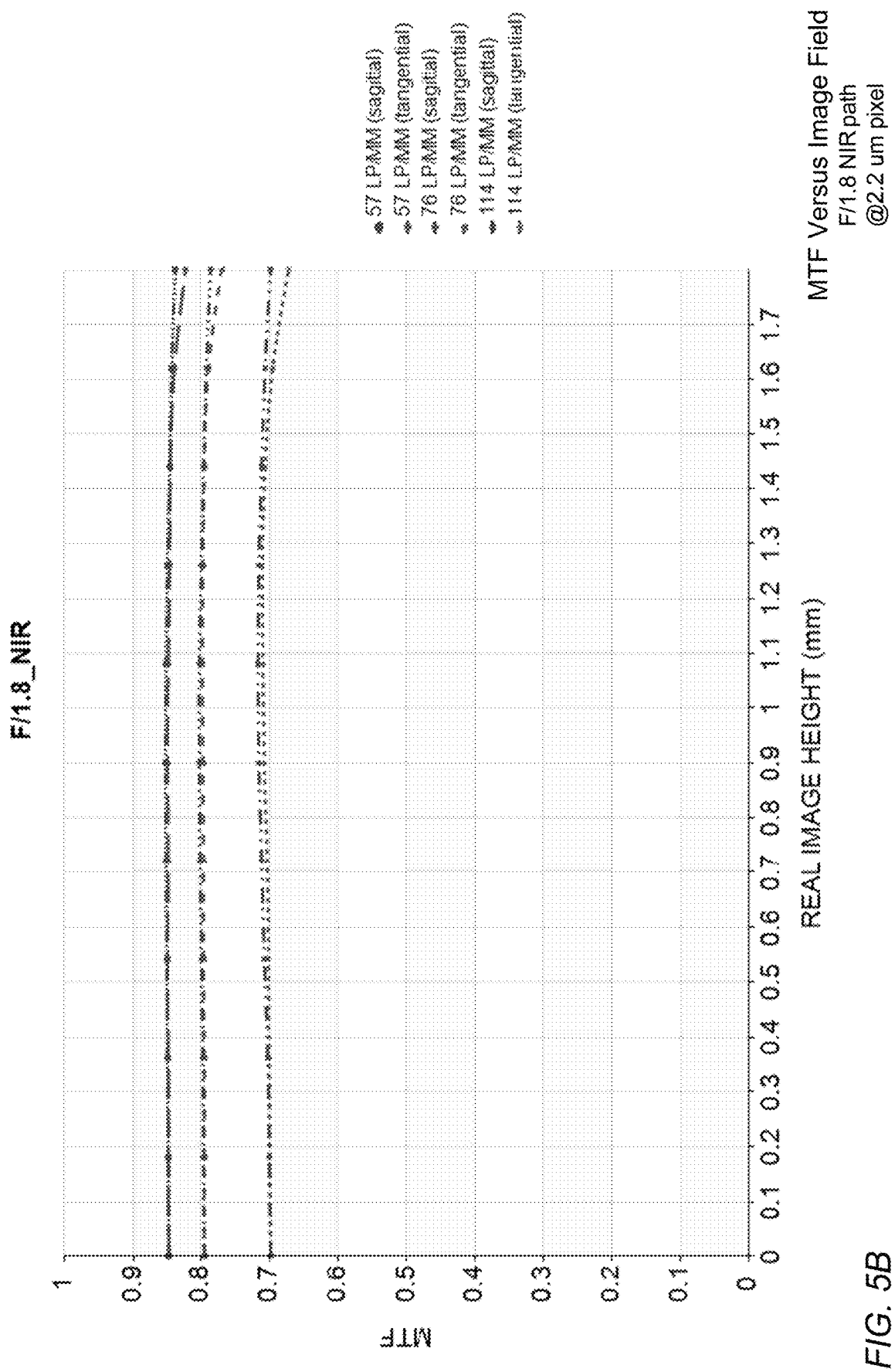
Figure 6A:
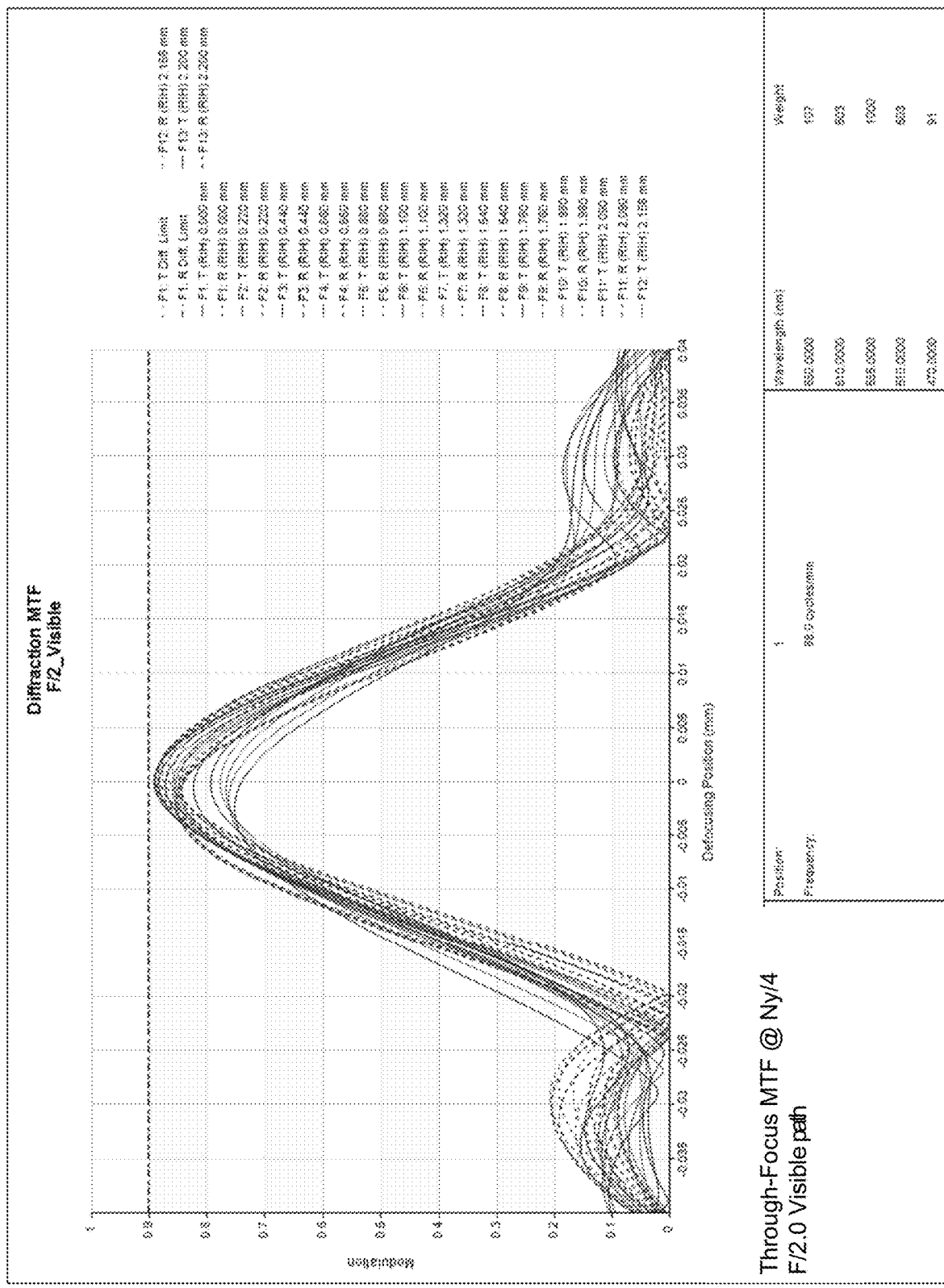
FIGS. 6A and 6B are graphs of through-focus MTF at Nyquist frequency 4 (Ny/4) for the visible and NIR light paths of an example optical system as illustrated in FIGS. 1 through 3B, according to some embodiments.
Figure 6B:
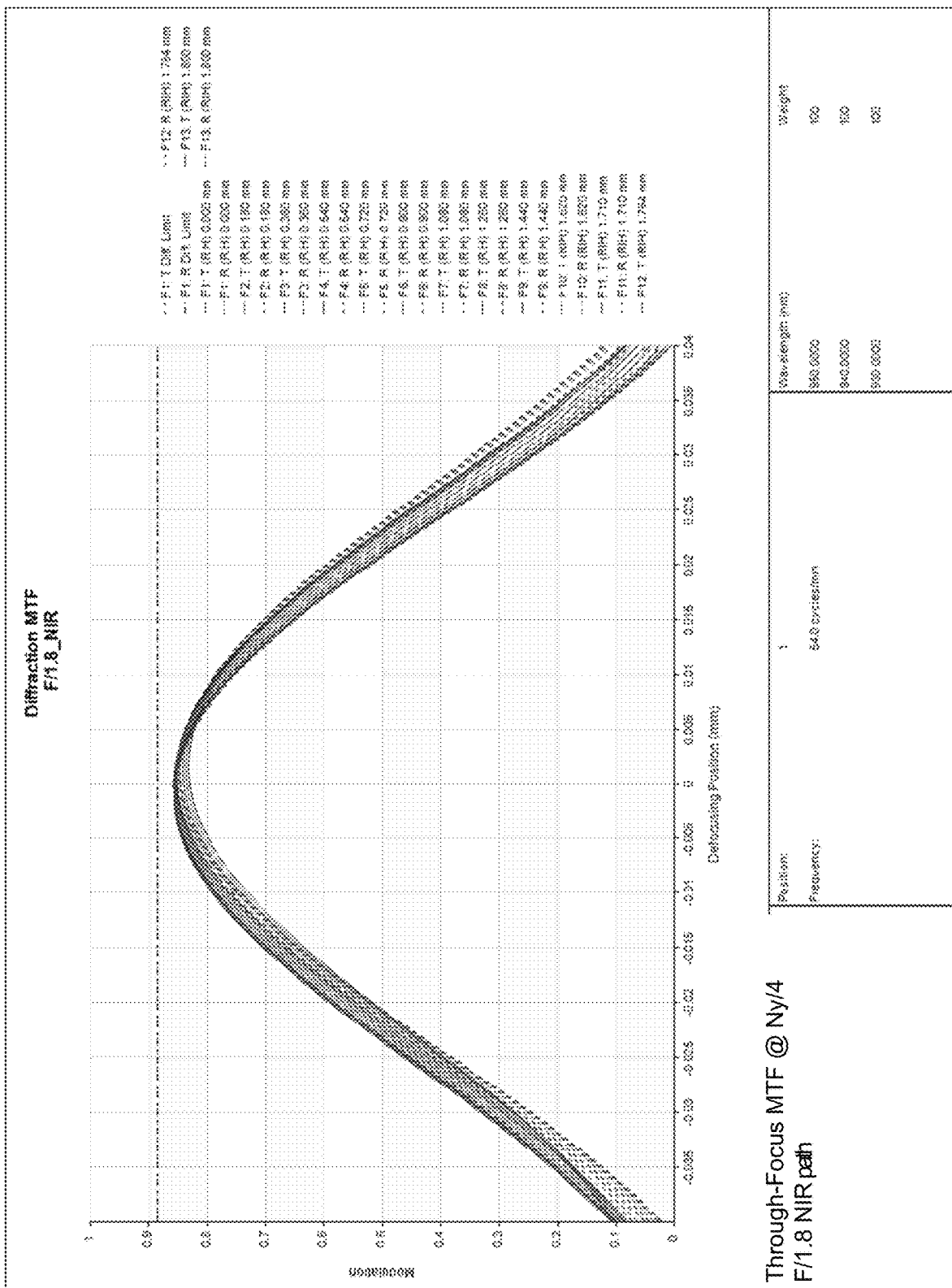
Figure 7A:
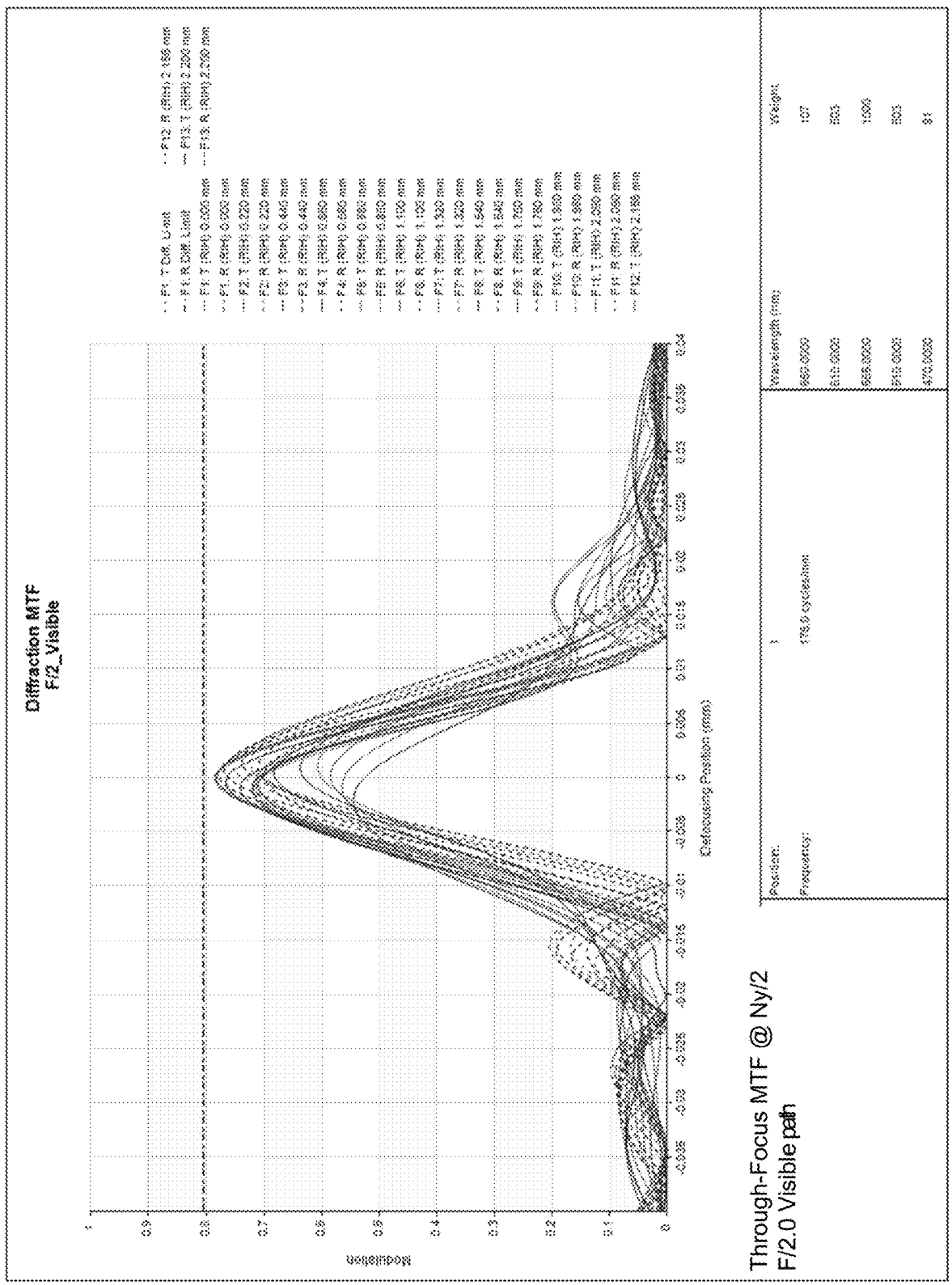
FIGS. 7A and 7B are graphs of through-focus MTF at Ny/2 for the visible and NIR light paths of an example optical system as illustrated in FIGS. 1 through 3B, according to some embodiments.
Figure 7B:
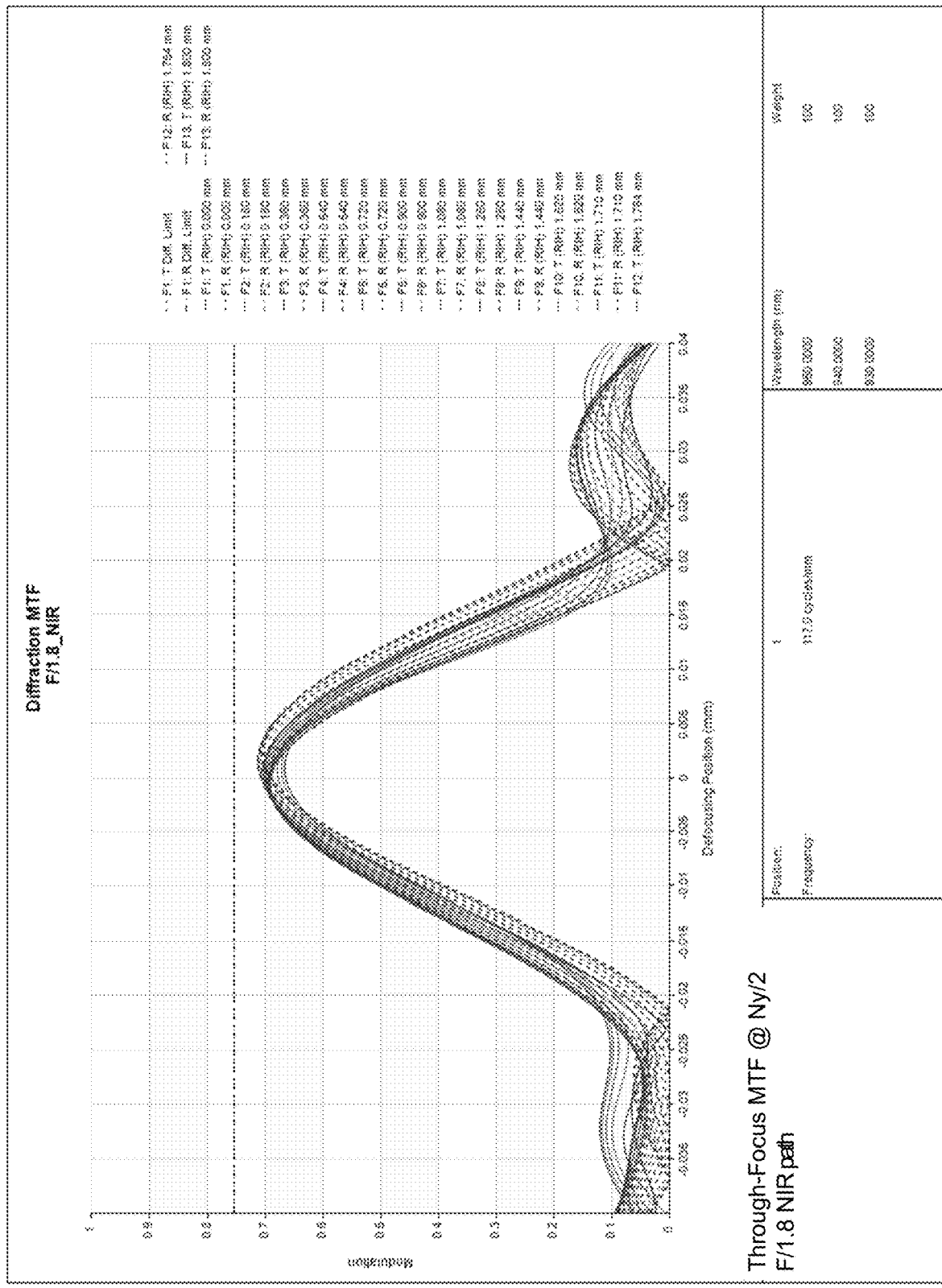
Figure 8A:
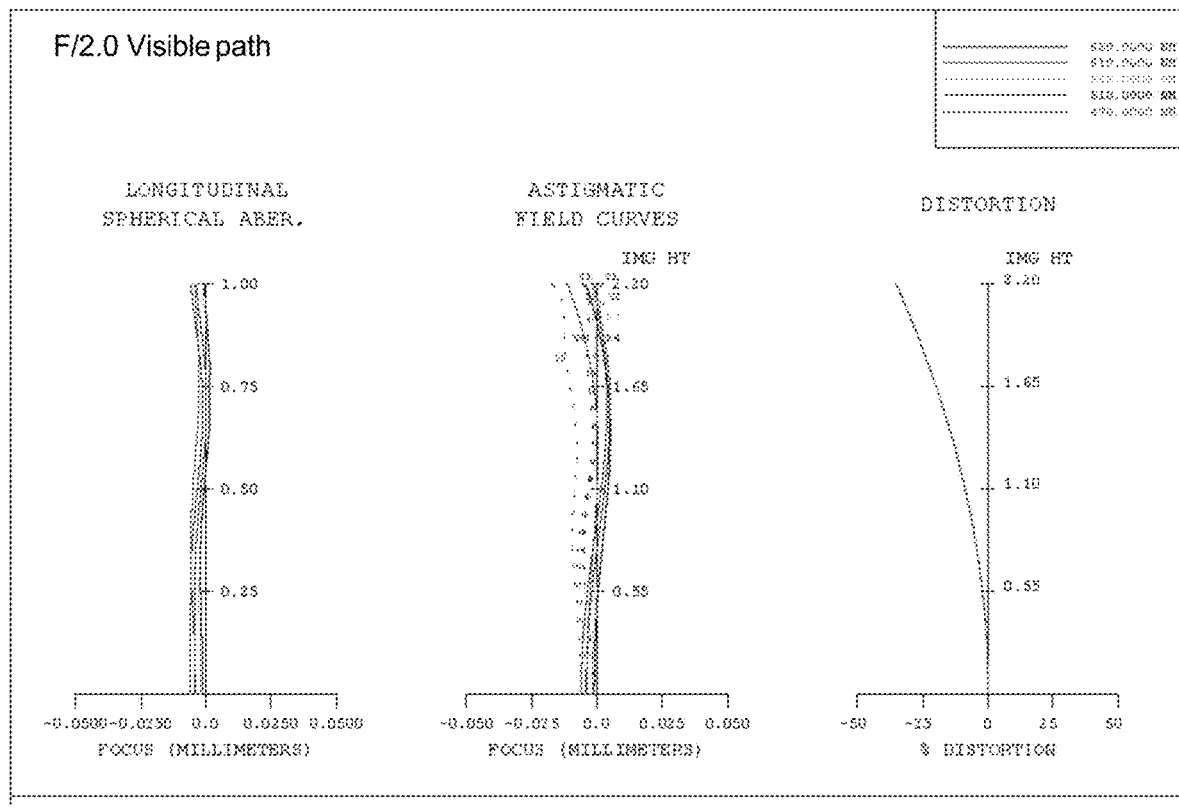
FIGS. 8A and 8B are graphs of longitudinal spherical aberration (LSA), astigmatic field curves (AST), and distortion (DST) for the visible and NIR light paths of an example optical system as illustrated in FIGS. 1 through 3B, according to some embodiments.
Figure 8B:
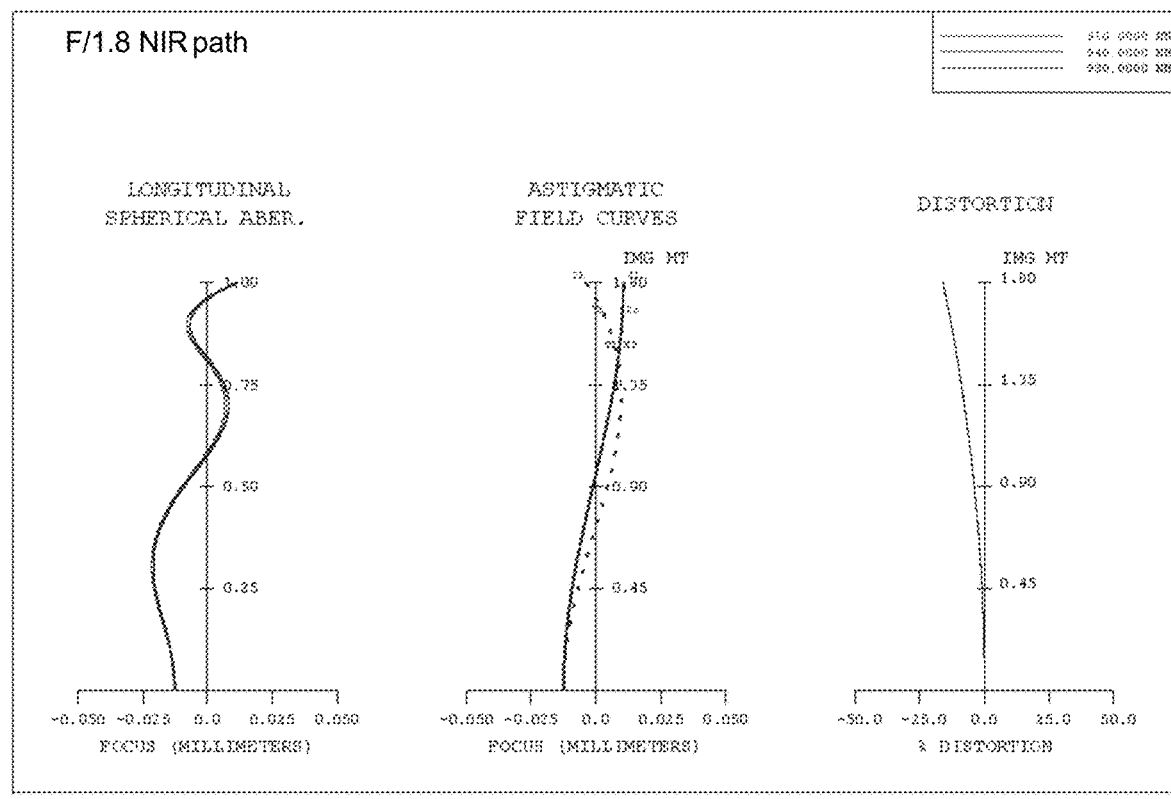
Figure 9A:
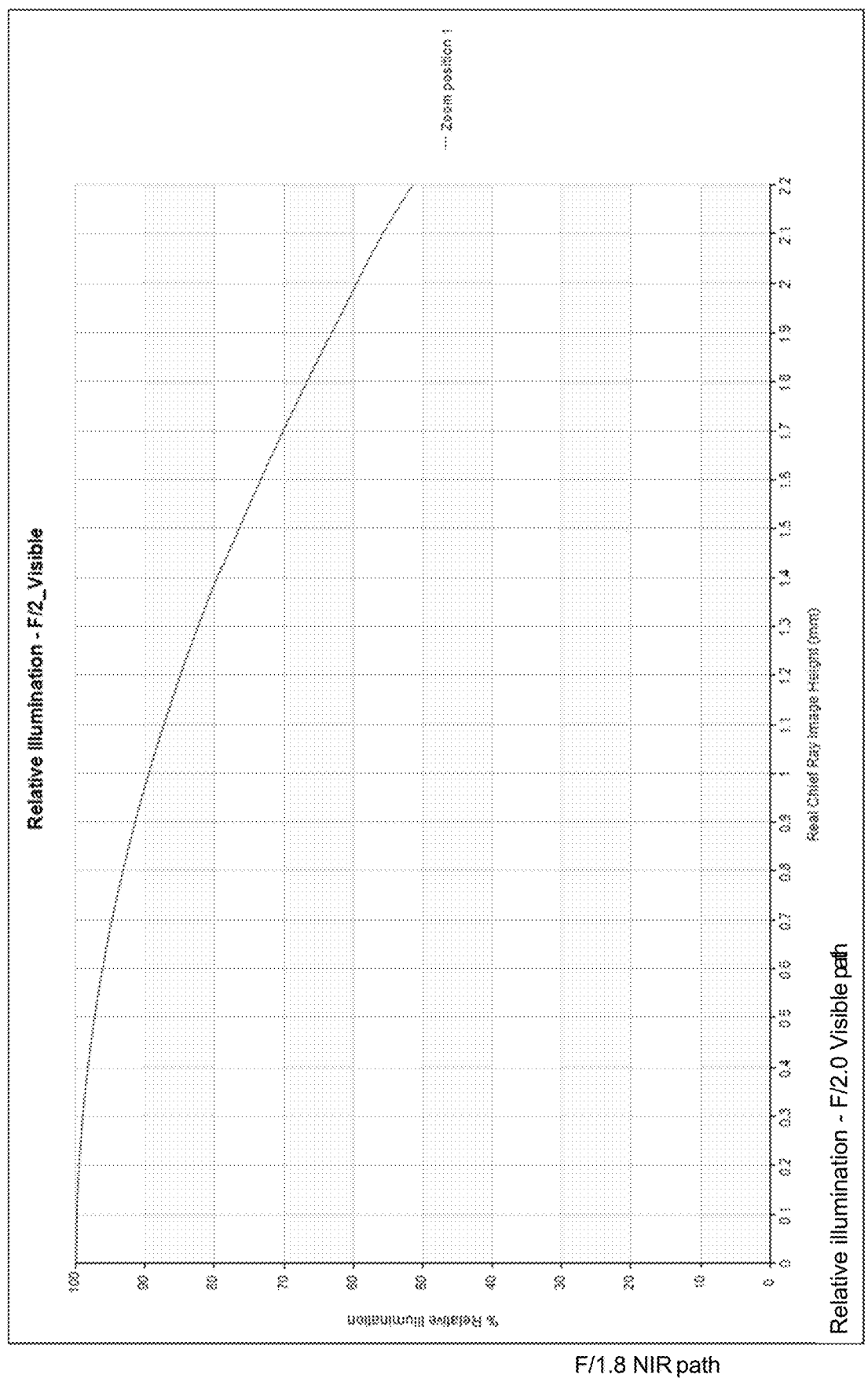
FIGS. 9A and 9B are graphs of relative illumination for the visible and NIR light paths of an example optical system as illustrated in FIGS. 1 through 3B, according to some embodiments.
Figure 9B:
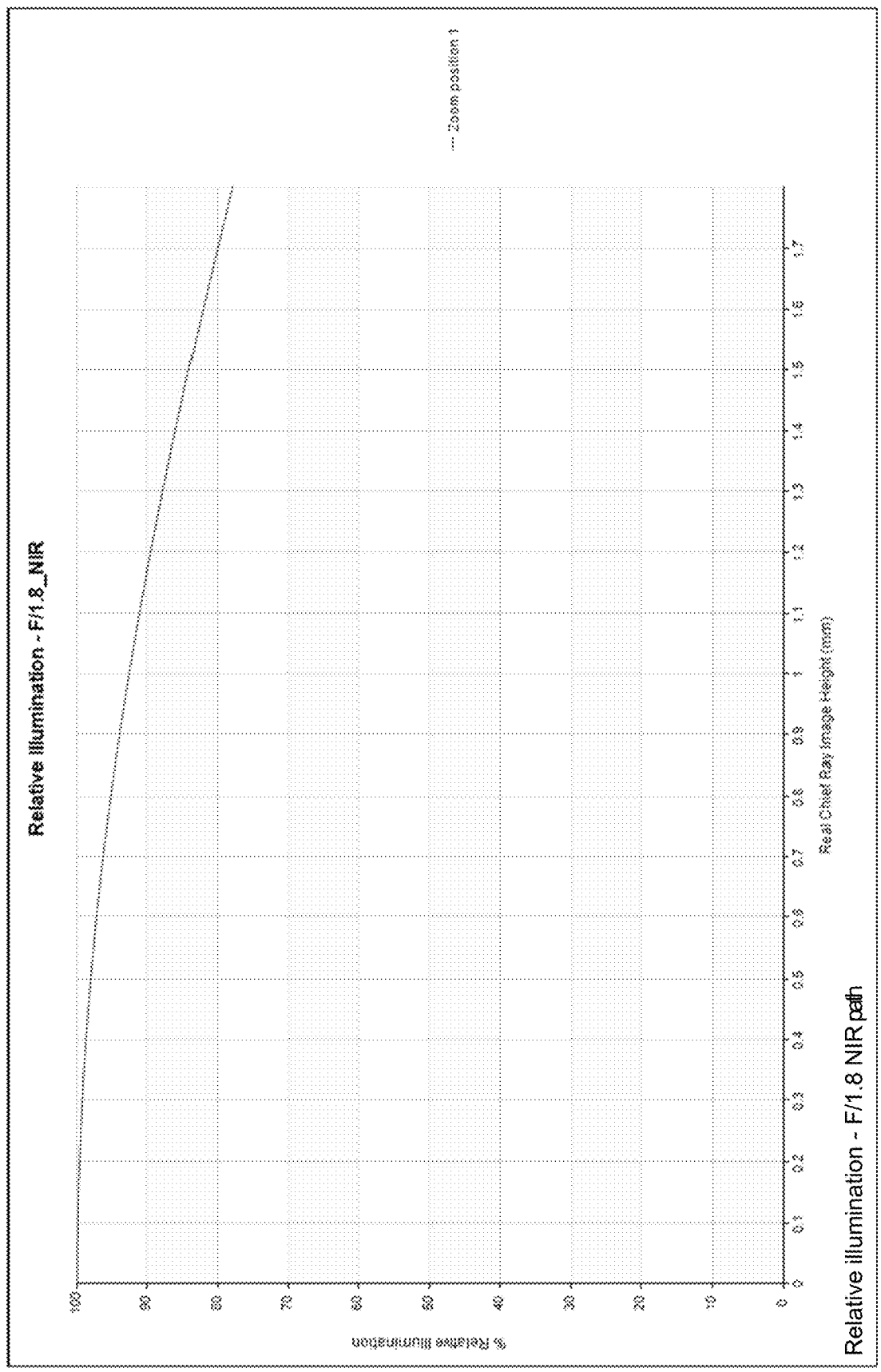
Figure 10A:
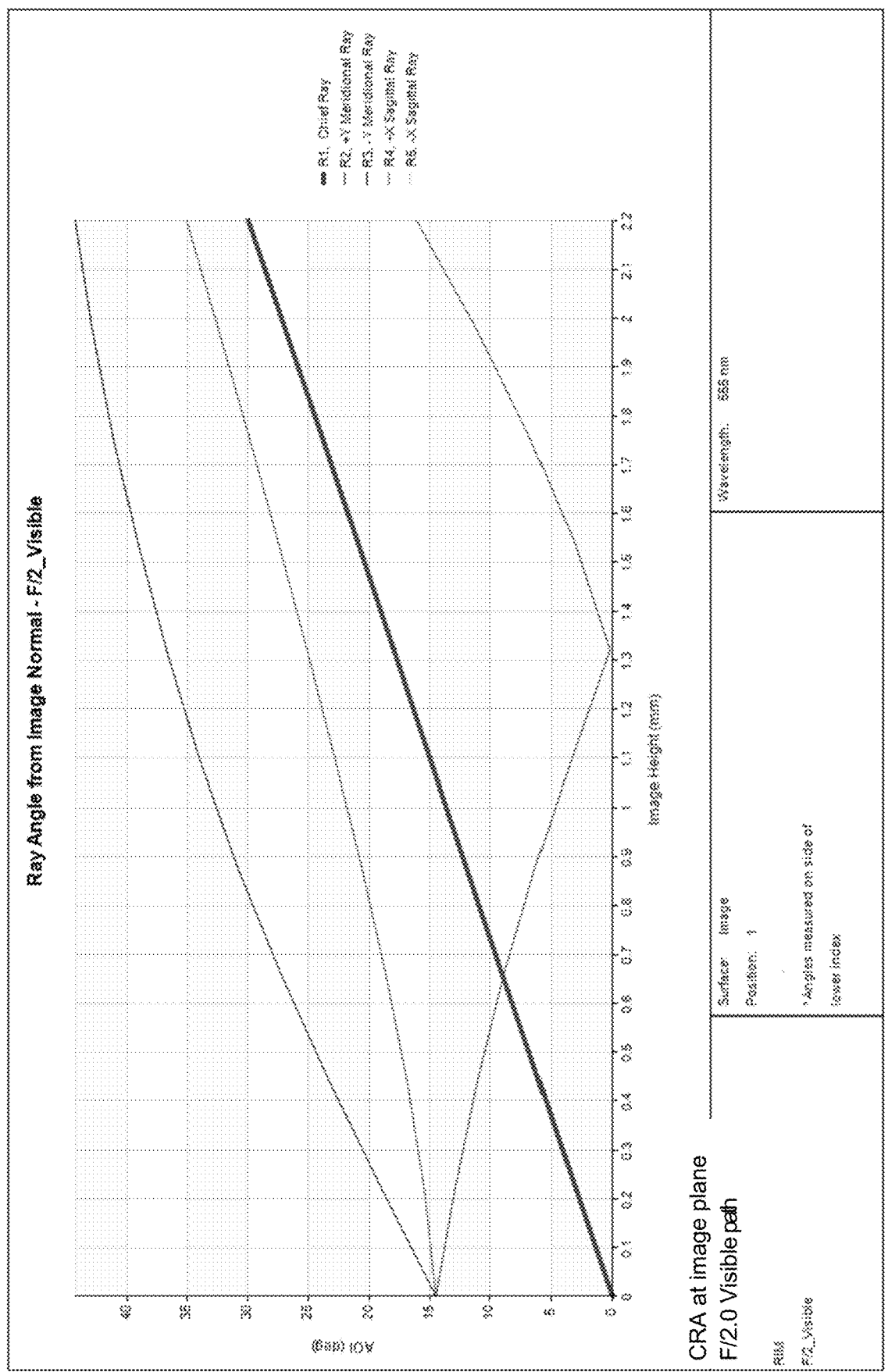
FIGS. 10A and 10B are graphs of the chief ray angle (CRA) for the visible and NIR light paths of an example optical system as illustrated in FIGS. 1 through 3B, according to some embodiments.
Figure 10B:
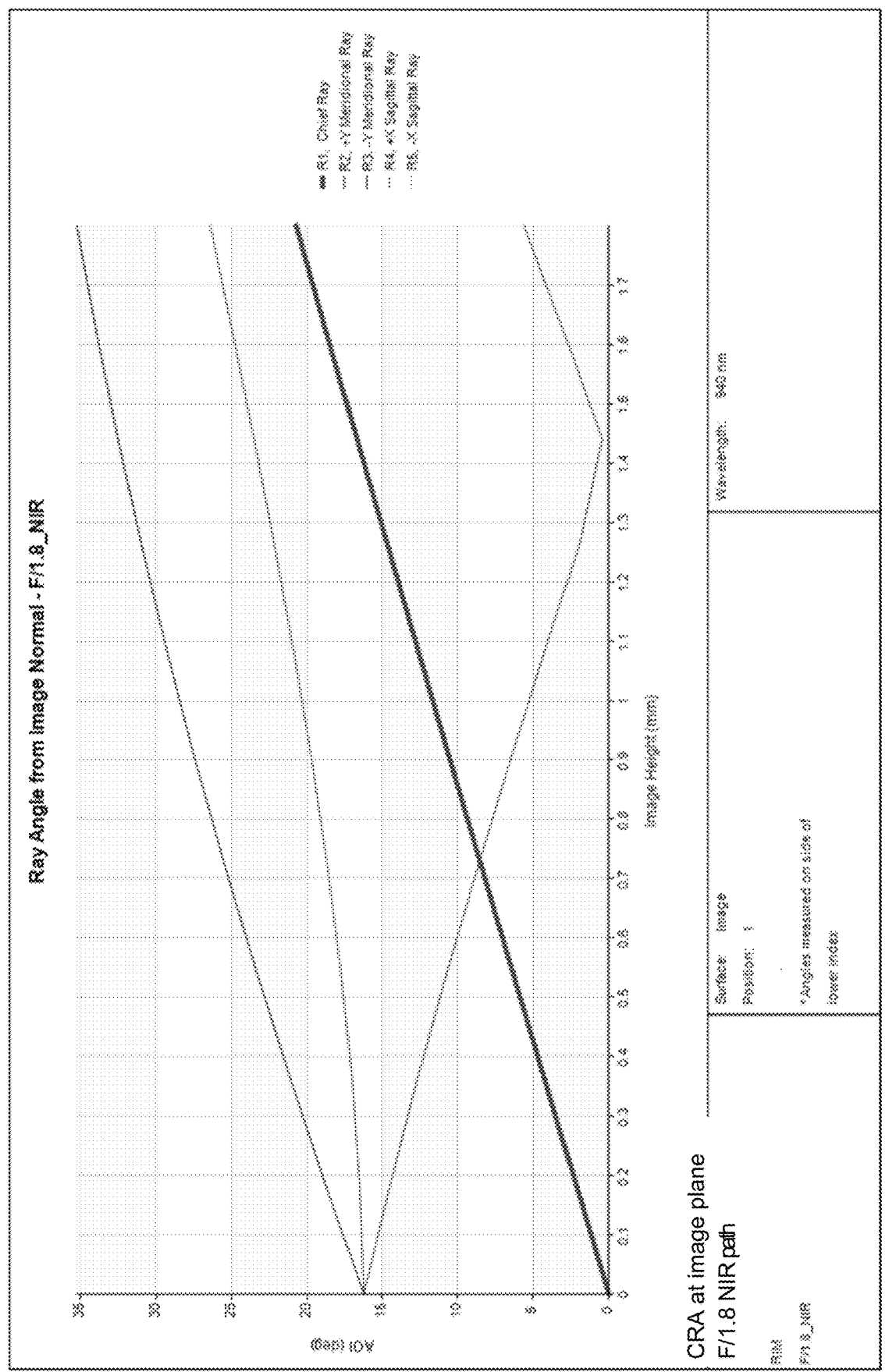
Figure 11A:
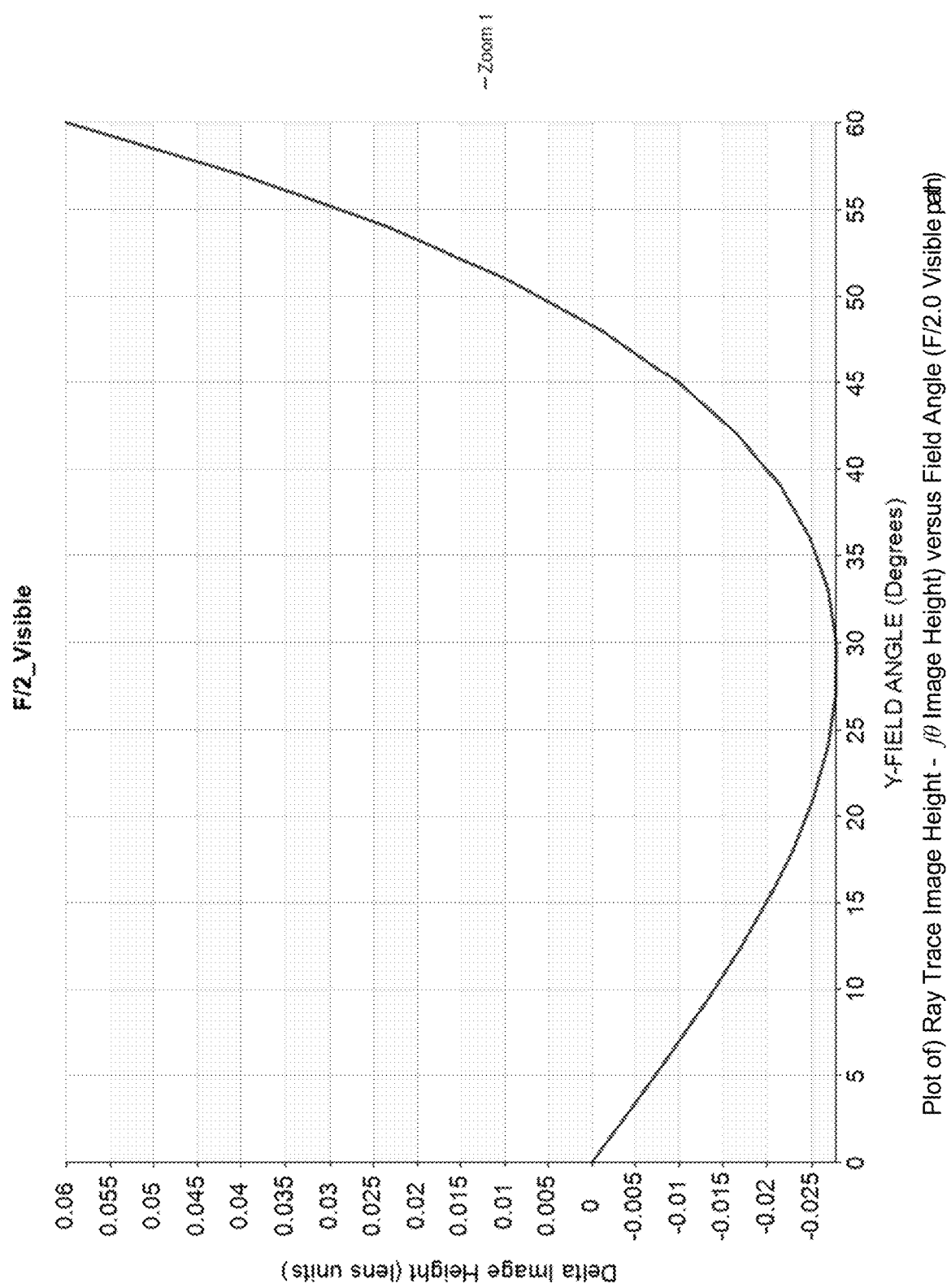
FIGS. 11A and 11B are graphs of (Ray Trace Image Height-fθ Image Height) versus Field Angle for the visible and NIR light paths of an example optical system as illustrated in FIGS. 1 through 3B, according to some embodiments.
Figure 11B:
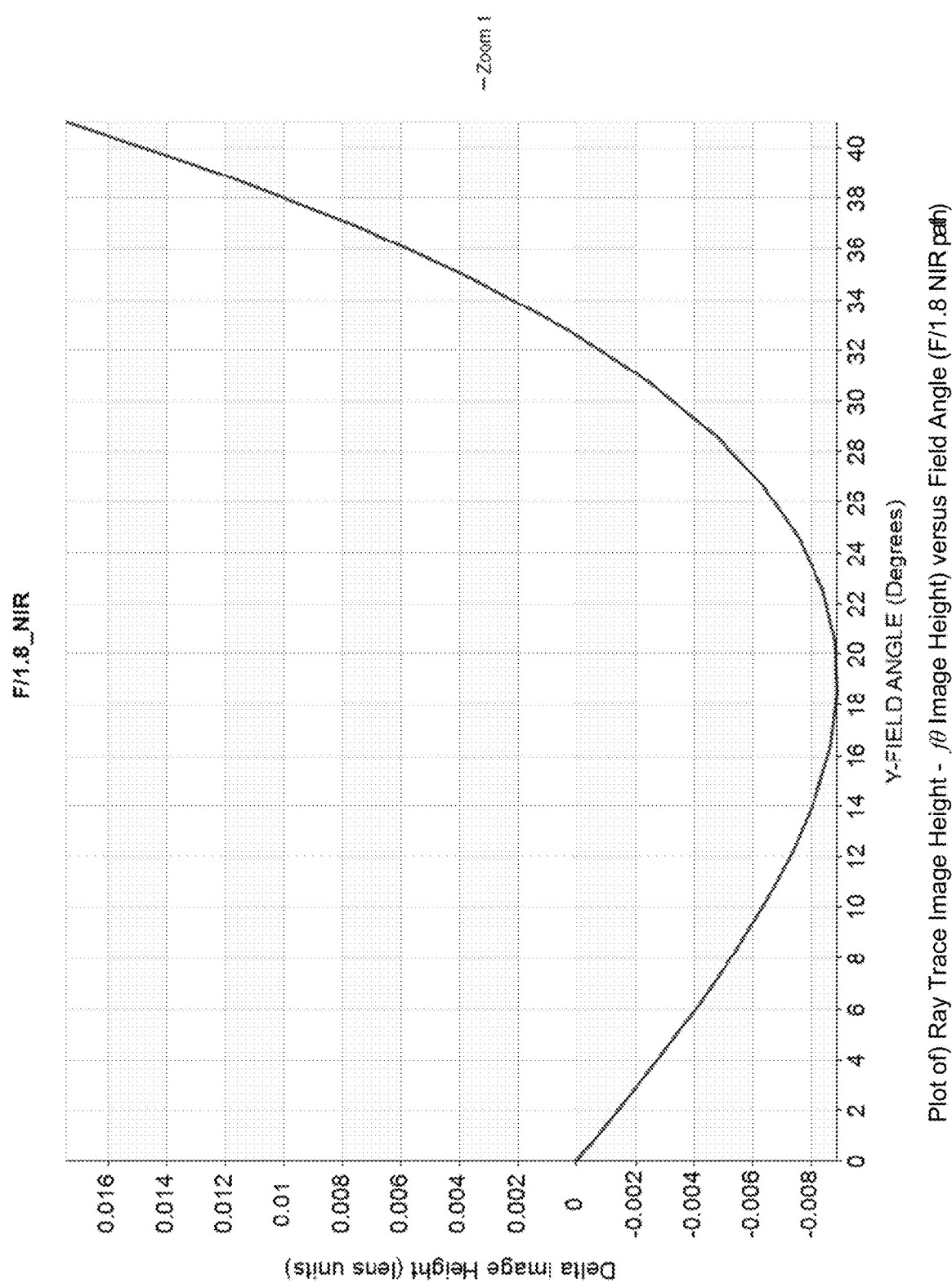
Figure 12A:
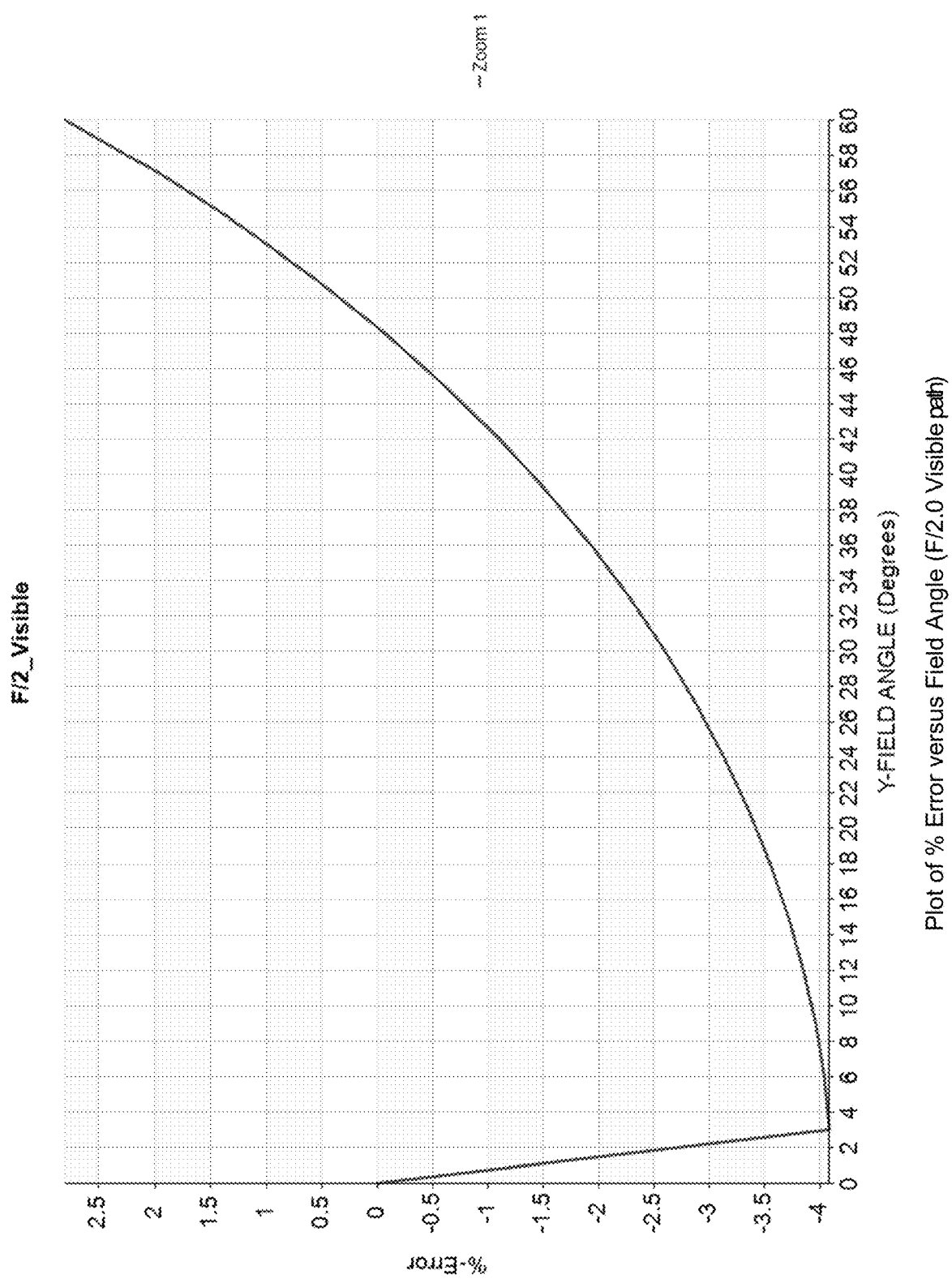
FIGS. 12A and 12B are graphs of % Error versus Field Angle for the visible and NIR light paths of an example optical system as illustrated in FIGS. 1 through 3B, according to some embodiments.
Figure 12B:
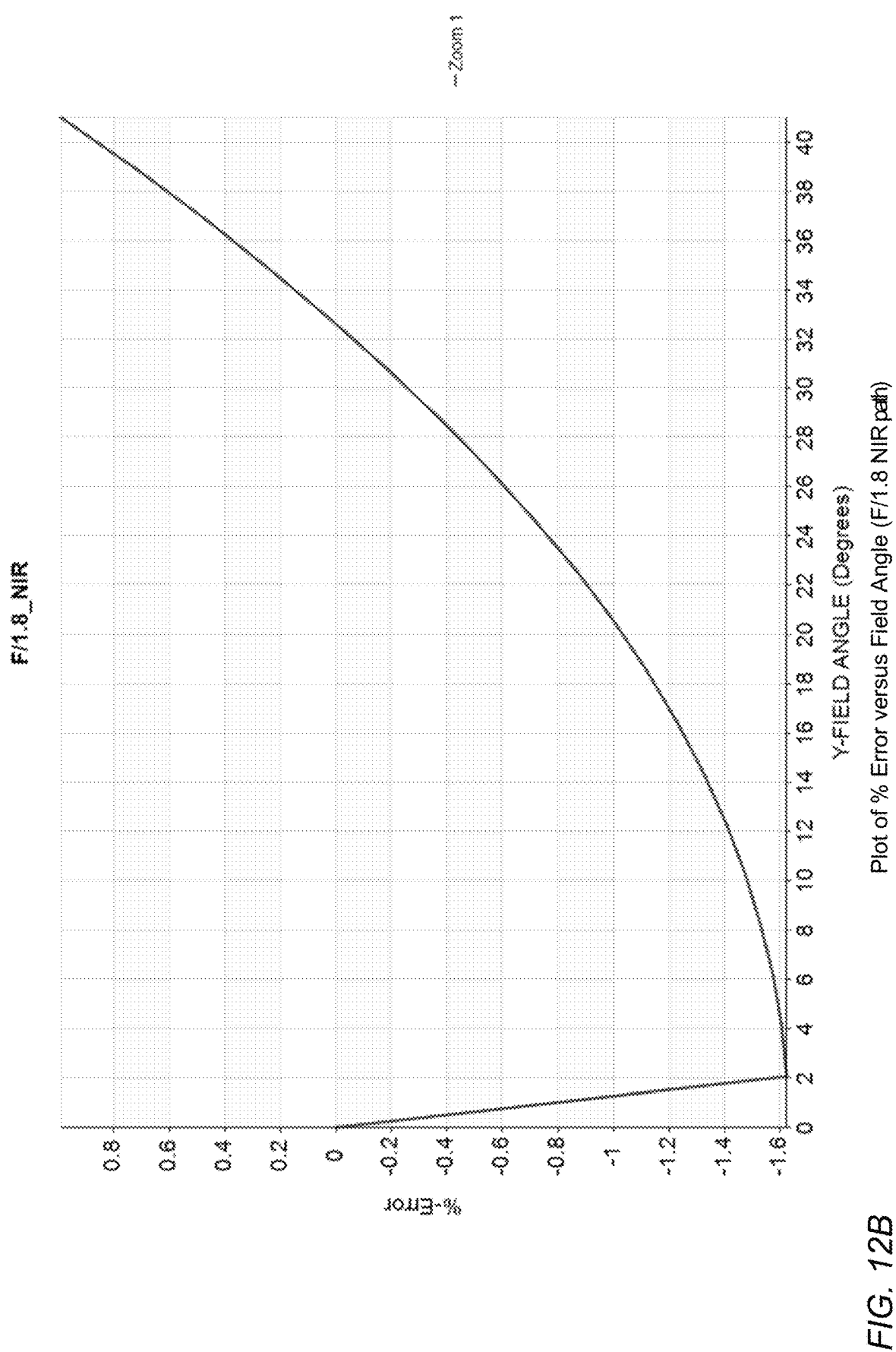
Figure 13A:
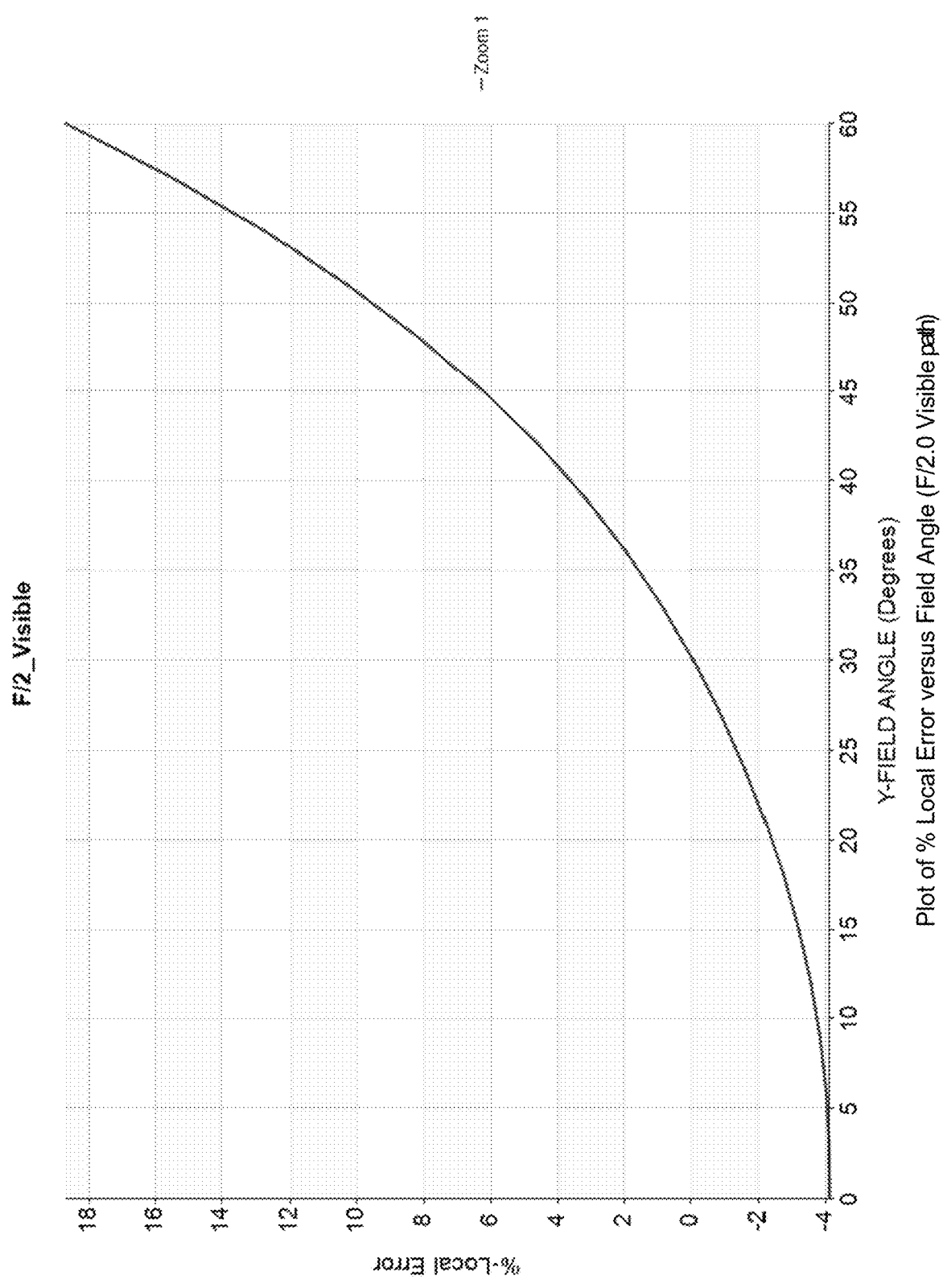
FIGS. 13A and 13B are graphs of % Local Error versus Field Angle for the visible and NIR light paths of an example optical system as illustrated in FIGS. 1 through 3B, according to some embodiments.
Figure 13B:
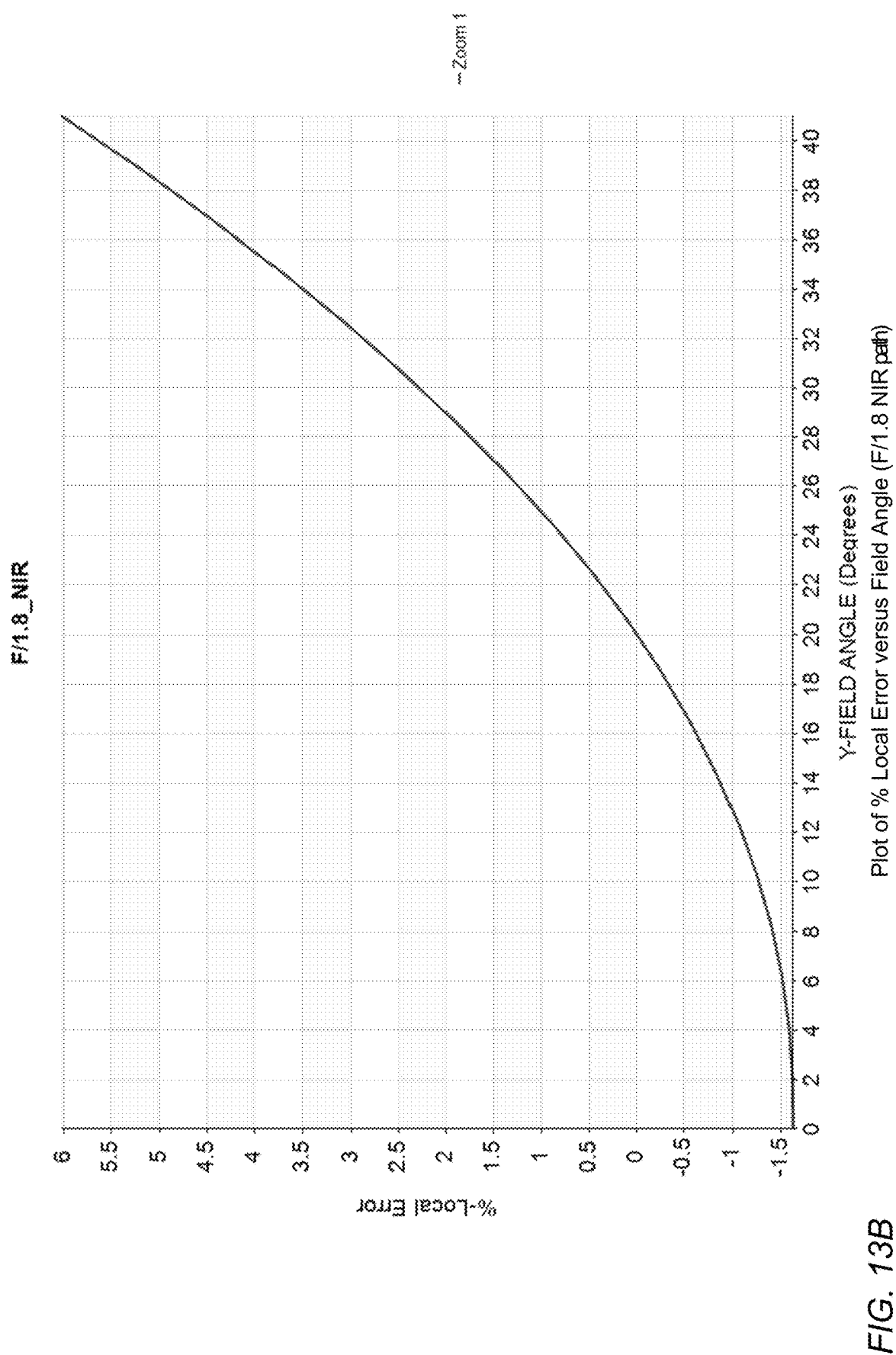

FIGS. 4A through 13B show various performance characteristics of the example embodiment previously described in reference to FIGS. 1 through 3B in which the visible light path used a 4.4 mm diagonal visible light sensor, and the visible light lens group 120 in combination with the front lens group 100 provides 1.96 mm EFL, F/2.0, with a 120 degree FOV at the visible light sensor, while the NIR light path uses a 3.6 mm diagonal NIR sensor, and the NIR light lens group 140 in combination with the front lens group 100 provides 2.42 mm EFL, F/1.8, with an 83.17 degree FOV at the NIR light sensor. In this embodiment, the lens elements in the two lens groups may be composed of the same plastic material; however all of the lens elements in the visible light lens group 120 have different design parameters, spacings, and optical characteristics than the corresponding lens elements in the NIR light lens group 140. FIGS. 4A and 4B are graphs of the modulation transfer function (MTF) vs. spatial frequency for the visible and NIR light paths of the example optical system. FIGS. 5A and 5B are graphs of the MTF vs. image field for the visible and NIR light paths of the example optical system. FIGS. 6A and 6B are graphs of through-focus MTF at Nyquist frequency 4 (Ny/4) for the visible and NIR light paths of the example optical system. FIGS. 7A and 7B are graphs of through-focus MTF at Ny/2 for the visible and NIR light paths of the example optical system. FIGS. 8A and 8B are graphs of longitudinal spherical aberration (LSA), astigmatic field curves (AST), and distortion (DST) for the visible and NIR light paths of the example optical system. FIGS. 9A and 9B are graphs of relative illumination for the visible and NIR light paths of the example optical system. FIGS. 10A and 10B are graphs of the chief ray angle (CRA) for the visible and NIR light paths of the example optical system. FIGS. 11A and 11B are graphs of (Ray Trace Image Height-fθ Image Height) versus Field Angle for the visible and NIR light paths of the example optical system. FIGS. 12A and 12B are graphs of % Error versus Field Angle for the visible and NIR light paths of the example optical system. FIGS. 13A and 13B are graphs of % Local Error versus Field Angle for the visible and NIR light paths of the example optical system.

Tables 1A and 1B are tables of visible distortion—scan linearity for the visible and NIR light paths of the example optical system. In Tables 1A and 1B:

A is fraction of angle in object space
B is chief ray angle
C is Ray trace image height
D is f-theta=(calibrated FL)*(B*p/180)
$E_i = 100*[(C_i/D_i)-1]$
$F_i = 100*\{[(C_i-C_{i-1})]/[(D_i-D_{i-1})]-1\}$

TABLE 1A

F/2.0 Visible Light Path Distortion - Scan Linearity
Calibrated Focal Length = 2.0431

| Relative field height A | Angle (degrees) B | Image height C | Reference image height D | Error (percent) E | Local error (percent) F |
|---|---|---|---|---|---|
| 0.00 | 0.0000 | 0.000000 | 0.000000 | 0.0000 | −4.1027 |
| 0.05 | 3.0000 | 0.102606 | 0.106978 | −4.0872 | −4.0872 |
| 0.10 | 6.0000 | 0.205311 | 0.213956 | −4.0408 | −3.9945 |
| 0.15 | 9.0000 | 0.308213 | 0.320934 | −3.9639 | −3.8100 |
| 0.20 | 12.0000 | 0.411409 | 0.427912 | −3.8568 | −3.5356 |
| 0.25 | 15.0000 | 0.514992 | 0.534890 | −3.7201 | −3.1734 |
| 0.30 | 18.0000 | 0.619054 | 0.641869 | −3.5544 | −2.7255 |
| 0.35 | 21.0000 | 0.723687 | 0.748847 | −3.3598 | −2.1926 |
| 0.40 | 24.0000 | 0.828982 | 0.855825 | −3.1365 | −1.5734 |
| 0.45 | 27.0000 | 0.935036 | 0.962803 | −2.8839 | −0.8632 |
| 0.50 | 30.0000 | 1.041958 | 1.069781 | −2.6008 | −0.0527 |
| 0.55 | 33.0000 | 1.149870 | 1.176759 | −2.2850 | 0.8732 |
| 0.60 | 36.0000 | 1.258919 | 1.283737 | −1.9333 | 1.9353 |
| 0.65 | 39.0000 | 1.369278 | 1.390715 | −1.5415 | 3.1606 |
| 0.70 | 42.0000 | 1.481155 | 1.497693 | −1.1043 | 4.5792 |
| 0.75 | 45.0000 | 1.594790 | 1.604671 | −0.6158 | 6.2225 |
| 0.80 | 48.0000 | 1.710453 | 1.711649 | −0.0699 | 8.1191 |
| 0.85 | 51.0000 | 1.828441 | 1.818628 | 0.5396 | 10.2911 |
| 0.90 | 54.0000 | 1.949064 | 1.925606 | 1.2183 | 12.7557 |
| 0.95 | 57.0000 | 2.072665 | 2.032584 | 1.9719 | 15.5383 |
| 1.00 | 60.0000 | 2.199651 | 2.139562 | 2.8085 | 18.7028 |

TABLE 1B

F/2.0 NIR Path Distortion - Scan Linearity
Calibrated Focal Length = 2.4538

| Relative field height A | Angle (degrees) B | Image height C | Reference image height D | Error (percent) E | Local error (percent) F |
|---|---|---|---|---|---|
| 0.00 | 0.0000 | 0.000000 | 0.000000 | 0.0000 | −1.6289 |
| 0.05 | 2.0500 | 0.086370 | 0.087794 | −1.6228 | −1.6228 |
| 0.10 | 4.1000 | 0.172772 | 0.175589 | −1.6043 | −1.5859 |
| 0.15 | 6.1500 | 0.259239 | 0.263383 | −1.5735 | −1.5120 |
| 0.20 | 8.2000 | 0.345804 | 0.351178 | −1.5303 | −1.4006 |
| 0.25 | 10.2500 | 0.432500 | 0.438972 | −1.4745 | −1.2514 |
| 0.30 | 12.3000 | 0.519360 | 0.526767 | −1.4060 | −1.0637 |
| 0.35 | 14.3500 | 0.606420 | 0.614561 | −1.3247 | −0.8368 |
| 0.40 | 16.4000 | 0.693714 | 0.702356 | −1.2303 | −0.5697 |
| 0.45 | 18.4500 | 0.781279 | 0.790150 | −1.1227 | −0.2617 |
| 0.50 | 20.5000 | 0.869151 | 0.877945 | −1.0016 | 0.0882 |
| 0.55 | 22.5500 | 0.957368 | 0.965739 | −0.8669 | 0.4808 |
| 0.60 | 24.6000 | 1.045967 | 1.053534 | −0.7182 | 0.9171 |
| 0.65 | 26.6500 | 1.134989 | 1.141328 | −0.5554 | 1.3978 |
| 0.70 | 28.7000 | 1.224472 | 1.229123 | −0.3783 | 1.9237 |
| 0.75 | 30.7500 | 1.314457 | 1.316917 | −0.1868 | 2.4949 |
| 0.80 | 32.8000 | 1.404984 | 1.404712 | 0.0194 | 3.1119 |
| 0.85 | 34.8500 | 1.496092 | 1.492506 | 0.2402 | 3.7743 |
| 0.90 | 36.9000 | 1.587821 | 1.580301 | 0.4759 | 4.4820 |
| 0.95 | 38.9500 | 1.680210 | 1.668095 | 0.7263 | 5.2331 |
| 1.00 | 41.0000 | 1.773296 | 1.755890 | 0.9913 | 6.0268 |

Figure 14A:
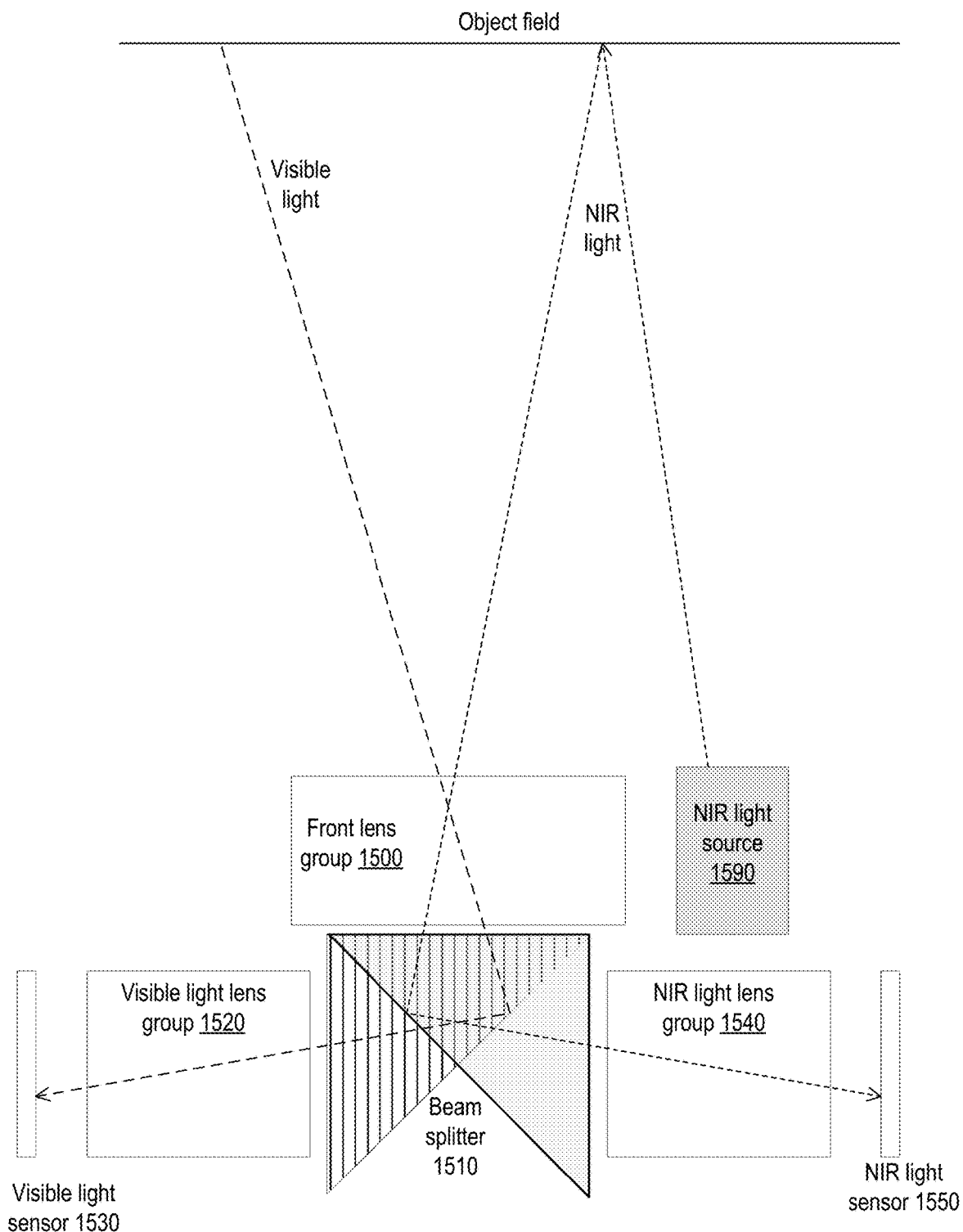
FIGS. 14A and 14B illustrate components of an optical system as illustrated in FIGS. 1 through 3B with an NIR light source, according to some embodiments.
Figure 14B:
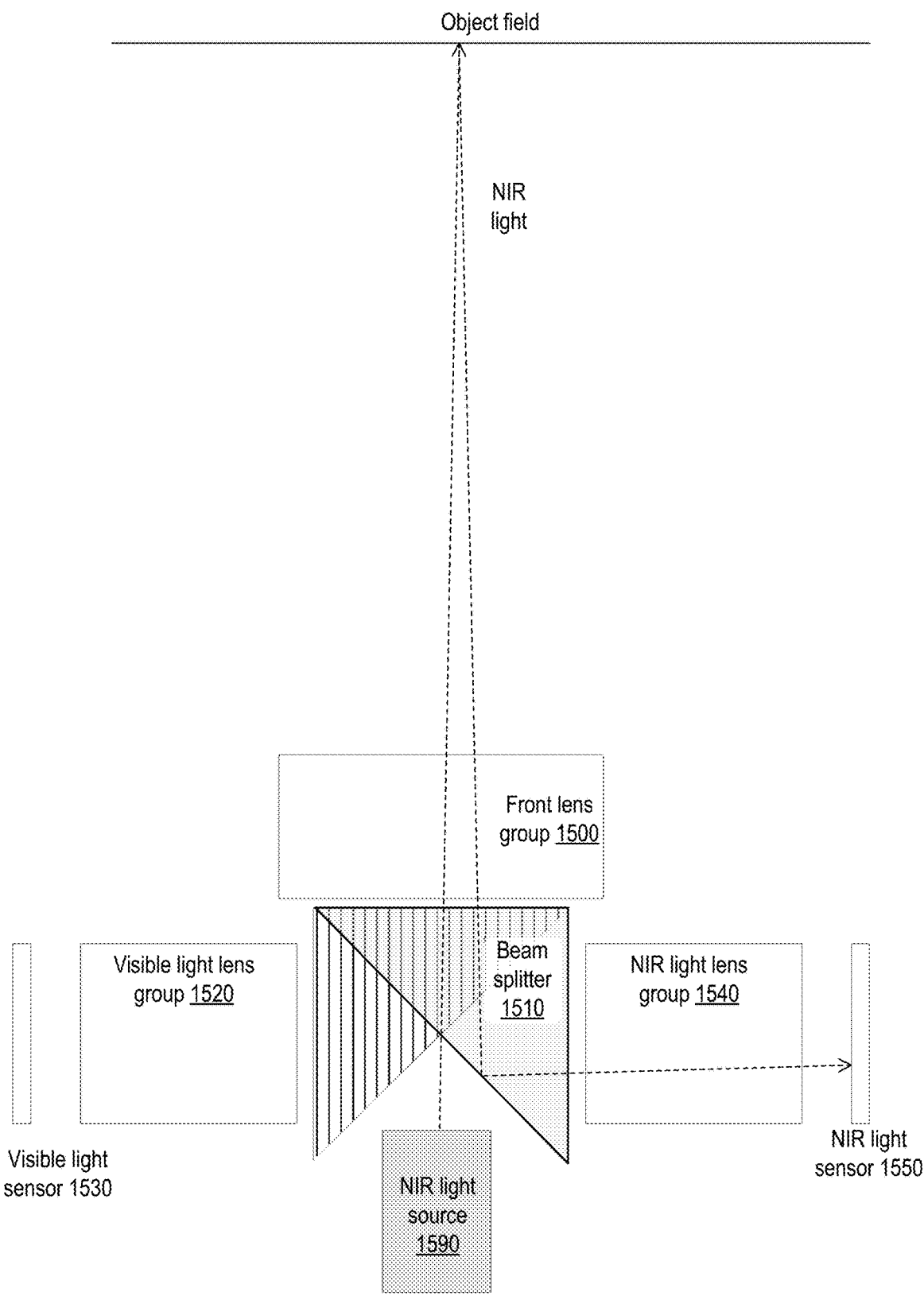

FIGS. 14A and 14B illustrate components of an optical system as illustrated in FIGS. 1 through 3B with an NIR light source, according to some embodiments. FIG. 14A shows an example where an NIR light source 1590 (e.g., one or more NIR-emitting lasers or LEDs) is positioned outside the optical system. The NIR light source 1590 emits NIR light towards an object field; a portion of the NIR light is reflected to the optical system, captured by the front lens group 1500, refracted to the beam splitter 1510, and reflected to the NIR lens group 1540 which refracts the light to the NIR light sensor 1550. Visible light from the object field is captured by the front lens group 1500, refracted to the beam splitter 1510, and reflected to the visible light lens group 1520 which refracts the light to the visible light sensor 1530. FIG. 14B shows an example where an NIR light source 1590 (e.g., one or more NIR-emitting lasers or LEDs) is located inside the optical system. The NIR light source 1590 emits NIR light through the beam splitter 1510 and front lens group 1500 towards an object field; a portion of the NIR light is reflected to the optical system, captured by the front lens group 1500, refracted to the beam splitter 1510, and reflected to the NIR lens group 1540 which refracts the light to the NIR light sensor 1550. Note that the location of the NIR light source 1590 in the optical system may be different; for example, the NIR light source 1590 may instead be located at or near the NIR light sensor 1550, and the NIR light may be reflected off the beam splitter 1510 surface through the front lens group 1500 towards the object field.

Figure 14C:
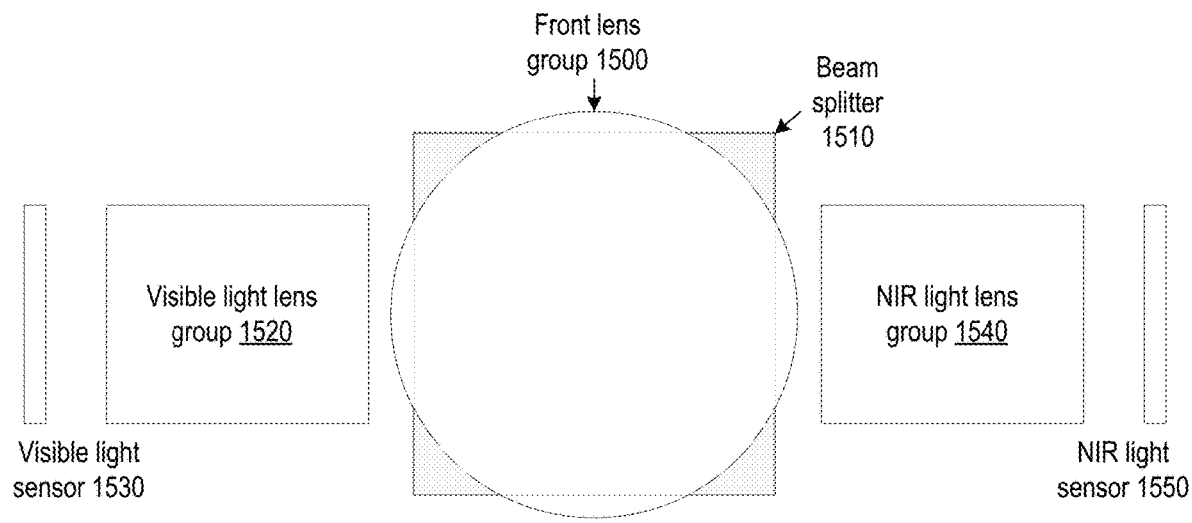
FIGS. 14C and 14D illustrate different configurations for the lens groups of an optical system as illustrated in FIGS. 1 through 3B, according to some embodiments.
Figure 14D:
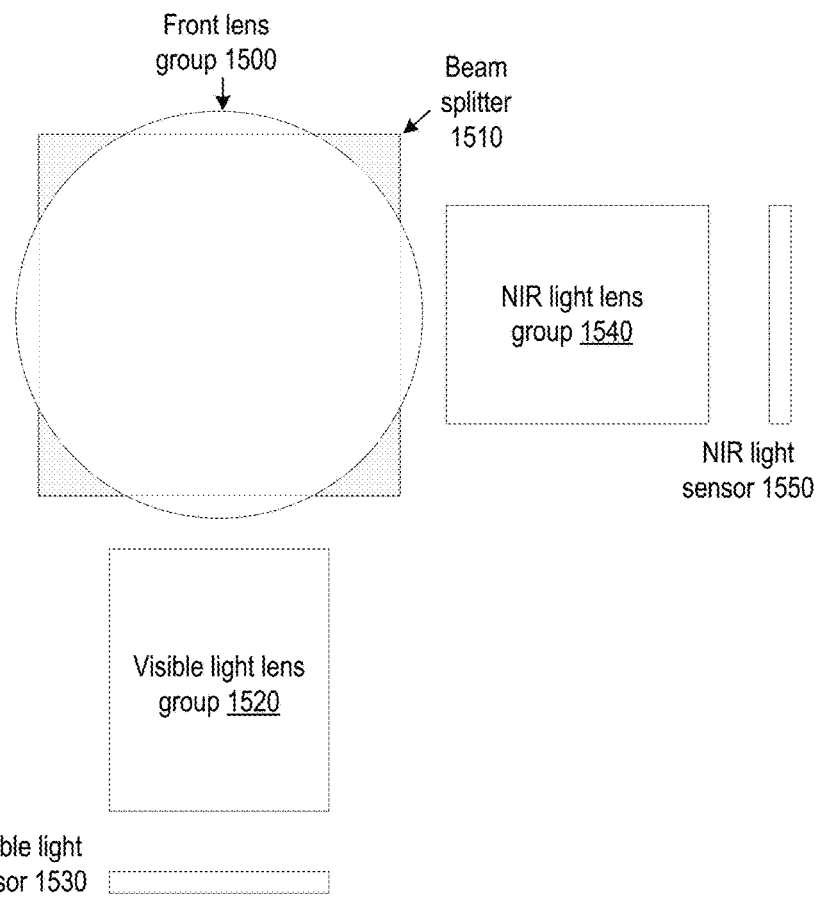

FIGS. 14C and 14D illustrate different configurations for the lens groups of an optical system as illustrated in FIGS. 1 through 3B, according to some embodiments. In some embodiments, the beam splitter 1510 may be configured so that visible light is reflected towards the visible light lens group 1520 at a 90 degree angle from the optical axis of the front lens group, and NIR light is reflected towards the NIR light lens group 1540 at a 90 degree angle from the optical axis of the front lens group. As shown in FIG. 14C, in some embodiments, viewed from above, the NIR light lens group 1540 may be positioned at 180 degrees from the visible light lens group 1520. However, depending on packaging requirements, the beam splitter 1510 may be configured so that the two lens groups are positioned differently, for example at an angle of 90 degrees when viewed from above as shown in FIG. 14D.

Figure 15:
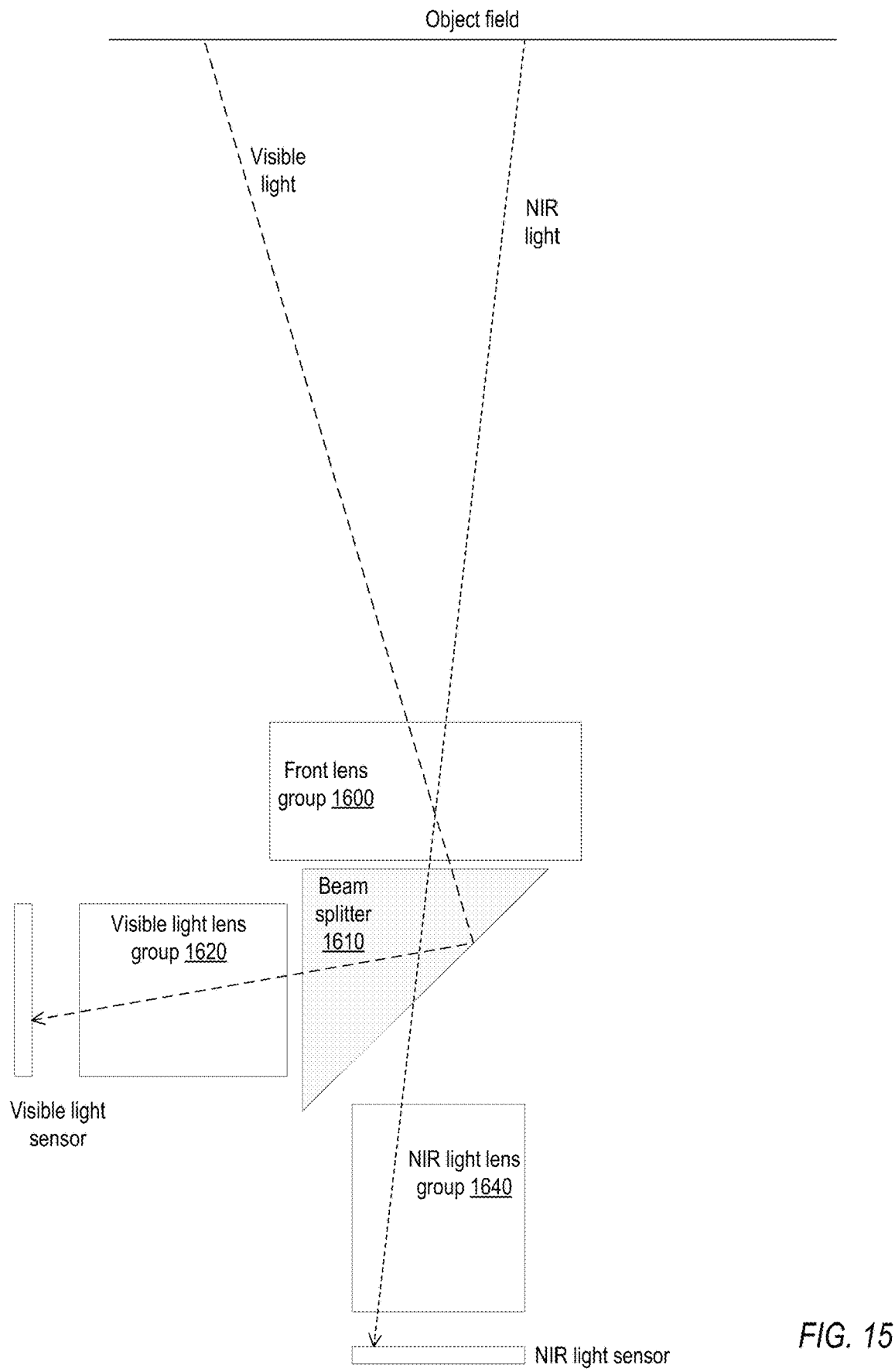
FIG. 15 illustrates an example alternative arrangement of components of an optical system, according to some embodiments.

FIG. 15 illustrates an example alternative arrangement of components of an optical system, according to some embodiments. In this example, beam splitter 1610 may include a single prism that includes a surface that reflects visible light from the front lens group 1600 towards the visible light lens group 1620 and passes NIR light to the NIR light lens group 1640, or alternatively that reflects NIR light towards the NIR light lens group 1640 and passes visible light to the visible lens group 1620.

Figure 16:
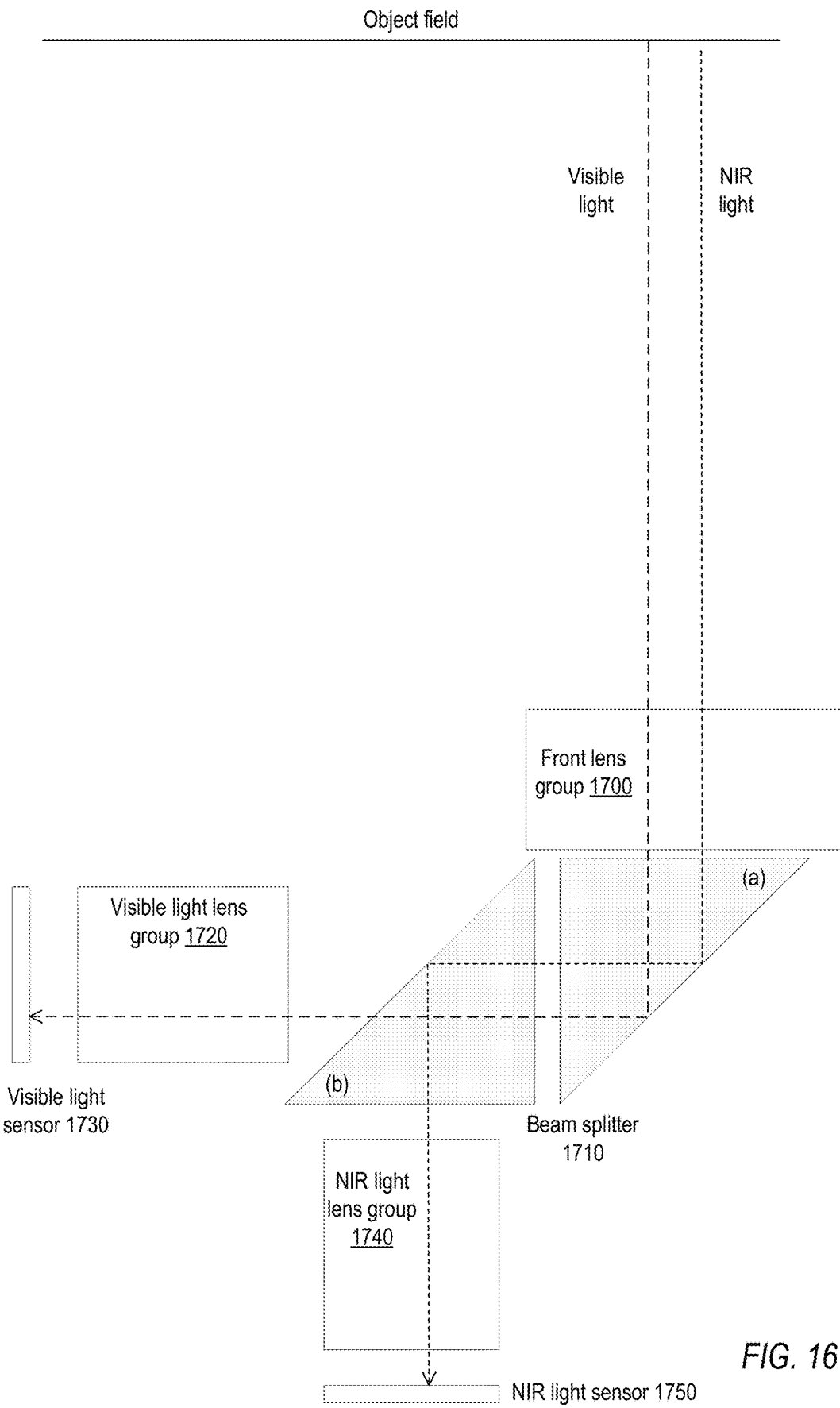
FIG. 16 illustrates another example alternative arrangement of components of an optical system, according to some embodiments.

FIG. 16 illustrates another example alternative arrangement of components of an optical system, according to some embodiments. In this example, the beam splitter 1710 may include a prism (a) that includes a surface that reflects light from the front lens group 1700 towards a second prism (b) that reflects NIR light towards the NIR light lens group 1740 and passes visible light to the visible light lens group 1720, or alternatively that reflects visible light towards the visible light lens group 1720 and passes NIR light to the NIR light lens group 1740.

Figure 17:
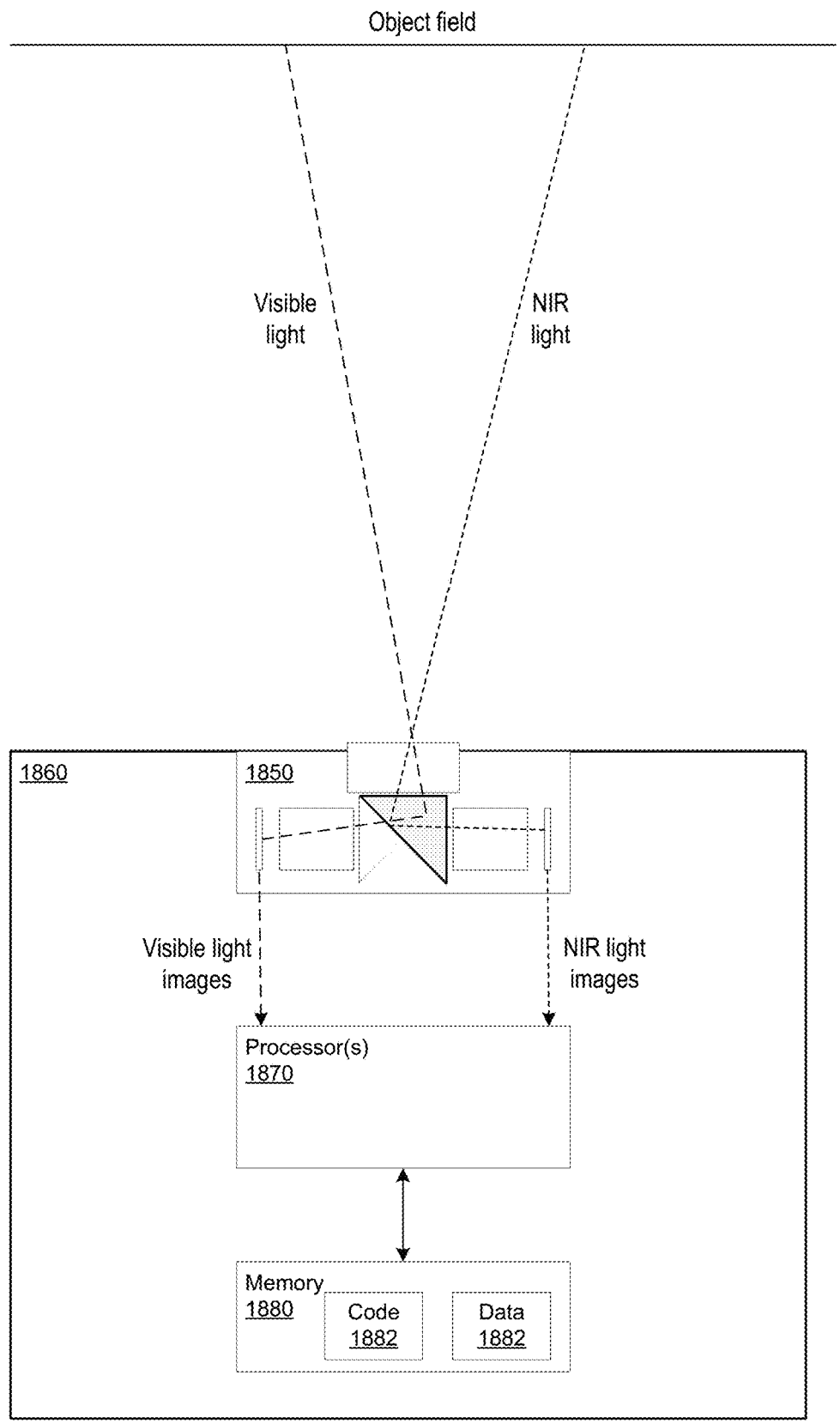
FIG. 17 illustrates an example system or device that includes a camera that implements an optical system as described herein to capture visible and NIR images for processing, according to some embodiments.

FIG. 17 illustrates an example system or device that includes a camera 1850 that implements an optical system as described herein to capture visible and NIR images for processing, according to some embodiments. A system or device 1860 may include at least one camera 1850 that implements an optical system as illustrated in FIGS. 1 through 3B. The system may also include one or more processors 1870 and a memory 1880 that stores code 1882 and data 1884 for processing images captured by the camera 1850. The camera 1850 captures NIR and visible light images and passes the images to the processor(s) for processing. The visible light and NIR light images captured using embodiments of the optical system can be used in a number of applications, for example applications that analyze the visible light image to locate objects in the object field and the NIR light image to provide depth information for the located objects.

Figure 18:
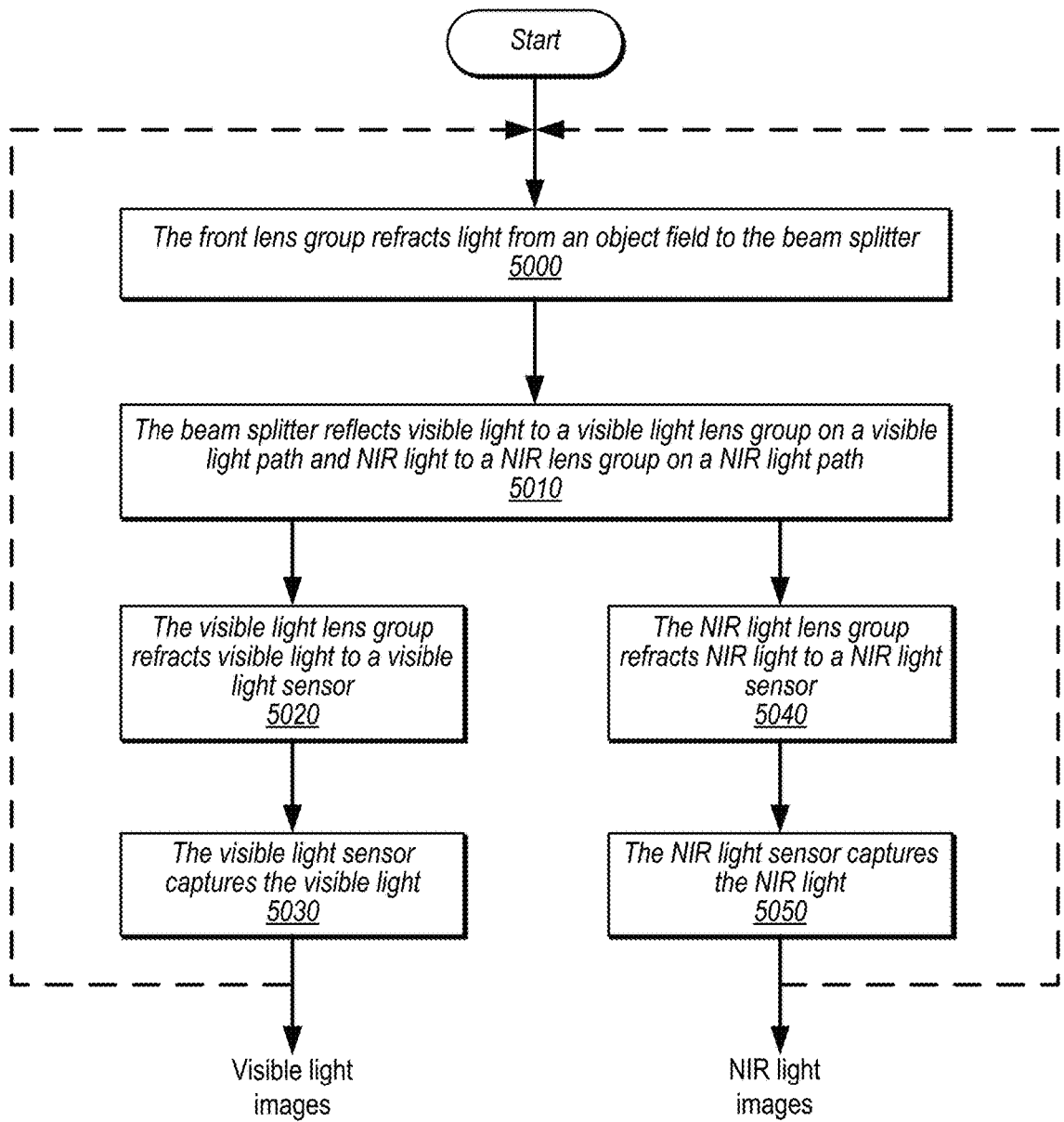
FIG. 18 is a high-level flowchart of a method for capturing visible and NIR images using an optical system as described herein, according to some embodiments.

FIG. 18 is a high-level flowchart of a method for capturing visible and NIR images using a camera that includes an optical system as described herein, according to some embodiments. As indicated at 5000, the front lens group refracts light from an object field to the beam splitter. As indicated at 5010, the beam splitter reflects visible light to a visible light lens group on a visible light path and reflects NIR light to a NIR lens group on a NIR light path. On the visible light path, at 5020, the visible light lens group refracts the visible light to a visible light sensor, and at 5030, the visible light sensor captures the visible light to generate a visible light image. On the NIR light path, at 5040, the NIR light lens group refracts the NIR light to a NIR light sensor, and at 5050, the NIR light sensor captures the NIR light to generate a NIR light image. As indicated by the dashed arrows returning from elements 5030 and 5050 to element 5000, in some embodiments, the camera may continue to capture visible and NIR light images at a frame rate, for example 30 or 60 frames per second.

The visible light and NIR light images may be passed to one or more software applications and/or hardware components for processing. The visible light and NIR light images captured using embodiments of the optical system can be used in a number of applications, for example applications that analyze the visible light image to locate objects in the object field and the NIR light image to provide depth information for the located objects.

Example Embodiments

FIGS. 19A through 28D show several example embodiments of optical systems that provide multiple optical paths to capture images of an object field in different portions of the light spectrum. The optical systems include a front lens group that captures visible and near-infrared (NIR) light from an object field and refracts the light to a beam splitter that splits the visible light and the NIR light onto two paths. On the visible light path, a visible light lens group refracts the visible light to form an image of the object field at a visible light sensor. On the NIR light path, a NIR light lens group refracts the NIR light to form an image of the object field at an NIR light sensor. The front lens group, beam splitter, and visible light lens group may collectively be referred to as a visible imaging system. In some embodiments, an aperture stop may be located between the beam splitter and the visible light lens group. However, in some embodiments, the aperture stop may be located elsewhere in the visible light lens group, for example between a first (object side) lens element and a second lens element. The front lens group, beam splitter, and NIR light lens group may collectively be referred to as a NIR imaging system. In some embodiments, an aperture stop may be located between the beam splitter and the NIR light lens group. However, in some embodiments, the aperture stop may be located elsewhere in the NIR light lens group, for example between a first (object side) lens element and a second lens element.

Tables 2A through 17B provide optical data and aspheric coefficients for the visible light imaging systems and the NIR light imaging systems shown in FIGS. 19A through 28D, according to some embodiments.

Figure 19D:
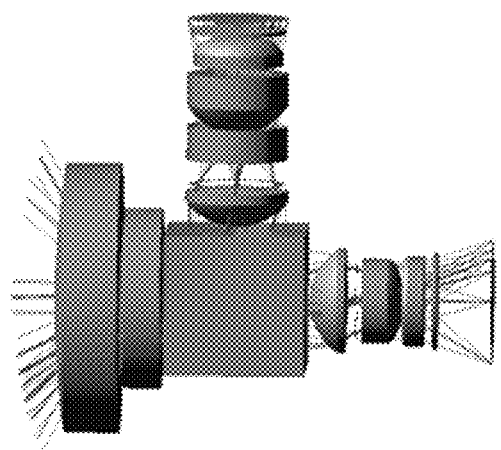
FIGS. 19D and 19E illustrate a second example optical system, according to some embodiments.

In some embodiments, for example, optical system 1900A of FIGS. 19A-19C, the beam splitter may be configured so that visible light is reflected towards the visible light lens group at a 90 degree angle from the optical axis of the front lens group, and NIR light is reflected towards the NIR light lens group at a 90 degree angle from the optical axis of the front lens group. Viewed from above, the NIR light lens group is positioned at 180 degrees from the visible light lens group. In other embodiments, for example, optical system 1900B of FIGS. 19D-19F, the beam splitter may be configured so that visible light passes through to the visible light lens group, and NIR light is reflected towards the NIR light lens group at a 90 degree angle from the optical axis of the front lens group. Viewed from above, the NIR light lens group is positioned at 90 degrees from the visible light lens group. However, note that other arrangements are possible.

In some embodiments, for example, optical systems 2000A and 2000B of FIGS. 20A-20F and optical systems 2100A and 2100B FIGS. 21A-21F, a second beam splitter may be located on the NIR light path to split the NIR light onto two paths, with an NIR filter and light sensor on each path. These examples may, for example, be used to capture light at different ranges of wavelengths within the NIR range.

In some embodiments, for example, optical systems 2200A and 2200B of FIGS. 22A-22D and optical systems 2300A and 2300B of FIGS. 23A-23D, a mirror may be located on the NIR light path between the NIR lens group and the NIR light sensor to redirect the NIR light from one axis to another axis.

FIGS. 19A and 19B show a three-dimensional view and a two-dimensional view, respectively, of an example optical system 1900A, according to some embodiments. As shown in FIG. 19C, the beam splitter may be configured so that visible light is reflected towards the visible light lens group at a 90 degree angle from the optical axis of the front lens group, and NIR light is reflected towards the NIR light lens group at a 90 degree angle from the optical axis of the front lens group. Viewed from above, the NIR light lens group is positioned at 180 degrees from the visible light lens group.

FIG. 19C shows the beam splitter used in optical system 1900A, according to some embodiments. The beam splitter includes prisms 1910A, 1910B, and 1910C that are formed as one unit. Prisms 1910A and 1910B as well as prisms 1910A and 1910C include a common surface that reflects/refracts or passes visible and NIR light. Prism 1910B includes a surface that reflects visible light. Prism 1910C includes a surface that reflects NIR light.

Figure 19E:
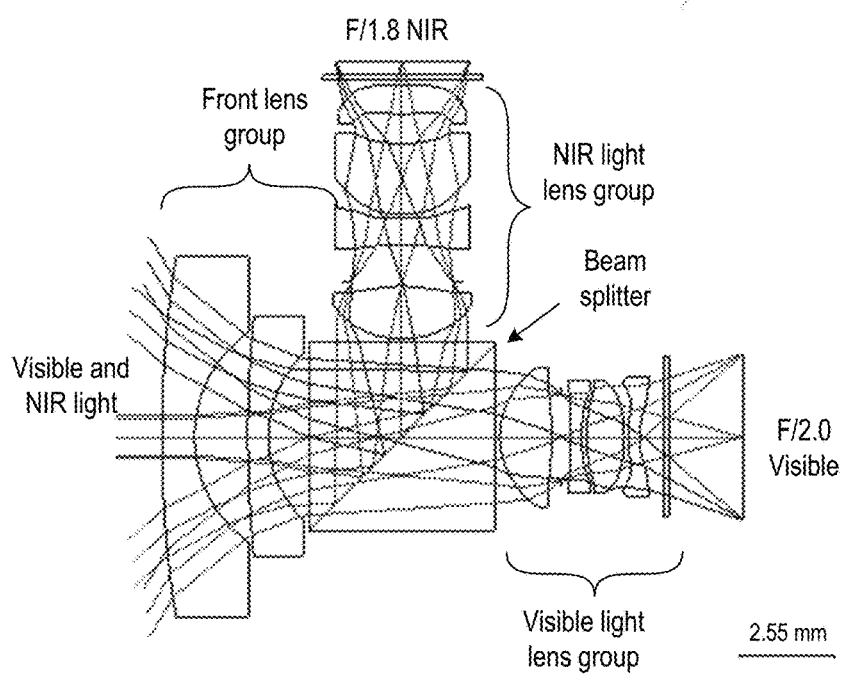

FIGS. 19D and 19E show a three-dimensional view and a two-dimensional view of an example optical system 1900B, according to some embodiments. As shown in FIG. 19C, the beam splitter may be configured so that visible light passes through to the visible light lens group, and NIR light is reflected towards the NIR light lens group at a 90 degree angle from the optical axis of the front lens group. Viewed from above, the NIR light lens group is positioned at 90 degrees from the visible light lens group.

Figure 19F:
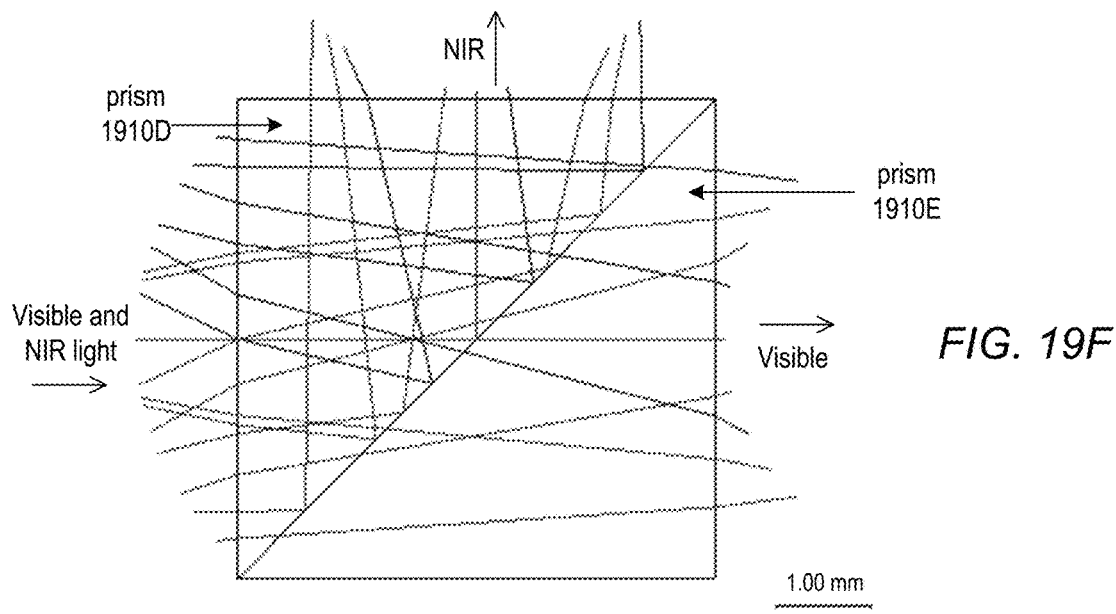
FIG. 19F illustrates a beam splitter used in the optical system of FIGS. 19C and 19D, according to some embodiments.

FIG. 19F shows the beam splitter used in optical system 1900B, according to some embodiments. The beam splitter includes two prisms 1900D and 1900E that are formed as one unit. Prisms 1900D and 1900E include a common surface that reflects the NIR light and passes the visible light. The optical coating on this common surface is commonly called a hot mirror coating.

Figure 19G:
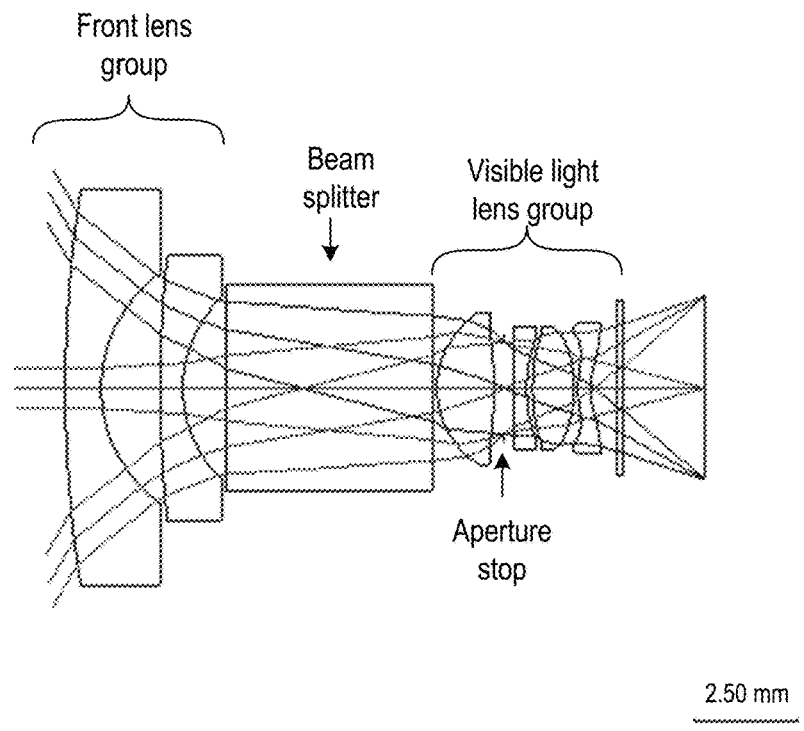
FIGS. 19G and 19H show the unfolded optical system layouts for the visible imaging system and the NIR imaging system of the first and second example optical systems, according to some embodiments.
Figure 19H:
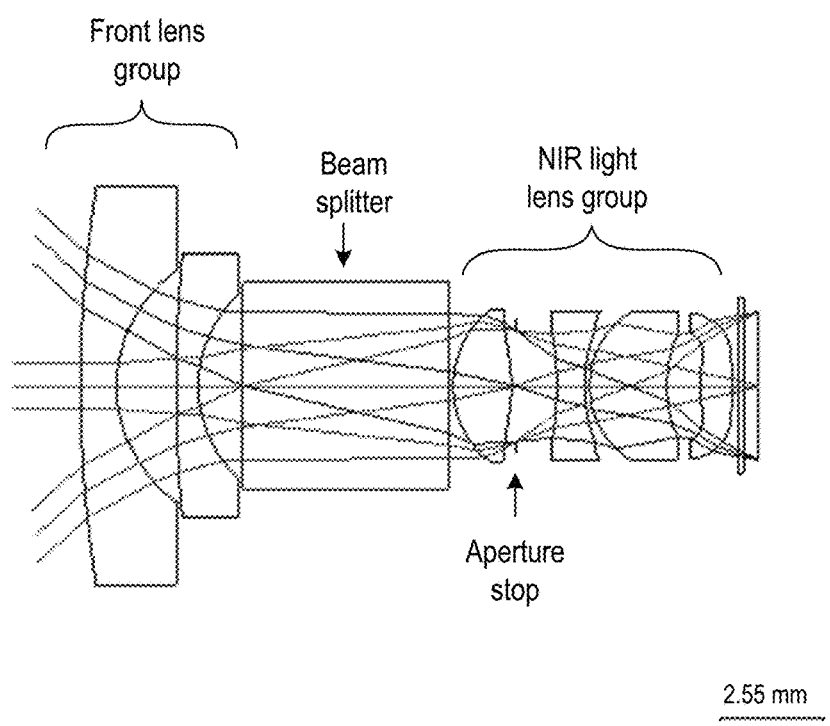

FIGS. 19G and 19H show the unfolded optical system layouts for the visible imaging system and the NIR imaging system, respectively, in optical systems 1900A and 1900B, according to some embodiments. Tables 2A-2B and 3A-3B provide optical data and aspheric coefficients for the visible light imaging system and the NIR light imaging system shown in FIGS. 19G and 19H, according to some embodiments.

Figure 20A:
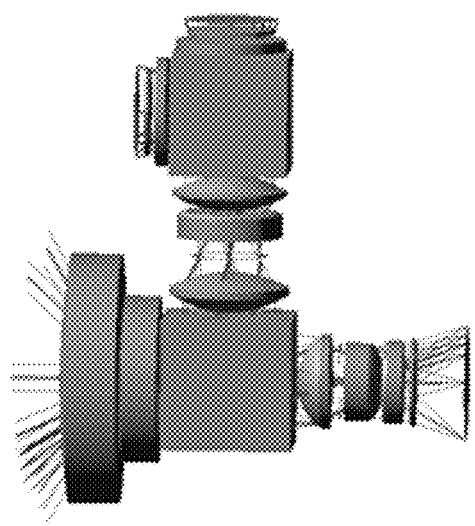
FIGS. 20A and 20B illustrate a third example optical system that includes a second beam splitter on the NIR path, according to some embodiments.
Figure 20B:
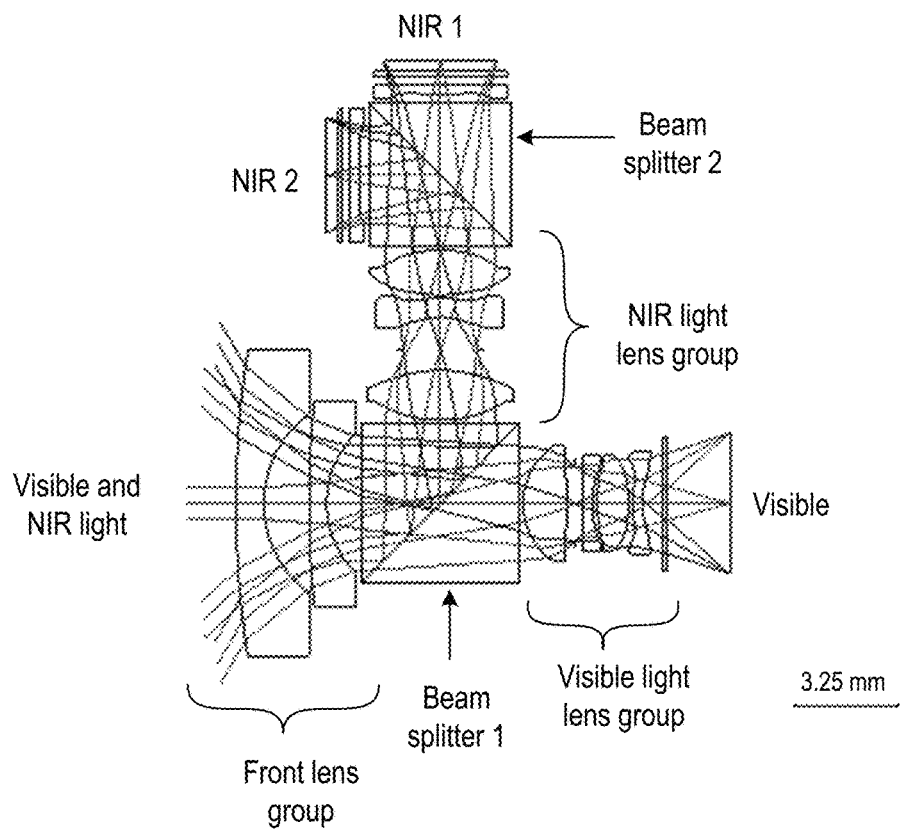
Figures 20C, 20D:
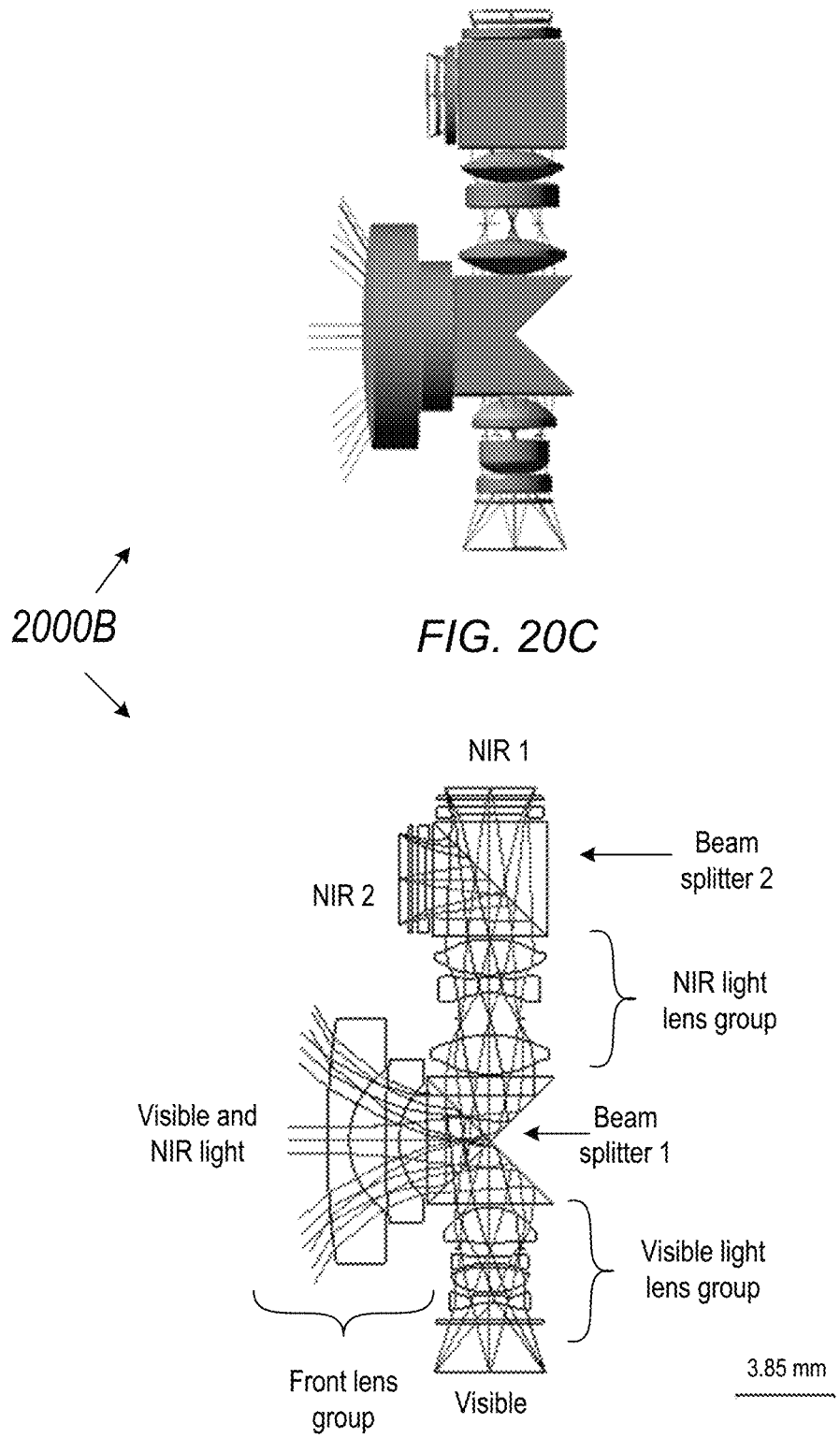
FIGS. 20C and 20D illustrate a fourth example optical system that includes a second beam splitter on the NIR path, according to some embodiments.

FIGS. 20A and 20B show a three-dimensional view and a two-dimensional view, respectively, of an example optical system 2000A, according to some embodiments. A beam splitter (beam splitter 1) similar to that shown in FIG. 19F may be used to split the light onto visible and NIR paths. FIGS. 20C and 20D show a three-dimensional view and a two-dimensional view, respectively, of an example optical system 2000B, according to some embodiments. A beam splitter (beam splitter 1) similar to that shown in FIG. 19C may be used to split the light onto visible and NIR paths. However, in optical systems 2000A and 2000B, a second beam splitter (beam splitter 2) similar to that shown in FIG. 19F may be located on the NIR light path to split the NIR light onto two paths, with an NIR filter and light sensor on each path. Note that, in other similar embodiments, beam splitter 2 and the second NIR sensor (NIR 2) may be rotated so that NIR 2 is located at other positions than that shown.

Figure 20E:
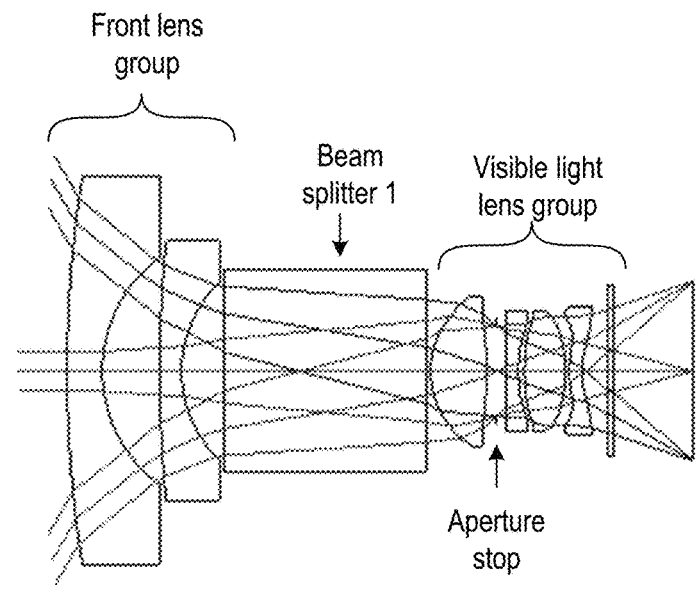
FIGS. 20E and 20F show the unfolded optical system layouts for the visible imaging system and the NIR imaging system of the third and fourth example optical systems, according to some embodiments.
Figure 20F:
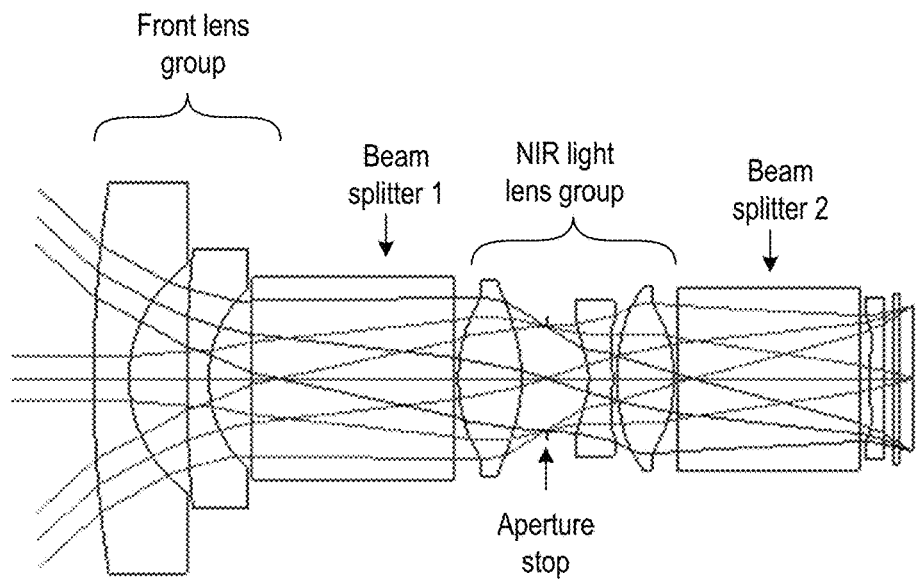

FIGS. 20E and 20F show the unfolded optical system layouts for the visible imaging system and the NIR imaging system, respectively, in optical systems 2000A and 2000B, according to some embodiments. In some embodiments, the F/2.0 visible imaging system shown in FIG. 20E may be identical in prescription to the visible imaging system shown in FIG. 19G. The F/1.8 NIR system may be configured to capture NIR light in the 852-1014 nm band, and provides a beam splitter 2 and NIR filters to image the object field at two NIR sensors (NIR 1 and NIR 2). In some embodiments, the F/1.8 NIR system may be configured to position or locate the NIR light source within this system, for example at one of the NIR focal planes, so that NIR light is emitted through the front lens group of the dual VIS-NIR system to the object field. Tables 4A and 4B provide optical data and aspheric coefficients for the NIR imaging system shown in FIG. 20F, according to some embodiments.

Figure 21A:
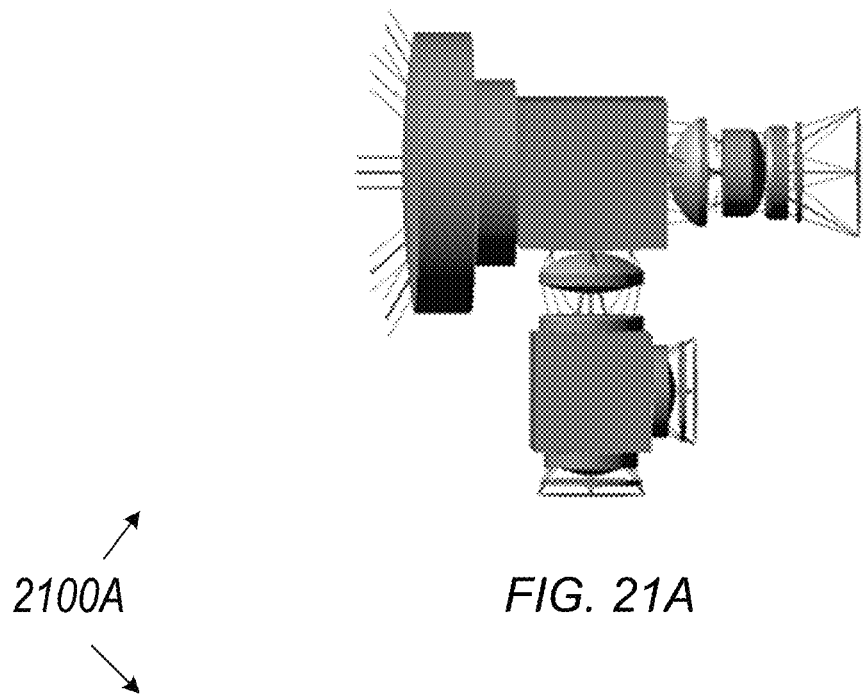
FIGS. 21A and 21B illustrate a fifth example optical system that includes a second beam splitter on the NIR path, according to some embodiments.
Figure 21B:
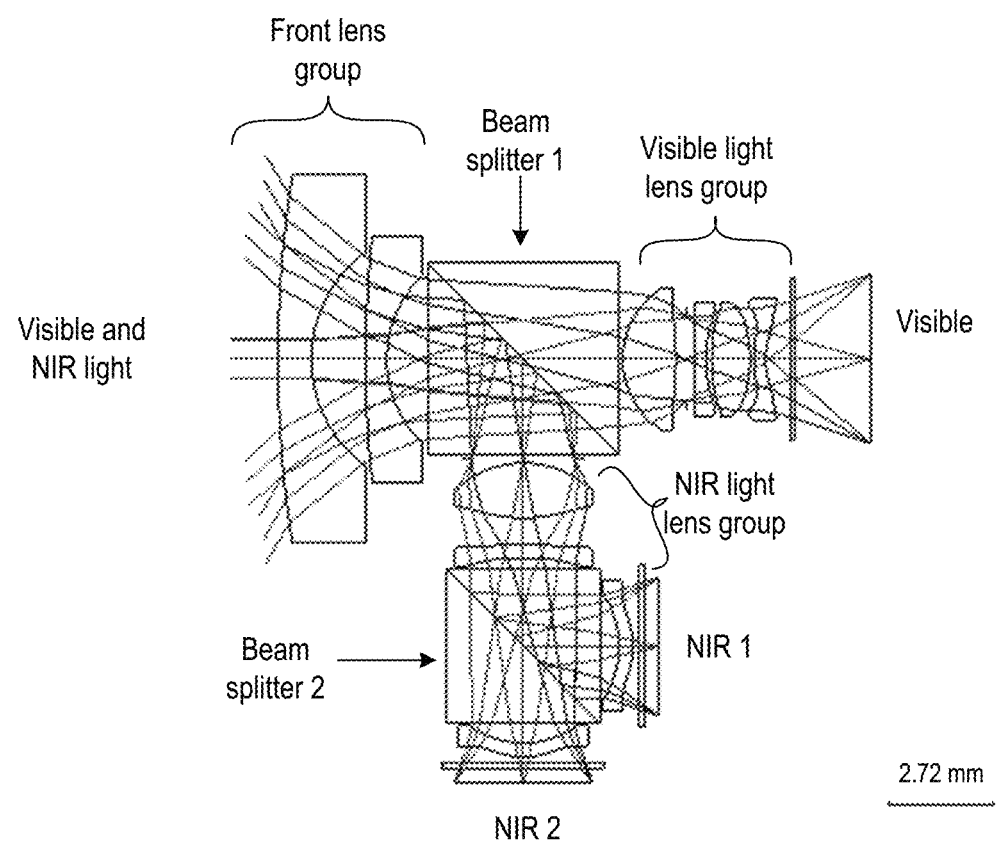
Figure 21C:
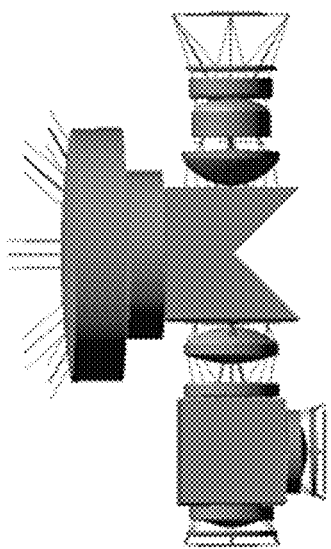
FIGS. 21C and 21D illustrate a sixth example optical system that includes a second beam splitter on the NIR path, according to some embodiments.
Figure 21D:
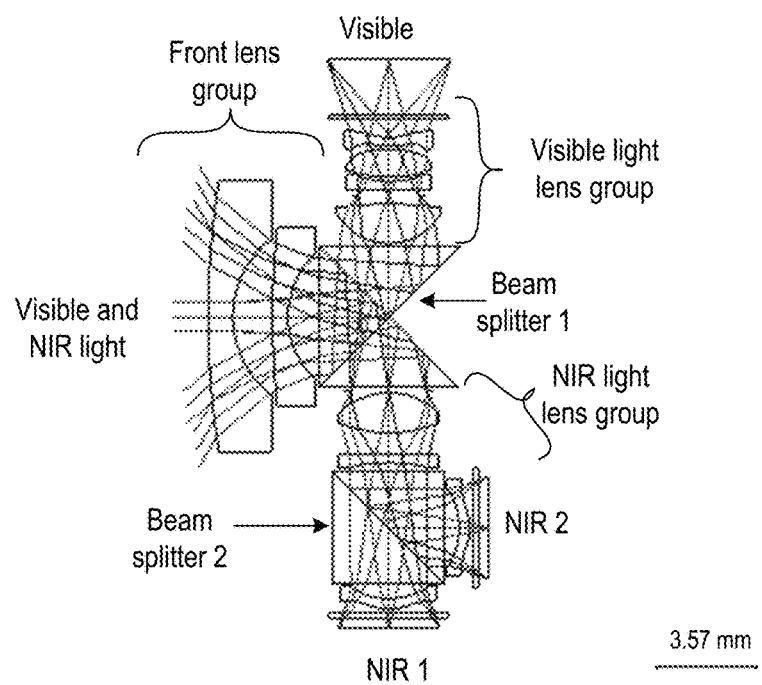

FIGS. 21A and 21B show a three-dimensional view and a two-dimensional view, respectively, of an example optical system 2100A, according to some embodiments. A beam splitter (beam splitter 1) similar to that shown in FIG. 19F may be used to split the light onto visible and NIR paths. FIGS. 21C and 21D show a three-dimensional view and a two-dimensional view, respectively, of an example optical system 2100B, according to some embodiments. A beam splitter (beam splitter 1) similar to that shown in FIG. 19C may be used to split the light onto visible and NIR paths. However, in optical systems 2100A and 2100B, a second beam splitter (beam splitter 2) similar to that shown in FIG. 19F may be located on the NIR light path to split the NIR light onto two paths, with an NIR filter and light sensor on each path to capture the respective range of wavelengths. Note that, in other similar embodiments, beam splitter 2 and the second NIR sensor (NIR 2) may be rotated so that NIR 2 is located at other positions than that shown.

Figure 21E:
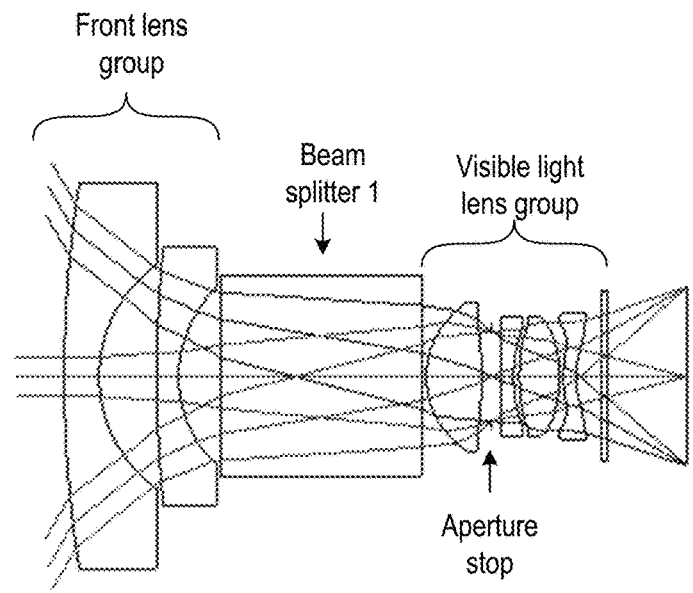
FIGS. 21E and 21F show the unfolded optical system layouts for the visible imaging system and the NIR imaging system of the fifth and sixth example optical systems, according to some embodiments.
Figure 21F:
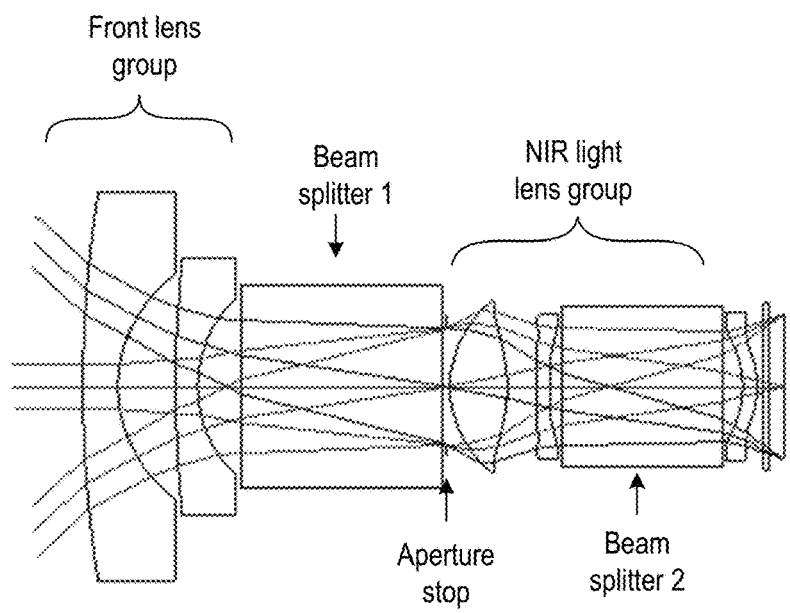

FIGS. 21E and 21F show the unfolded optical system layouts for the visible imaging system and the NIR imaging system, respectively, in optical systems 2100A and 2100B, according to some embodiments. In some embodiments, the F/2.0 visible imaging system shown in FIG. 21E may be identical in prescription to the visible imaging system shown in FIG. 19G. The F/1.8 NIR system may be configured to capture NIR light in the 930-950 nm band, and provides a beam splitter 2 and NIR filters to image the object field at two NIR sensors (NIR 1 and NIR 2). In some embodiments, the F/1.8 NIR system may be configured to position or locate the NIR light source within this system, for example. at one of the NIR focal planes, so that NIR light is emitted through the front lens group of the dual VIS-NIR system to the object field. Tables 5A and 5B provide optical data and aspheric coefficients for the NIR imaging system shown in FIG. 21F, according to some embodiments.

Figure 22A:
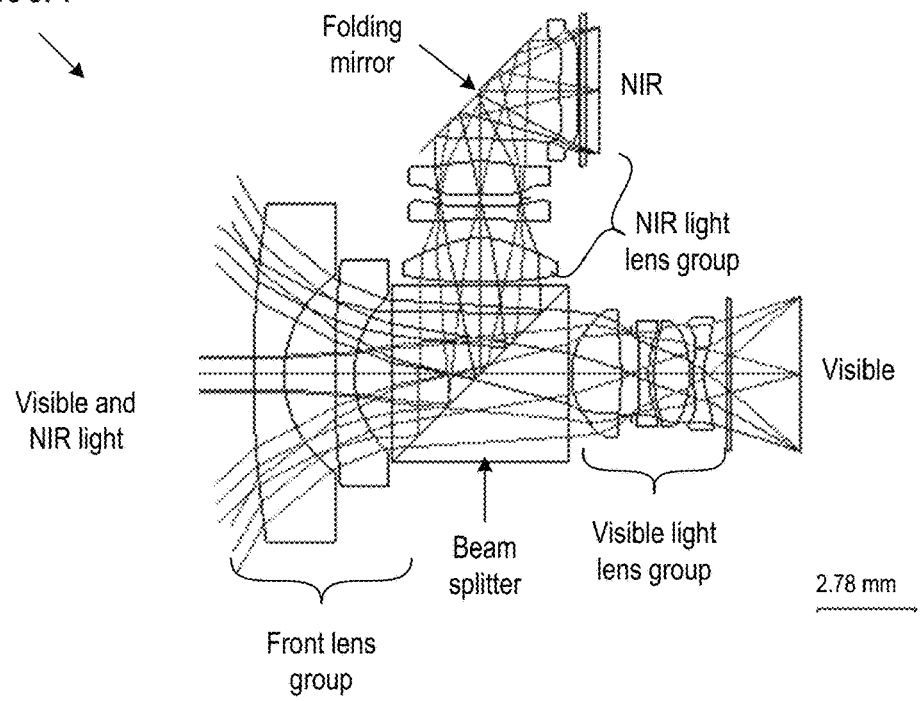
FIGS. 22A and 22B illustrate a seventh example optical system that includes a folding mirror on the NIR path, according to some embodiments.
Figure 22B:
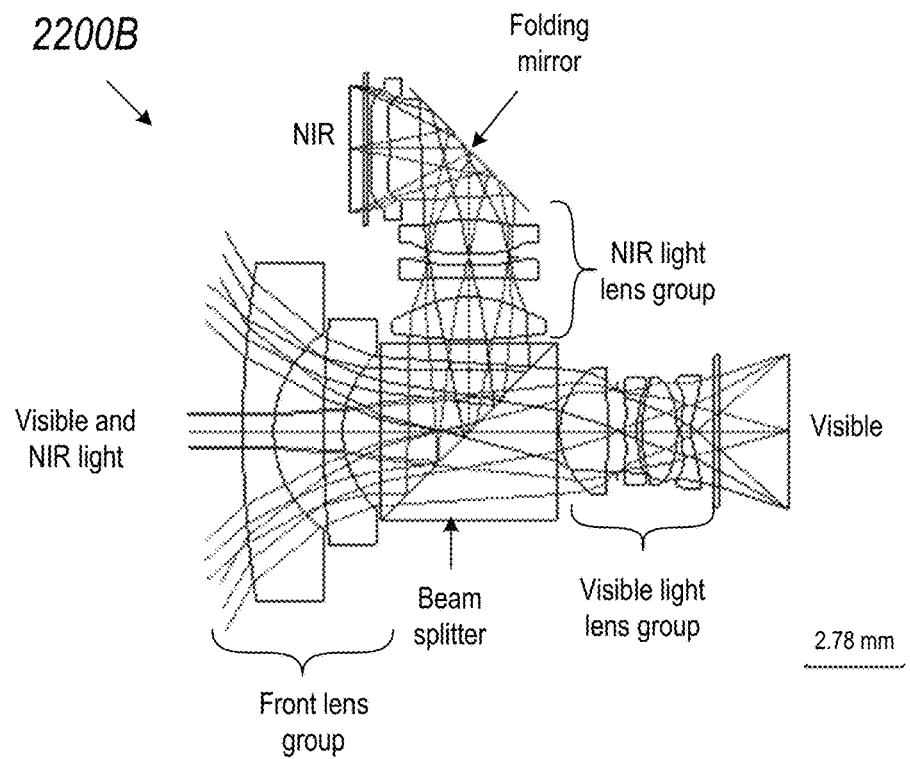

FIGS. 22A and 22B show two-dimensional views of example optical systems 2200A and 2200B, respectively, according to some embodiments. In optical systems 2200A and 2200B, a beam splitter similar to that shown in FIG. 19F may be used to split the light onto visible and NIR paths. However, in optical systems 2200A and 2200B, a folding mirror may be located on the NIR light path to redirect the NIR light onto a different axis, with an NIR filter and light sensor on the axis to capture the NIR light. As shown in optical systems 2200A and 2200B, in different embodiments the folding mirror and the NIR sensor may be positioned differently.

Figure 22C:
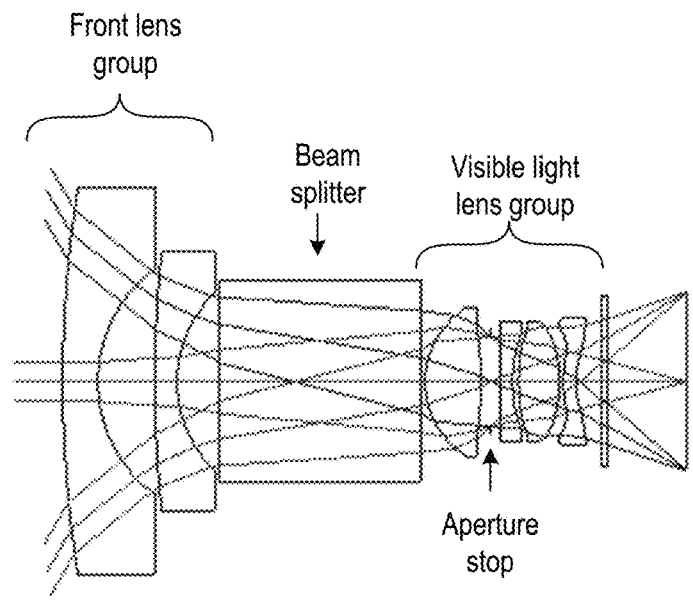
FIGS. 22C and 22D show the unfolded optical system layouts for the visible imaging system and the NIR imaging system of the seventh example optical system, according to some embodiments.
Figure 22D:
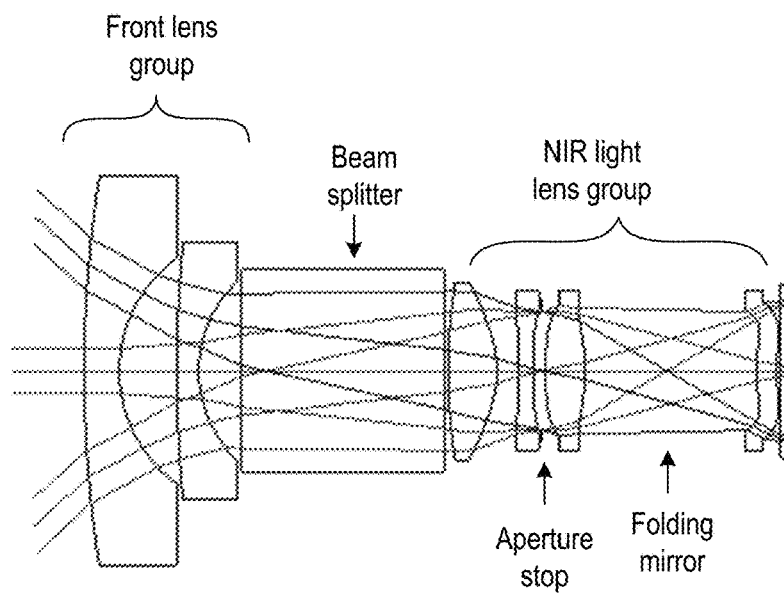

FIGS. 22C and 22D show the unfolded optical system layouts for the visible imaging system and the NIR imaging system, respectively, in optical systems 2200A and 2200B, according to some embodiments. In some embodiments, the F/2.0 visible imaging system shown in FIG. 22C may be identical in prescription to the visible imaging system shown in FIG. 19G. The F/1.8 NIR system may be configured to capture NIR light in the 1014-852 nm band and includes a folding mirror and NIR filter to image the object field at one NIR sensor. In some embodiments, the folding mirror may be replaced by a plate beam splitter if two NIR sensors are required to capture two NIR images in the 1014-852 nm spectral band. In some embodiments, the NIR system may be configured to position or locate the NIR light source within this system, for example at one of the NIR focal planes, so that NIR light is emitted through the front lens group of the dual VIS-NIR system to the object field. Tables 6A and 6B provide optical data and aspheric coefficients for the NIR imaging system shown in FIG. 22D, according to some embodiments.

Figure 23A:
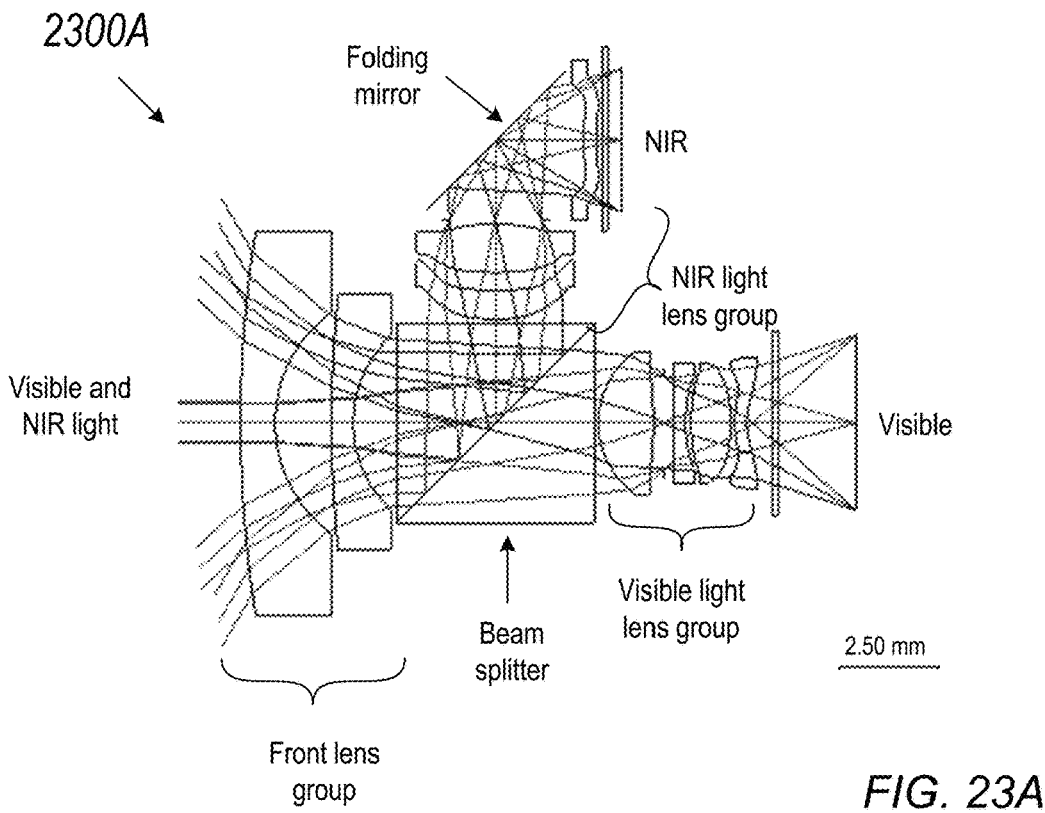
FIGS. 23A and 23B illustrate an eighth example optical system that includes a folding mirror on the NIR path, according to some embodiments.
Figure 23B:
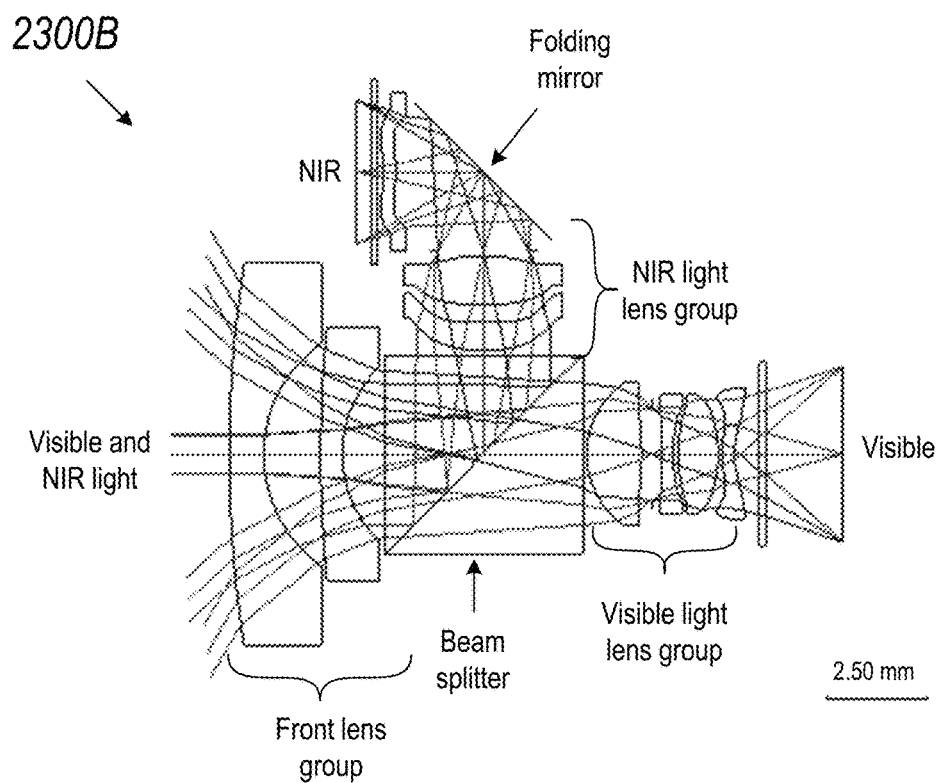

FIGS. 23A and 23B show two-dimensional views of example optical systems 2300A and 2300B, respectively, according to some embodiments. In optical systems 2300A and 2300B, a beam splitter similar to that shown in FIG. 19F may be used to split the light onto visible and NIR paths. However, in optical systems 2300A and 2300B, a folding mirror may be located on the NIR light path to redirect the NIR light onto a different axis, with an NIR filter and light sensor on the axis to capture the NIR light. As shown in optical systems 2300A and 2300B, in different embodiments the folding mirror and the NIR sensor may be positioned differently.

Figure 23C:
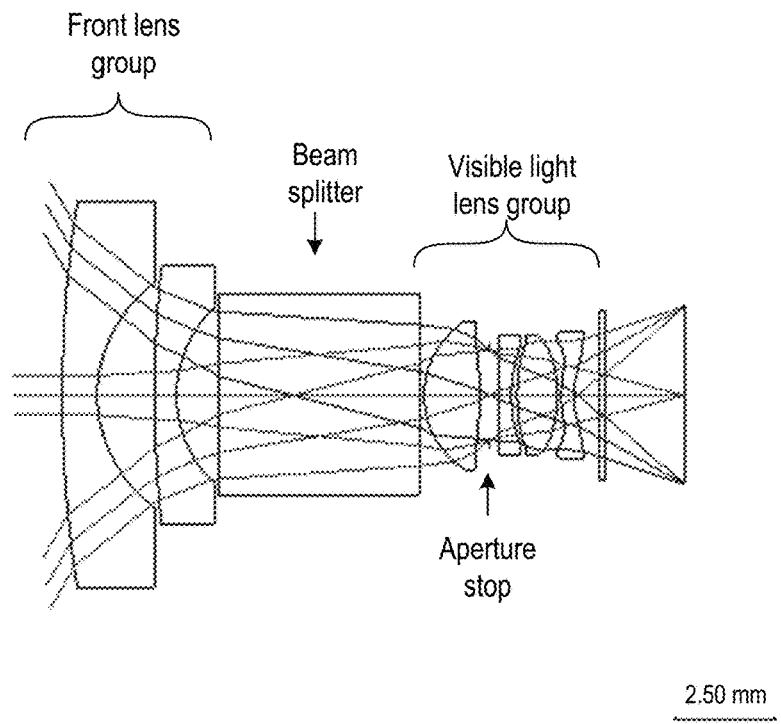
FIGS. 23C and 23D show the unfolded optical system layouts for the visible imaging system and the NIR imaging system of the eighth example optical system, according to some embodiments.
Figure 23D:
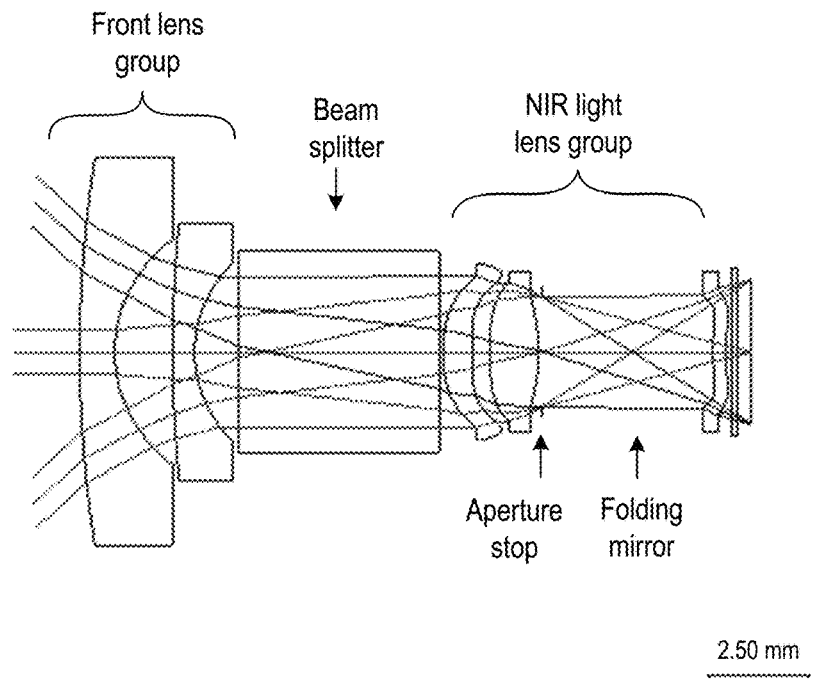

FIGS. 23C and 23D show the unfolded optical system layouts for the visible imaging system and the NIR imaging system, respectively, in optical systems 2300A and 2300B, according to some embodiments. In some embodiments, the F/2.0 visible imaging system shown in FIG. 23C may be identical in prescription to the visible imaging system shown in FIG. 19G. The F/1.8 NIR system may be configured to capture NIR light in the 950-930 nm band and includes a folding mirror and NIR filter to image the object field at one NIR sensor. In some embodiments, the folding mirror may be replaced by a plate beam splitter if two NIR sensors are required to capture two NIR images in the 950-930 nm spectral band. In some embodiments, the NIR system may also be configured to position or locate the NIR light source within this system, for example. at one of the NIR focal plane, so that NIR light is emitted through the front lens group of the dual VIS-NIR system to the object field. Tables 7A and 7B provide optical data and aspheric coefficients for the NIR imaging system shown in FIG. 23D, according to some embodiments.

Figure 24A:
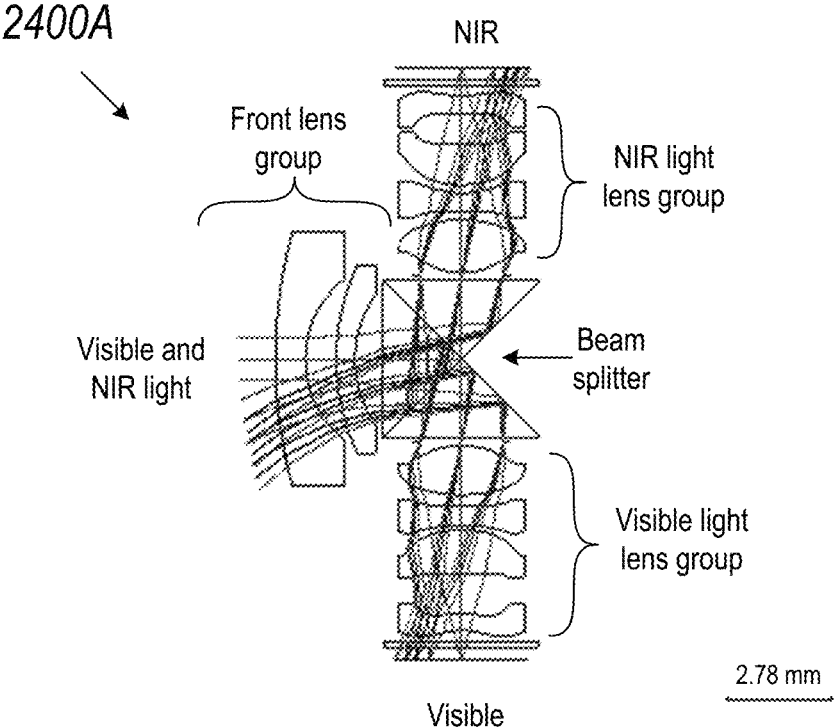
FIGS. 24A through 24D illustrate a ninth example optical system, according to some embodiments.
Figure 24B:
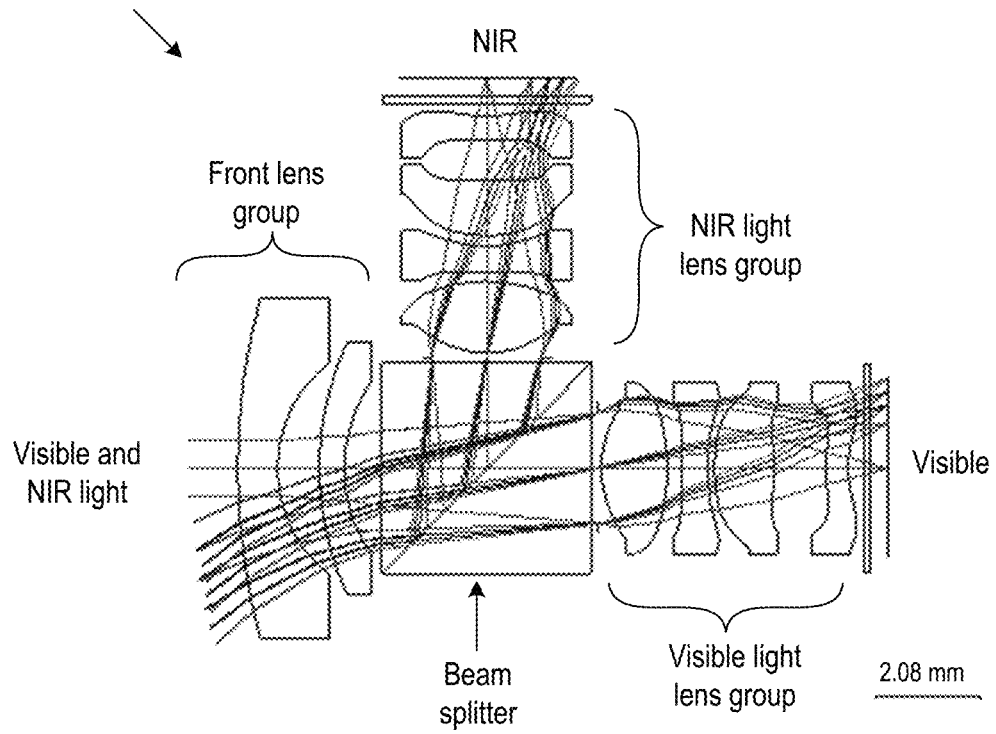

FIGS. 24A and 24B show two-dimensional views of example optical systems 2400A and 2400B, respectively, according to some embodiments. In optical system 2400A, a beam splitter similar to that shown in FIG. 19C may be used to split the light onto visible and NIR paths. In optical system 2400B, a beam splitter similar to that shown in FIG. 19F may be used to split the light onto visible and NIR paths.

Figure 24C:
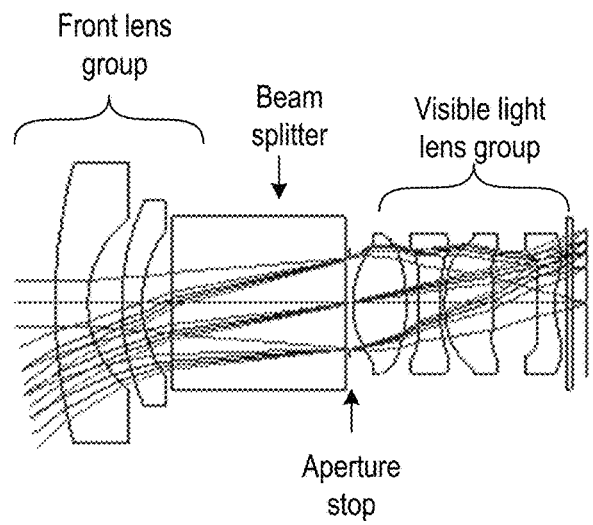
Figure 24D:
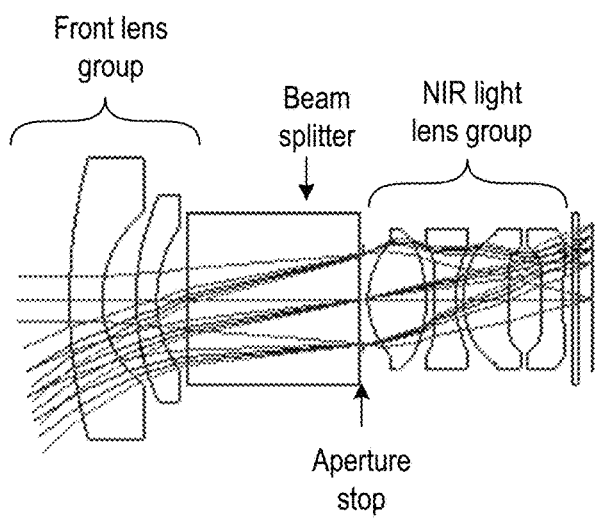

FIGS. 24C and 24D show the unfolded optical system layouts for the visible imaging system and the NIR imaging system, respectively, in optical systems 2400A and 2400B, according to some embodiments. Tables 8A and 8B provide optical data and aspheric coefficients for the visible light imaging system shown in FIG. 24C, according to some embodiments. Tables 9A and 9B provide optical data and aspheric coefficients for the NIR light imaging system shown in FIG. 24D, according to some embodiments. In some embodiments, the visible system and NIR system have identical EFL (effective focal length) of 2.035 mm, focal ratios of F/1.80, and diagonal image field size of 3.6 mm. Both systems are well corrected for aberrations including distortion within the field of view. In some embodiments, the F/1.8 NIR system is configured to capture NIR light in the 1014-852 nm band.

Figure 25A:
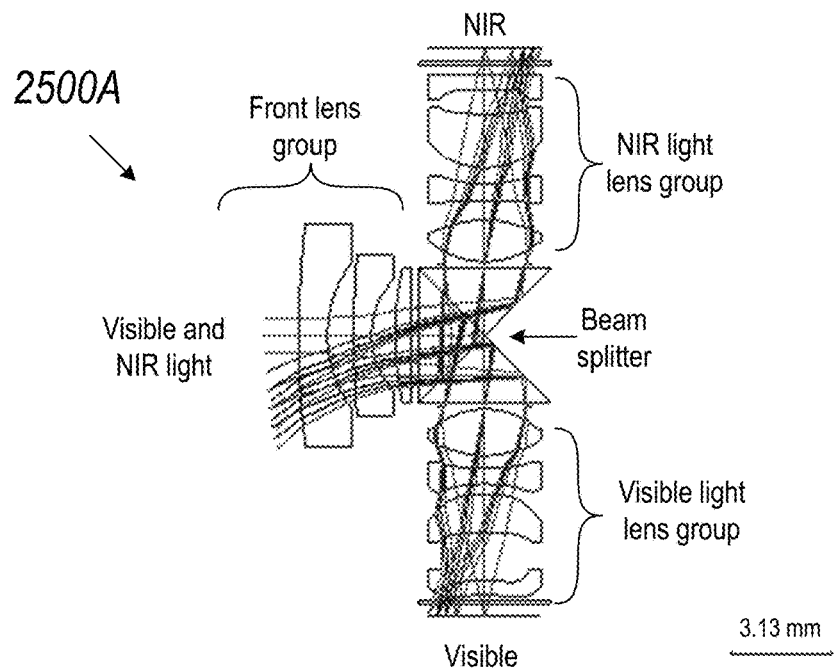
FIGS. 25A through 25D illustrate a tenth example optical system, according to some embodiments.
Figure 25B:
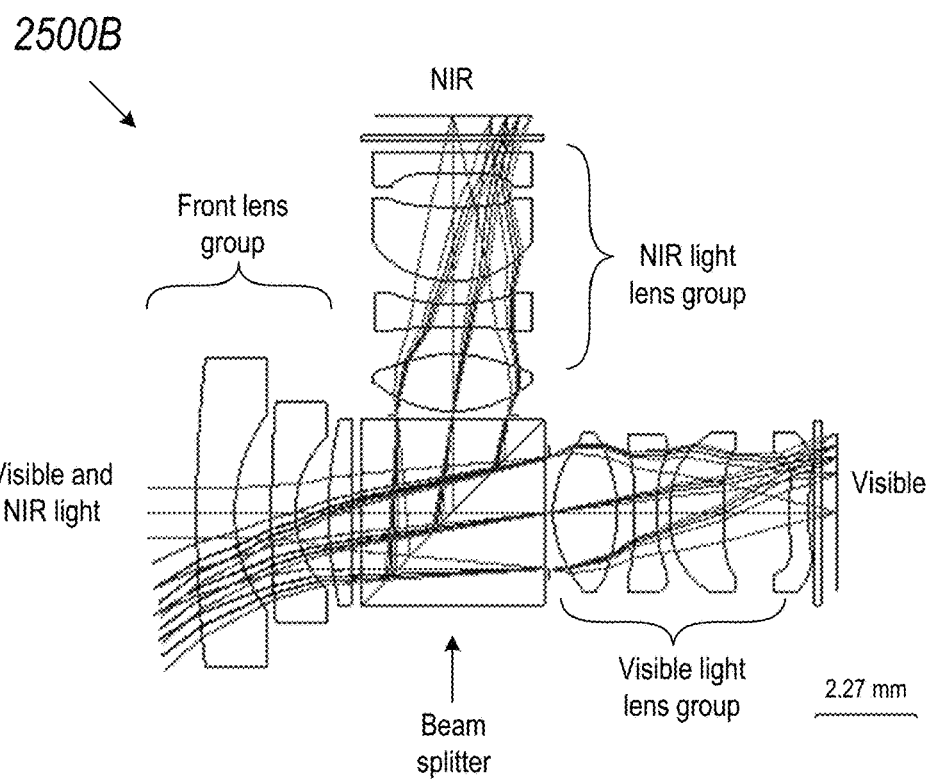

FIGS. 25A and 25B show two-dimensional views of example optical systems 2500A and 2500B, respectively, according to some embodiments. In optical system 2500A, a beam splitter similar to that shown in FIG. 19C may be used to split the light onto visible and NIR paths. In optical system 2500B, a beam splitter similar to that shown in FIG. 19F may be used to split the light onto visible and NIR paths.

Figure 25C:
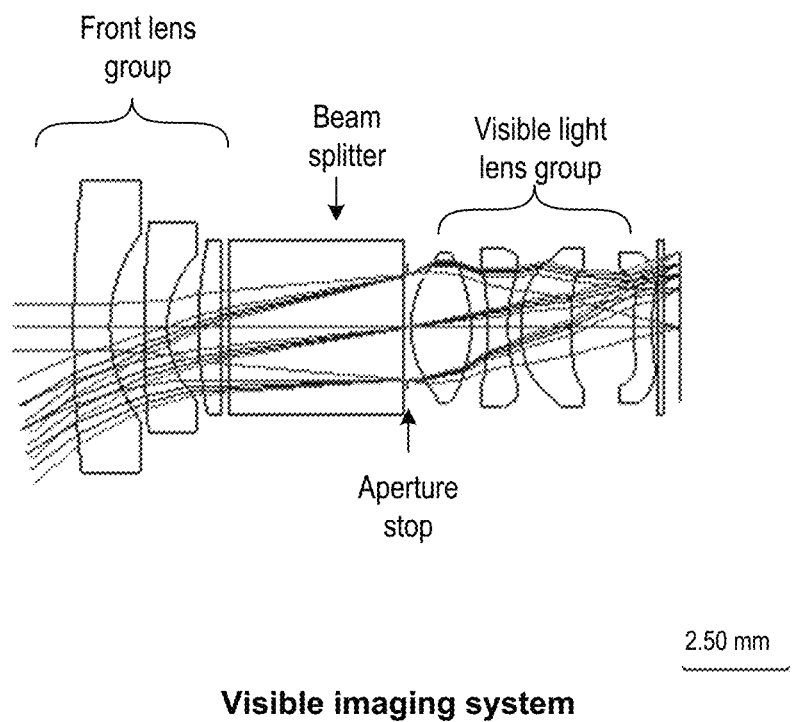
Figure 25D:
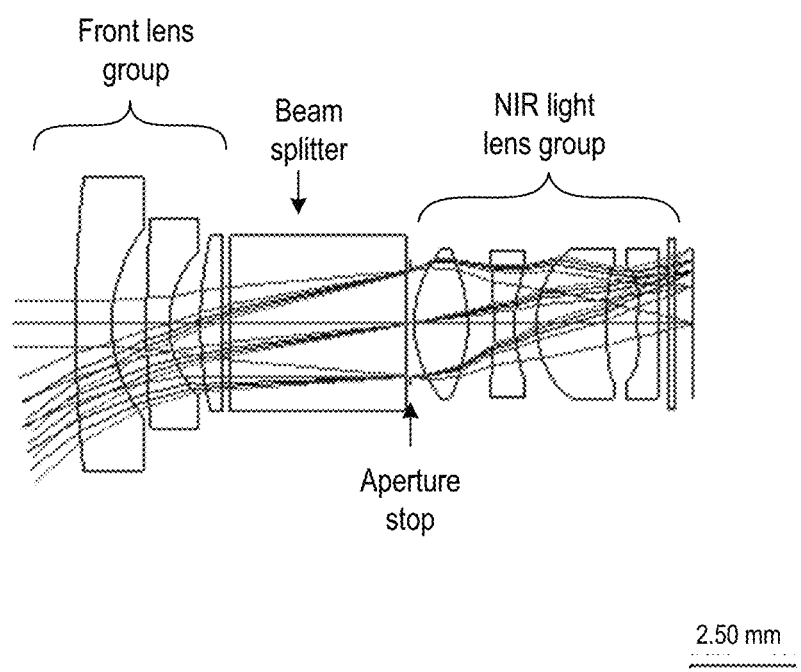

FIGS. 25C and 25D show the unfolded optical system layouts for the visible imaging system and the NIR imaging system, respectively, in optical systems 2500A and 2500B, according to some embodiments. Tables 10A and 10B provide optical data and aspheric coefficients for the visible light imaging system shown in FIG. 25C, according to some embodiments. Tables 11A and 11B provide optical data and aspheric coefficients for the NIR light imaging system shown in FIG. 25D, according to some embodiments. In some embodiments, the visible system and NIR system have identical EFL of 2.035 mm, focal ratios of F/1.80, and diagonal image field size of 3.6 mm. Both systems are well corrected for aberrations including distortion within the field of view. In some embodiments, the F/1.8 NIR system is configured to capture NIR light in the 1014-852 nm band.

Figure 26A:
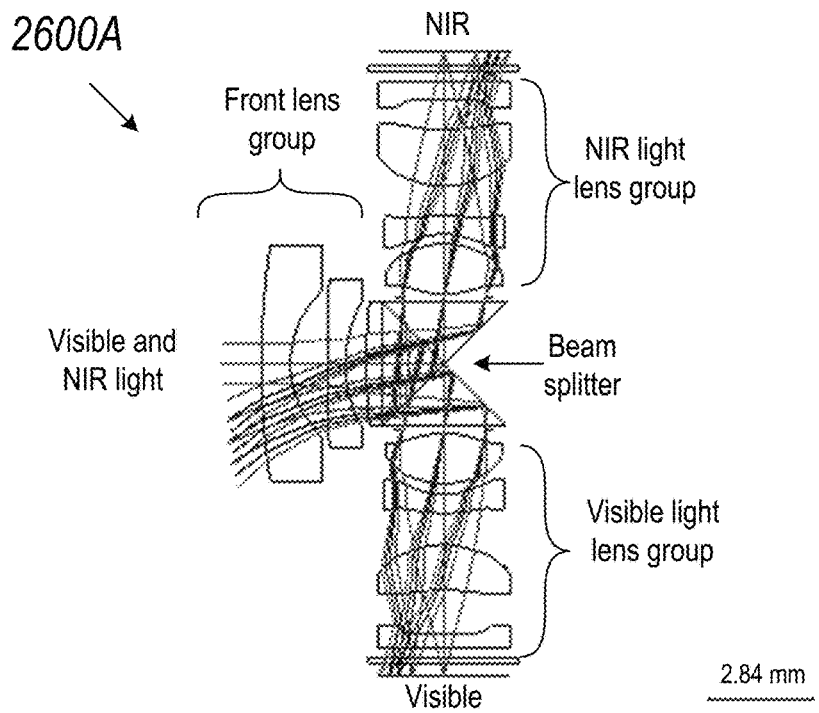
FIGS. 26A through 26D illustrate an eleventh example optical system, according to some embodiments.
Figure 26B:
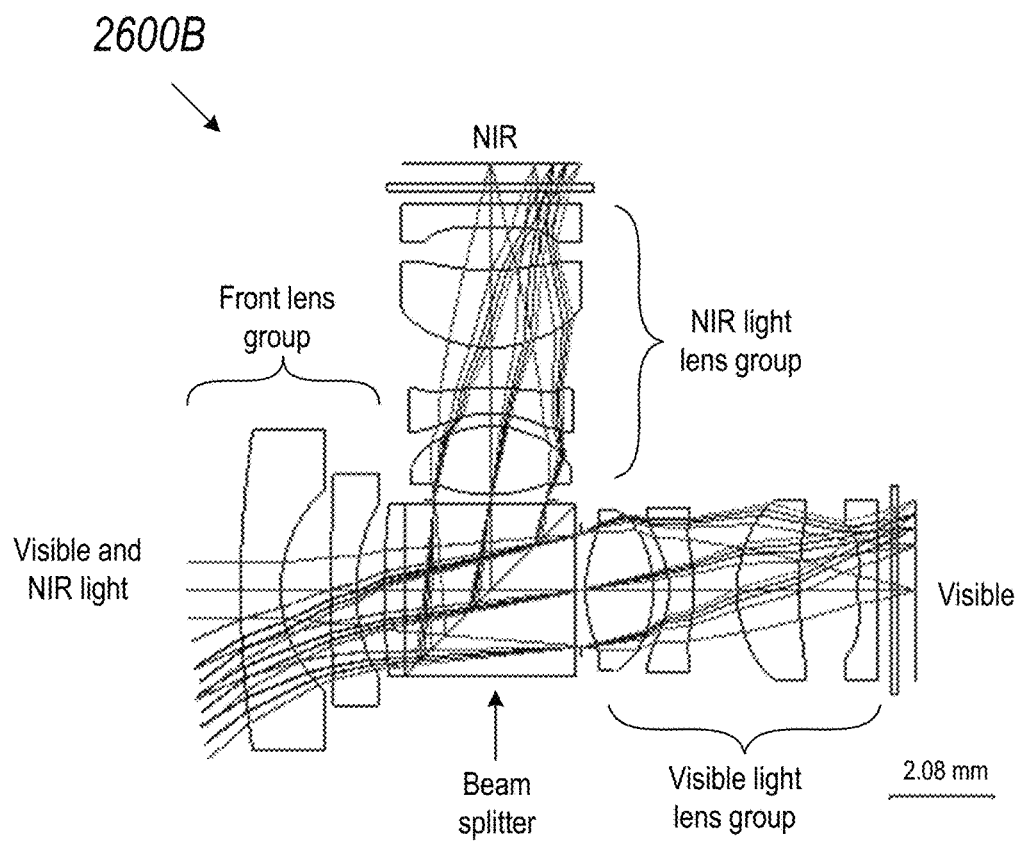

FIGS. 26A and 26B show two-dimensional views of example optical systems 2600A and 2600B, respectively, according to some embodiments. In optical system 2600A, a beam splitter similar to that shown in FIG. 19C may be used to split the light onto visible and NIR paths. In optical system 2600B, a beam splitter similar to that shown in FIG. 19F may be used to split the light onto visible and NIR paths.

Figure 26C:
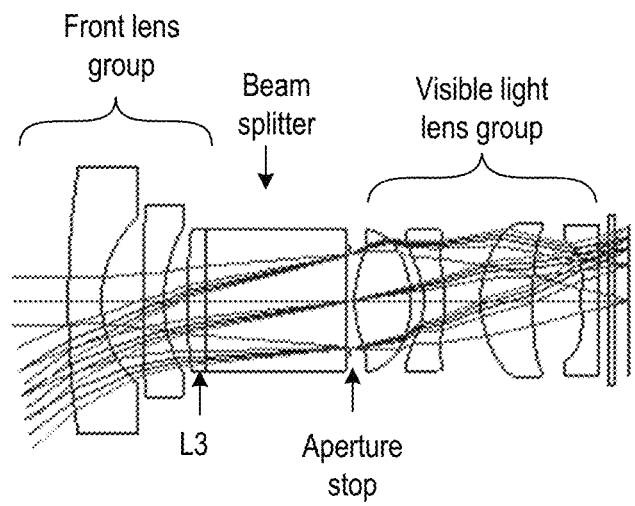
Figure 26D:
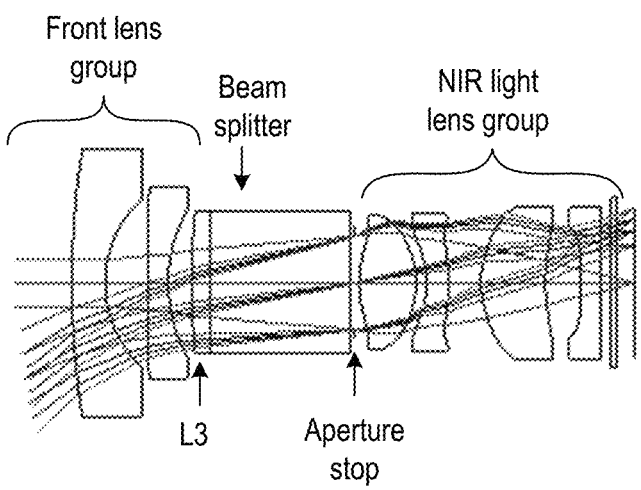

FIGS. 26C and 26D show the unfolded optical system layouts for the visible imaging system and the NIR imaging system, respectively, in optical systems 2600A and 2600B, according to some embodiments. Tables 12A and 12B provide optical data and aspheric coefficients for the visible light imaging system shown in FIG. 26C, according to some embodiments. Tables 13A and 13B provide optical data and aspheric coefficients for the NIR light imaging system shown in FIG. 26D, according to some embodiments. In some embodiments, the visible system and NIR system have identical EFL of 2.035 mm, focal ratios of F/1.80, and diagonal image field size of 3.6 mm. Both systems are well corrected for aberrations including distortion within the field of view. In some embodiments, the F/1.8 NIR system is configured to capture NIR light in the 1014-852 nm band. In some embodiments, a lens element L3 of the front lens group may be combined with a first prism element of the beam splitter using optical cement. In some embodiments, lens L3 and the beam splitter may be composed of the same optical glass or plastic material.

Figure 27A:
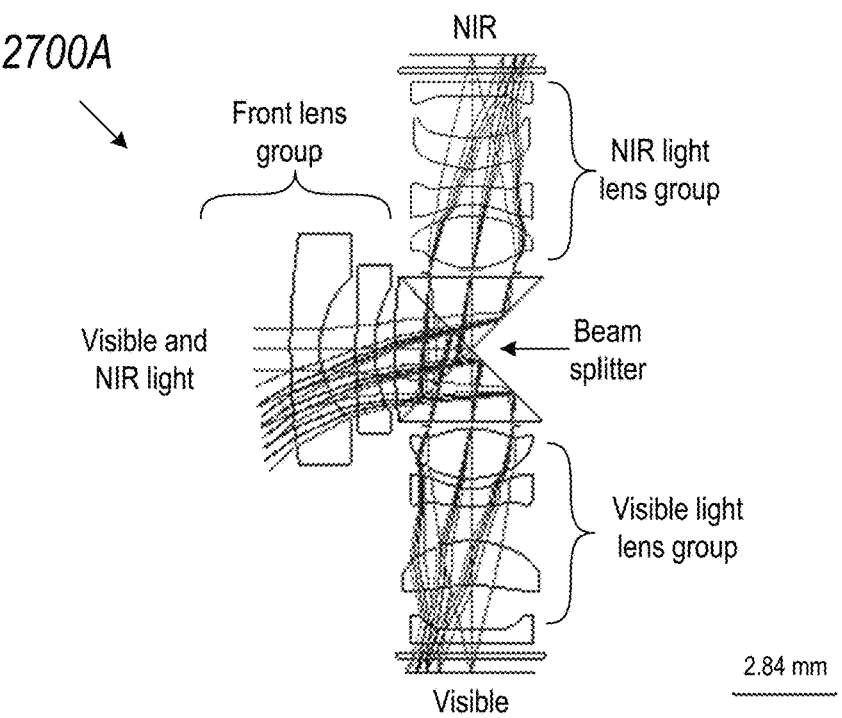
FIGS. 27A through 27D illustrate an eleventh example optical system, according to some embodiments.
Figure 27B:
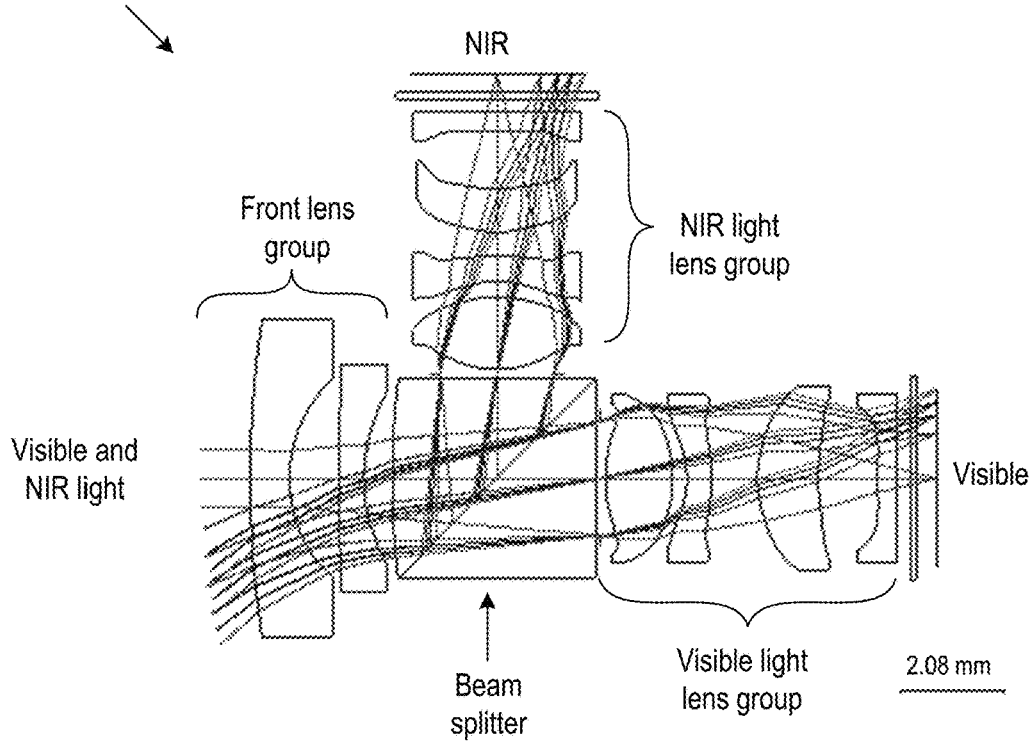

FIGS. 27A and 27B show two-dimensional views of example optical systems 2700A and 2700B, respectively, according to some embodiments. In optical system 2700A, a beam splitter similar to that shown in FIG. 19C may be used to split the light onto visible and NIR paths. In optical system 2700B, a beam splitter similar to that shown in FIG. 19F may be used to split the light onto visible and NIR paths.

Figure 27C:
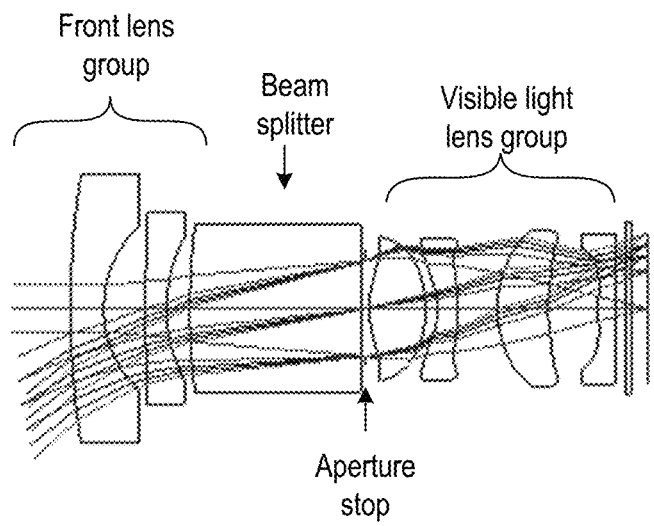
Figure 27D:
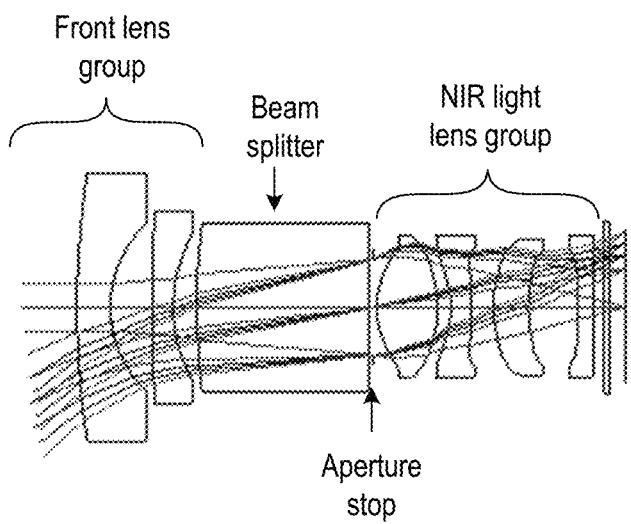

FIGS. 27C and 27D show the unfolded optical system layouts for the visible imaging system and the NIR imaging system, respectively, in optical systems 2700A and 2700B, according to some embodiments. Tables 14A and 14B provide optical data and aspheric coefficients for the visible light imaging system shown in FIG. 27C, according to some embodiments. Tables 15A and 15B provide optical data and aspheric coefficients for the NIR light imaging system shown in FIG. 27D, according to some embodiments. In some embodiments, the visible system and NIR system have identical EFL of 2.035 mm, focal ratios of F/1.80, and diagonal image field size of 3.6 mm. Both systems are well corrected for aberrations including distortion within the field of view. In some embodiments, the F/1.8 NIR system is configured to capture NIR light in the 1014-852 nm band. In some embodiments, the beam splitter may have a curved or spherical curvature surface instead of a flat/plano surface on its first prism element.

Figure 28A:
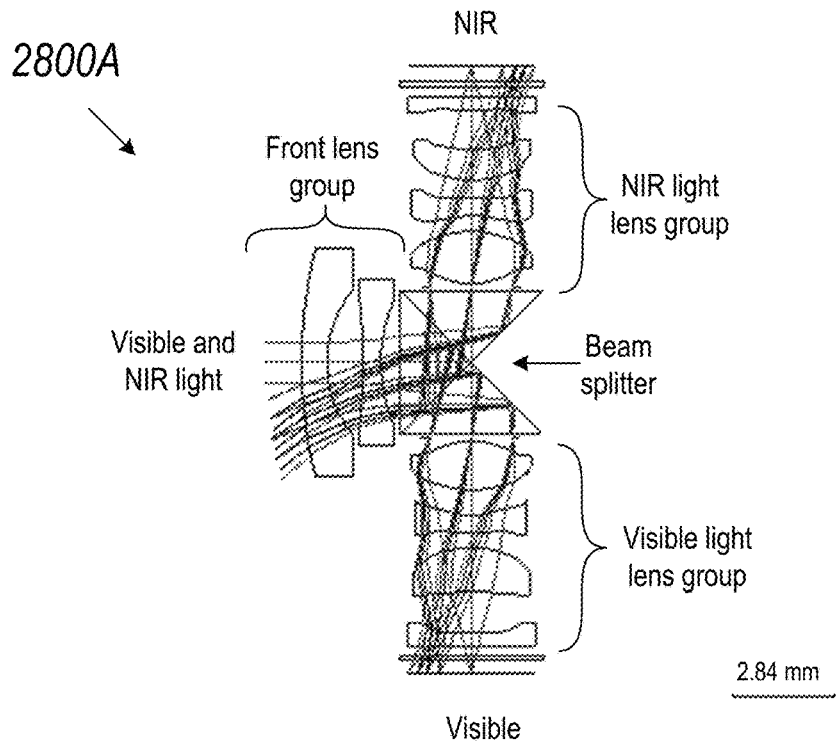
FIGS. 28A through 28D illustrate a twelfth example optical system, according to some embodiments.
Figure 28B:
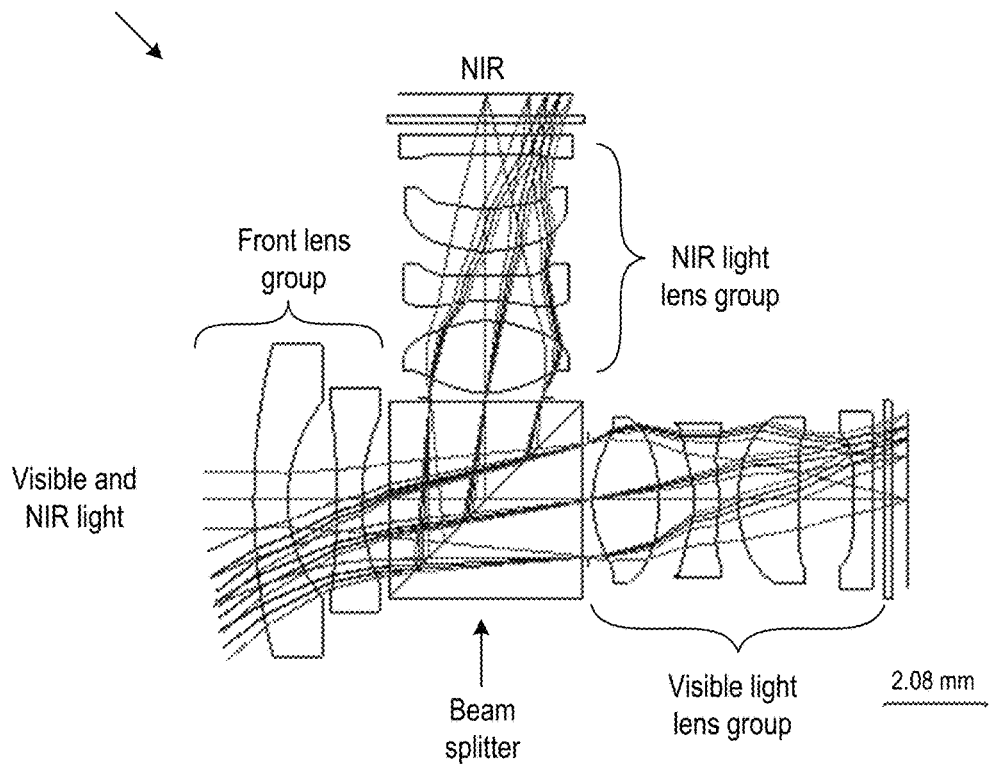

FIGS. 28A and 28B show two-dimensional views of example optical systems 2800A and 2800B, respectively, according to some embodiments. In optical system 2800A, a beam splitter similar to that shown in FIG. 19C may be used to split the light onto visible and NIR paths. In optical system 2800B, a beam splitter similar to that shown in FIG. 19F may be used to split the light onto visible and NIR paths.

Figure 28C:
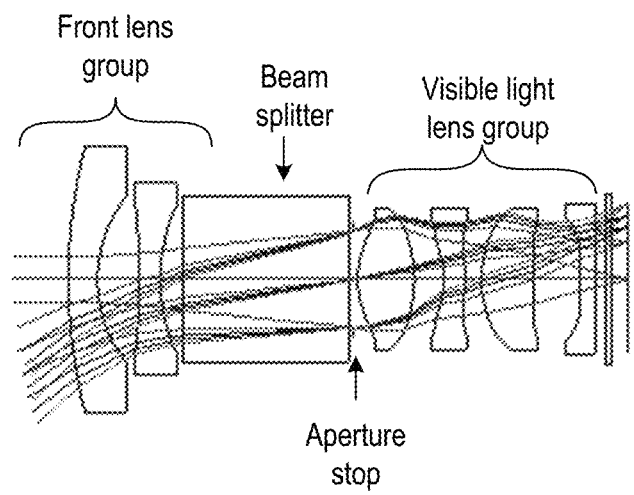
Figure 28D:
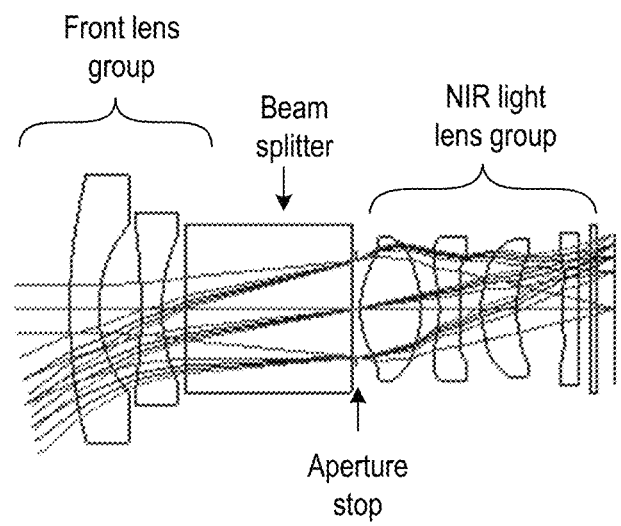

FIGS. 28C and 28D show the unfolded optical system layouts for the visible imaging system and the NIR imaging system, respectively, in optical systems 2800A and 2800B, according to some embodiments. Tables 16A and 16B provide optical data and aspheric coefficients for the visible light imaging system shown in FIG. 28C, according to some embodiments. Tables 17A and 17B provide optical data and aspheric coefficients for the NIR light imaging system shown in FIG. 28D, according to some embodiments. In some embodiments, the visible system and NIR system have identical EFL of 2.035 mm, focal ratios of F/1.80, and diagonal image field size of 3.6 mm. Both systems are well corrected for aberrations including distortion within the field of view. In some embodiments, the F/1.8 NIR system is configured to capture NIR light in the 1014-852 nm band.

Visible and NIR Imaging System Tables

Tables 2A through 17B provide optical data and aspheric coefficients for the visible imaging systems and the NIR imaging systems shown in FIGS. 19A through 28D, according to some embodiments. In the Tables:

f: focal length of the respective imaging system
Fno: F/number of the respective imaging system
HFOV: Half field-of view of the respective imaging system
TTL: Total track length of the respective imaging system
$S_i$: surface i
$R_i$: radius of surface i
$D_i$: distance between surface i and surface i+1 along optical axis
$N_d$: index of refraction for material relative to d-line
$V_d$: Abbe number for material relative to d-line
$f_i$: focal length of the lens component at 555 nm
$L_x$: lens number in order from object side to image side
INF: Infinity
FLT: Flat/plano
SPH: Spherical
ASP: Aspherical Table 2A provides optical data for the visible imaging system embodiment shown in FIG. 19G, according to some embodiments. In this example embodiment:

f=1.985 mm, Fno=2.0, HFOV=59.9 deg, TTL=15.53 mm
Design wavelengths: 650 nm, 610 nm, 555 nm, 510 nm, 470 nm

TABLE 2A

F/2.0 Visible Imaging System

| $S_i$ | Component | $R_i$ | Shape | Di | Material | $N_d$ | $V_d$ | $f_i$ at 555 nm |
|---|---|---|---|---|---|---|---|---|
| 0 | Object plane | INF | FLT | INF | | | | |
| 1 | $L_1$ | 30.500 | SPH | 0.8750 | Plastic | 1.545 | 55.9 | −7.19 |
| 2 | | 3.442 | SPH | 1.4261 | | | | |
| 3 | L2 | 31.851 | SPH | 0.5500 | Plastic | 1.545 | 55.9 | −6.18 |
| 4 | | 3.033 | SPH | 1.0754 | | | | |
| 5 | BS | INF | FLT | 5.0000 | Glass | 1.923 | 18.9 | |
| 6 | | INF | FLT | 0.1000 | | | | |
| 7 | L3 | 2.079 | ASP | 1.3946 | Plastic | 1.545 | 55.9 | 3.09 |
| 8 | | −6.847 | ASP | 0.2650 | | | | |
| 9 | Aperture stop | INF | FLT | 0.2239 | | | | |
| 10 | L4 | 10.839 | ASP | 0.3000 | Plastic | 1.661 | 20.4 | −5.56 |
| 11 | | 2.732 | ASP | 0.1514 | | | | |
| 12 | L5 | 5.655 | ASP | 1.0025 | Plastic | 1.545 | 55.9 | 3.94 |
| 13 | | −3.255 | ASP | 0.1000 | | | | |
| 14 | L6 | 2.180 | ASP | 0.3000 | Plastic | 1.545 | 55.9 | −10.17 |
| 15 | | 1.490 | ASP | 0.6494 | | | | |
| 16 | Window/filter | INF | FLT | 0.1500 | Glass | 1.516 | 64.1 | |
| 17 | | INF | FLT | 1.9635 | | | | |
| 18 | Image plane | INF | FLT | | | | | |

Table 2B provides aspheric coefficients for the visible imaging system embodiment shown in FIG. 19G, according to some embodiments.

TABLE 2B

F/2.0 Visible Imaging System

| $S_i$ | $c_i$ | K | A / E | B / F | C / G | D / H |
|---|---|---|---|---|---|---|
| 7 | 0.48111583 | 0.08171454 | −6.00819E−03 | −1.76935E−04 | −1.10101E−03 | 4.43829E−04 |
| | | | −9.13129E−05 | 0.00000E+00 | 0.00000E+00 | 0.00000E+00 |
| 8 | −0.14604362 | 0.00000000 | 1.43154E−02 | −1.69812E−04 | 0.00000E+00 | 0.00000E+00 |
| | | | 0.00000E+00 | 0.00000E+00 | 0.00000E+00 | 0.00000E+00 |
| 10 | 0.09225821 | 0.00000000 | −1.08953E−01 | 7.49690E−02 | −1.92989E−02 | 0.00000E+00 |
| | | | 0.00000E+00 | 0.00000E+00 | 0.00000E+00 | 0.00000E+00 |
| 11 | 0.36603871 | 0.00000000 | −1.21619E−01 | 7.55193E−02 | 1.48184E−02 | −1.17187E−02 |
| | | | 0.00000E+00 | 0.00000E+00 | 0.00000E+00 | 0.00000E+00 |
| 12 | 0.17683672 | 0.00000000 | 3.00243E−02 | −5.26273E−02 | 7.57076E−02 | −3.48327E−02 |
| | | | 4.00679E−03 | 7.40725E−06 | 0.00000E+00 | 0.00000E+00 |
| 13 | −0.30726304 | −5.41039593 | −9.34555E−03 | −5.09623E−03 | −9.89726E−03 | 7.08053E−03 |
| | | | −3.07726E−03 | 3.38479E−04 | 0.00000E+00 | 0.00000E+00 |
| 14 | 0.45878819 | −2.15661109 | −1.91392E−01 | 4.02190E−02 | −1.60069E−02 | 1.01605E−02 |
| | | | −7.64394E−03 | 2.55769E−03 | 0.00000E+00 | 0.00000E+00 |
| 15 | 0.67135497 | −3.30298050 | −1.20704E−01 | 3.96338E−02 | −2.28118E−03 | −3.96896E−03 |
| | | | 2.30705E−03 | −3.40107E−04 | 0.00000E+00 | 0.00000E+00 |

Table 3A provides optical data for the NIR light imaging system embodiment shown in FIG. 19H, according to some embodiments. In this example embodiment:

f=2.030 mm, Fno=1.8, HFOV=41.6 deg, TTL=16.43 mm
Design wavelengths: 1014 nm, 950 nm, 940 nm, 930 nm, 852 nm

TABLE 3A

F/1.8 NIR Imaging System

| $S_i$ | Component | $R_i$ | Shape | $D_i$ | Material | $N_d$ | $V_d$ | $f_i$ at 940 nm |
|---|---|---|---|---|---|---|---|---|
| 0 | Object plane | INF | FLT | INF | | | | |
| 1 | $L_1$ | 30.500 | SPH | 0.8750 | Plastic | 1.545 | 55.9 | −7.33 |
| 2 | | 3.442 | SPH | 1.4261 | | | | |
| 3 | $L_2$ | 31.851 | SPH | 0.5500 | Plastic | 1.545 | 55.9 | −6.30 |
| 4 | | 3.033 | SPH | 1.0754 | | | | |
| 5 | BS | INF | FLT | 5.0000 | Glass | 1.923 | 18.9 | |
| 6 | | INF | FLT | 0.1000 | | | | |
| 7 | $L_3$ | 2.391 | ASP | 1.4091 | Plastic | 1.545 | 55.9 | 2.98 |
| 8 | | −3.833 | ASP | 0.1000 | | | | |
| 9 | Aperture stop | INF | FLT | 1.0178 | | | | |
| 10 | $L_4$ | −3.381 | ASP | 0.6919 | Plastic | 1.661 | 20.4 | −5.90 |
| 11 | | −37.564 | ASP | 0.1000 | | | | |
| 12 | $L_5$ | 2.654 | ASP | 1.8740 | Plastic | 1.545 | 55.9 | 19.29 |
| 13 | | 2.692 | ASP | 0.7949 | | | | |
| 14 | $L_6$ | 3.530 | ASP | 0.7623 | Plastic | 1.545 | 55.9 | 5.65 |
| 15 | | −19.690 | ASP | 0.1500 | | | | |
| 16 | Window/filter | INF | FLT | 0.1500 | Glass | 1.516 | 64.1 | |
| 17 | | INF | FLT | 0.3500 | | | | |
| 18 | Image plane | INF | FLT | | | | | |

Table 3B provides aspheric coefficients for the NIR light imaging system embodiment shown in FIG. 19H, according to some embodiments.

TABLE 3B

F/1.8 NIR Imaging System

| $S_i$ | $c_i$ | K | A / E | B / F | C / G | D / H |
|---|---|---|---|---|---|---|
| 7 | 0.41823880 | 0.00000000 | −1.24102E−03 | −1.97963E−04 | 1.36200E−03 | −5.98437E−04 |
| | | | 7.61954E−05 | 8.39995E−06 | 0.00000E+00 | 0.00000E+00 |
| 8 | −0.26089979 | 0.00000000 | 3.16128E−02 | −3.12216E−03 | 6.85809E−04 | −2.99458E−04 |
| | | | 9.19847E−05 | 0.00000E+00 | 0.00000E+00 | 0.00000E+00 |
| 10 | −0.29580220 | 0.00000000 | 1.45080E−01 | −8.82191E−02 | 2.63686E−02 | −7.01535E−03 |
| | | | 0.00000E+00 | 0.00000E+00 | 0.00000E+00 | 0.00000E+00 |
| 11 | −0.02662118 | 0.00000000 | 1.82309E−01 | −5.02583E−02 | −1.50230E−02 | 5.25661E−03 |
| | | | 0.00000E+00 | 0.00000E+00 | 0.00000E+00 | 0.00000E+00 |
| 12 | 0.37678095 | 0.00000000 | 5.91390E−02 | −1.20037E−02 | −1.32899E−03 | 7.21594E−04 |
| | | | −1.39704E−05 | 0.00000E+00 | 0.00000E+00 | 0.00000E+00 |
| 13 | 0.37148484 | 0.00000000 | −8.40316E−02 | 5.75311E−02 | −2.35828E−02 | 1.68514E−02 |
| | | | −8.03489E−03 | 3.15728E−03 | 0.00000E+00 | 0.00000E+00 |
| 14 | 0.28331556 | 0.00000000 | −9.13042E−02 | −1.69646E−02 | −3.16156E−02 | 2.34266E−02 |
| | | | −8.07118E−03 | −4.72848E−04 | 0.00000E+00 | 0.00000E+00 |
| 15 | −0.05078812 | 0.00000000 | 1.51060E−02 | −7.13631E−02 | 2.65474E−02 | −4.51482E−03 |
| | | | 0.00000E+00 | 0.00000E+00 | 0.00000E+00 | 0.00000E+00 |

Table 4A provides optical data for the NIR light imaging system embodiment shown in FIG. 20F, according to some embodiments. In this example embodiment:

f=2.035 mm, Fno=1.8, HFOV=41.5 deg, TTL=20.27 mm
Design wavelengths: 1014 nm, 950 nm, 940 nm, 930 nm, 852 nm

TABLE 4A

F/1.8 NIR Imaging System

| $S_i$ | Component | $R_i$ | Shape | $D_i$ | Material | $N_d$ | $V_d$ | $f_i$ at 940 nm |
|---|---|---|---|---|---|---|---|---|
| 0 | Object plane | INF | FLT | INF | | | | |
| 1 | $L_1$ | 30.500 | SPH | 0.8750 | Plastic | 1.545 | 55.9 | −7.33 |
| 2 | | 3.442 | SPH | 1.4261 | | | | |
| 3 | $L_2$ | 31.851 | SPH | 0.5500 | Plastic | 1.545 | 55.9 | −6.30 |
| 4 | | 3.033 | SPH | 1.0754 | | | | |

TABLE 4A-continued

F/1.8 NIR Imaging System

| $S_i$ | Component | $R_i$ | Shape | $D_i$ | Material | $N_d$ | $V_d$ | $f_i$ at 940 nm |
|---|---|---|---|---|---|---|---|---|
| 5 | BS 1 | INF | FLT | 5.0000 | Glass | 1.923 | 18.9 | |
| 6 | | INF | FLT | 0.1000 | | | | |
| 7 | $L_3$ | 3.919 | ASP | 1.5658 | Plastic | 1.545 | 55.9 | 3.75 |
| 8 | | -3.545 | ASP | 0.6102 | | | | |
| 9 | Aperture stop | INF | FLT | 1.0555 | | | | |
| 10 | $L_4$ | -1.515 | ASP | 0.5794 | Plastic | 1.661 | 20.4 | -4.46 |
| 11 | | -3.747 | ASP | 0.1000 | | | | |
| 12 | $L_5$ | 3.434 | ASP | 1.4022 | Plastic | 1.545 | 55.9 | 4.07 |
| 13 | | -5.133 | ASP | 0.1000 | | | | |
| 14 | B52 | INF | FLT | 4.5000 | Glass | 1.744 | 44.8 | |
| 15 | | INF | FLT | 0.2560 | | | | |
| 16 | $L_6$ | 4.883 | ASP | 0.3248 | Plastic | 1.545 | 55.9 | 9.12 |
| 17 | | INF | FLT | 0.2500 | | | | |
| 18 | Window/filter | INF | FLT | 0.1500 | Glass | 1.516 | 64.1 | |
| 19 | | INF | FLT | 0.3500 | | | | |
| 20 | Image plane | INF | FLT | | | | | |

Table 4B provides aspheric coefficients for the NIR light imaging system embodiment shown in FIG. 20F, according to some embodiments.

TABLE 4B

F/1.8 NIR Imaging System

| $S_i$ | $c_i$ | K | A<br>E | B<br>F | C<br>G | D<br>H |
|---|---|---|---|---|---|---|
| 7 | 0.25519677 | 0.00000000 | 1.84991E-03<br>1.18018E-05 | -7.82346E-04<br>0.00000E+00 | 5.92836E-04<br>0.00000E+00 | -1.68397E-04<br>0.00000E+00 |
| 8 | -0.28211737 | 0.00000000 | 1.57618E-02<br>2.44163E-05 | -2.11908E-03<br>0.00000E+00 | 7.80782E-04<br>0.00000E+00 | -2.41880E-04<br>0.00000E+00 |
| 10 | -0.66002865 | 0.00000000 | 2.47866E-01<br>7.01871E-03 | -1.42589E-01<br>0.00000E+00 | 9.26907E-02<br>0.00000E+00 | -3.62989E-02<br>0.00000E+00 |
| 11 | -0.26690784 | 0.00000000 | 1.14208E-01<br>8.58947E-04 | -4.08451E-02<br>0.00000E+00 | 2.39775E-02<br>0.00000E+00 | -8.15138E-03<br>0.00000E+00 |
| 12 | 0.29119768 | 0.00000000 | -6.68023E-02<br>2.25810E-05 | 3.11110E-02<br>0.00000E+00 | -5.11074E-03<br>0.00000E+00 | 1.37308E-04<br>0.00000E+00 |
| 13 | -0.19480236 | 0.00000000 | -3.62092E-02<br>-1.08849E-04 | 1.19751E-02<br>0.00000E+00 | -4.78790E-03<br>0.00000E+00 | 1.27479E-03<br>0.00000E+00 |
| 16 | 0.20478678 | 0.00000000 | -5.27387E-02<br>-1.91535E-04 | -3.13272E-03<br>0.00000E+00 | -1.84074E-03<br>0.00000E+00 | 9.80283E-04<br>0.00000E+00 |

Table 5A provides optical data for the NIR light imaging system embodiment shown in FIG. 21F, according to some embodiments. In this example embodiment:
f=2.037 mm, Fno=1.8, HFOV=41.5 deg, TTL=17.44 mm
Design wavelengths: 950 nm, 940 nm, 930 nm

TABLE 5A

F/1.8 NIR Imaging System

| $S_i$ | Component | $R_i$ | Shape | $D_i$ | Material | $N_d$ | $V_d$ | $f_i$ at 940 nm |
|---|---|---|---|---|---|---|---|---|
| 0 | Object plane | INF | FLT | INF | | | | |
| 1 | $L_1$ | 30.500 | SPH | 0.8750 | Plastic | 1.545 | 55.9 | -7.33 |
| 2 | | 3.442 | SPH | 1.4261 | | | | |
| 3 | $L_2$ | 31.851 | SPH | 0.5500 | Plastic | 1.545 | 55.9 | -6.30 |
| 4 | | 3.033 | SPH | 1.0754 | | | | |
| 5 | BS 1 | INF | FLT | 5.0000 | Glass | 1.923 | 18.9 | |
| 6 | | INF | FLT | 0.1000 | | | | |
| 7 | Aperture stop | INF | FLT | 0.1000 | | | | |
| 8 | $L_3$ | 2.511 | ASP | 1.4327 | Plastic | 1.545 | 55.9 | 2.88 |
| 9 | | -3.206 | ASP | 0.7201 | | | | |
| 10 | $L_4$ | -9.463 | ASP | 0.3311 | Plastic | 1.545 | 55.9 | -16.11 |
| 11 | | 99.250 | ASP | 0.2931 | | | | |
| 12 | BS 2 | INF | FLT | 4.000 | Glass | 1.923 | 18.9 | |
| 13 | | INF | FLT | 0.5112 | | | | |
| 14 | $L_5$ | -2.756 | ASP | 0.3715 | Plastic | 1.545 | 55.9 | 9.15 |

TABLE 5A-continued

F/1.8 NIR Imaging System

| $S_i$ | Component | $R_i$ | Shape | $D_i$ | Material | $N_d$ | $V_d$ | $f_i$ at 940 nm |
|---|---|---|---|---|---|---|---|---|
| 15 |  | −1.847 | ASP | 0.1500 |  |  |  |  |
| 16 | Window/filter | INF | FLT | 0.1500 | Glass | 1.516 | 64.1 |  |
| 17 |  | INF | FLT | 0.3500 |  |  |  |  |
| 18 | Image plane | INF | FLT |  |  |  |  |  |

Table 5B provides aspheric coefficients for the NIR light imaging system embodiment shown in FIG. 21F, according to some embodiments.

TABLE 5B

F/1.8 NIR Imaging System

| $S_i$ | $c_i$ | K | A<br>E | B<br>F | C<br>G | D<br>H |
|---|---|---|---|---|---|---|
| 8 | 0.39830935 | 0.00000000 | −6.60001E−03<br>2.59468E−04 | 1.52780E−03<br>−1.89818E−05 | 8.64403E−04<br>0.00000E+00 | −1.02743E−03<br>0.00000E+00 |
| 9 | −0.31195069 | 0.00000000 | 3.29301E−02<br>0.00000E+00 | −1.36213E−03<br>0.00000E+00 | −2.21387E−03<br>0.00000E+00 | 4.64135E−04<br>0.00000E+00 |
| 10 | −0.10567124 | 0.00000000 | 1.22891E−01<br>6.49579E−04 | −4.72270E−02<br>0.00000E+00 | 1.11063E−03<br>0.00000E+00 | −8.08077E−04<br>0.00000E+00 |
| 11 | 0.01007556 | 0.00000000 | 1.04944E−01<br>0.00000E+00 | −2.38963E−02<br>0.00000E+00 | −1.34736E−02<br>0.00000E+00 | 4.87066E−03<br>0.00000E+00 |
| 14 | −0.36280848 | 0.00000000 | −1.30161E−01<br>−3.31689E−03 | 1.75253E−01<br>0.00000E+00 | −9.53637E−02<br>0.00000E+00 | 2.46499E−02<br>0.00000E+00 |
| 15 | −0.54133300 | 0.00000000 | −2.61775E−02<br>0.00000E+00 | 1.41002E−01<br>0.00000E+00 | −5.72923E−02<br>0.00000E+00 | 8.16377E−03<br>0.00000E+00 |

Table 6A provides optical data for the NIR light imaging system embodiment shown in FIG. 22D, according to some embodiments. In this example embodiment:

f=2.035 mm, Fno=1.8, HFOV=41.5 deg, TTL=17.80 mm
Design wavelengths: 1014 nm, 950 nm, 940 nm, 930 nm, 852 nm

TABLE 6A

F/1.8 NIR Imaging System

| $S_i$ | Component | $R_i$ | Shape | $D_i$ | Material | $N_d$ | $V_d$ | $f_i$ at 940 nm |
|---|---|---|---|---|---|---|---|---|
| 0 | Object plane | INF | FLT | INF |  |  |  |  |
| 1 | $L_1$ | 30.501 | SPH | 0.8750 | Plastic | 1.545 | 55.9 | −7.33 |
| 2 |  | 3.442 | SPH | 1.4261 |  |  |  |  |
| 3 | $L_2$ | 31.851 | SPH | 0.5500 | Plastic | 1.545 | 55.9 | −6.30 |
| 4 |  | 3.033 | SPH | 1.0754 |  |  |  |  |
| 5 | BS 1 | INF | FLT | 5.0000 | Glass | 1.923 | 18.9 |  |
| 6 |  | INF | FLT | 0.1000 |  |  |  |  |
| 7 | $L_3$ | 13.110 | SPH | 1.2250 | Plastic | 1.545 | 55.9 | 3.87 |
| 8 |  | −2.381 | ASP | 0.5444 |  |  |  |  |
| 9 | $L_4$ | −6.759 | ASP | 0.3500 | Plastic | 1.661 | 20.4 | −10.20 |
| 10 |  | 155.511 | ASP | 0.2252 |  |  |  |  |
| 11 | Aperture stop | INF | FLT | 0.1000 |  |  |  |  |
| 12 | $L_5$ | 97.024 | ASP | 0.9554 | Plastic | 1.545 | 55.9 | 7.43 |
| 13 |  | −4.135 | ASP | 0.1000 |  |  |  |  |
| 14 |  | INF | FLT | 1.9000 |  |  |  |  |
| 15 | Fold Mirror | INF | FLT | 1.9000 |  |  |  |  |
| 16 |  | INF | FLT | 0.3618 |  |  |  |  |
| 17 | $L_6$ | 4.371 | ASP | 0.5018 | Plastic | 1.661 | 20.4 | 10.91 |
| 18 |  | 11.328 | ASP | 0.1000 |  |  |  |  |
| 19 | Window/filter | INF | FLT | 0.1500 | Glass | 1.516 | 64.1 |  |
| 20 |  | INF | FLT | 0.3500 |  |  |  |  |
| 21 | Image plane | INF | FLT |  |  |  |  |  |

Table 6B provides aspheric coefficients for the NIR light imaging system embodiment shown in FIG. 22D, according to some embodiments.

TABLE 6B

| | | | F/1.8 NIR Imaging System | | | |
|---|---|---|---|---|---|---|
| $S_i$ | $c_i$ | K | A / E | B / F | C / G | D / H |
| 8 | −0.41999908 | 0.00000000 | 4.69973E−02 | −1.07400E−02 | 2.32587E−03 | −1.01502E−04 |
| | | | −3.97498E−05 | 6.38610E−06 | 0.00000E+00 | 0.00000E+00 |
| 9 | −0.14795449 | 0.00000000 | 5.81365E−02 | −2.52303E−02 | 4.78412E−03 | −3.86731E−04 |
| | | | 0.00000E+00 | 0.00000E+00 | 0.00000E+00 | 0.00000E+00 |
| 10 | 0.643041E−02 | 0.00000000 | 4.53020E−02 | −9.54796E−03 | 0.00000E+00 | 0.00000E+00 |
| | | | 0.00000E+00 | 0.00000E+00 | 0.00000E+00 | 0.00000E+00 |
| 12 | 0.01030675 | 0.00000000 | 4.59169E−02 | −1.97578E−03 | 2.67466E−04 | 1.07164E−04 |
| | | | 0.00000E+00 | 0.00000E+00 | 0.00000E+00 | 0.00000E+00 |
| 13 | −0.24183701 | 0.00000000 | 1.84585E−02 | −1.69092E−03 | 1.04804E−03 | 3.91450E−04 |
| | | | 0.00000E+00 | 0.00000E+00 | 0.00000E+00 | 0.00000E+00 |
| 17 | 0.22875549 | 0.00000000 | −2.24867E−02 | −3.46591E−02 | 3.14925E−03 | −1.98153E−03 |
| | | | 1.13162E−03 | −5.75250E−04 | 0.00000E+00 | 0.00000E+00 |
| 18 | 0.08827330 | 0.00000000 | 2.63667E−02 | −5.07448E−02 | 1.17108E−02 | −1.40793E−03 |
| | | | 0.00000E+00 | 0.00000E+00 | 0.00000E+00 | 0.00000E+00 |

Table 7A provides optical data for the NIR light imaging system embodiment shown in FIG. 23D, according to some embodiments. In this example embodiment:
  f=2.035 mm, Fno=1.8, HFOV=41.5 deg, TTL=17.80 mm
  Design wavelengths: 950 nm, 940 nm, 930 nm

TABLE 7A

| | | | F/1.8 NIR Imaging System | | | | | |
|---|---|---|---|---|---|---|---|---|
| $S_i$ | Component | $R_i$ | Shape | $D_i$ | Material | $N_d$ | $V_d$ | $f_i$ at 940 nm |
| 0 | Object plane | INF | FLT | INF | | | | |
| 1 | $L_1$ | 30.501 | SPH | 0.8750 | Plastic | 1.545 | 55.9 | −7.32 |
| 2 | | 3.442 | SPH | 1.4261 | | | | |
| 3 | $L_2$ | 31.851 | SPH | 0.5500 | Plastic | 1.545 | 55.9 | −6.30 |
| 4 | | 3.033 | SPH | 1.0754 | | | | |
| 5 | BS_Prism1 | INF | FLT | 5.0000 | Glass | 1.923 | 18.9 | |
| 6 | | INF | FLT | 0.1000 | | | | |
| 7 | $L_3$ | 3.860 | ASP | 0.7242 | Plastic | 1.545 | 55.9 | 7.48 |
| 8 | | 97.165 | ASP | 0.4382 | | | | |
| 9 | $L_4$ | 9.392 | ASP | 1.2265 | Plastic | 1.545 | 55.9 | 5.46 |
| 10 | | −4.060 | ASP | 0.1000 | | | | |
| 11 | Aperture stop | INF | FLT | 0.1000 | | | | |
| 14 | | INF | FLT | 1.9000 | | | | |
| 15 | Fold Mirror | INF | FLT | 1.9000 | | | | |
| 16 | | INF | FLT | 0.3216 | | | | |
| 17 | $L_5$ | 3.998 | ASP | 0.3282 | Plastic | 1.545 | 55.9 | 14.82 |
| 18 | | 7.820 | ASP | 0.1500 | | | | |
| 19 | Window/filter | INF | FLT | 0.1500 | Glass | 1.516 | 64.1 | |
| 20 | | INF | FLT | 0.3500 | | | | |
| 21 | Image plane | INF | FLT | | | | | |

Table 7B provides aspheric coefficients for the NIR light imaging system embodiment shown in FIG. 23D, according to some embodiments.

TABLE 7B

| | | | F/1.8 NIR Imaging System | | | |
|---|---|---|---|---|---|---|
| $S_i$ | $c_i$ | K | A / E | B / F | C / G | D / H |
| 7 | 0.25908072 | 0.00000000 | 2.14743E−02 | 3.87178E−03 | 9.55827E−04 | −8.23010E−04 |
| | | | 1.78758E−04 | −2.13509E−05 | 0.00000E+00 | 0.00000E+00 |
| 8 | 0.01029181 | 0.00000000 | 5.69319E−02 | 7.30914E−03 | 1.59464E−03 | −8.42688E−04 |
| | | | −5.58463E−05 | 0.00000E+00 | 0.00000E+00 | 0.00000E+00 |
| 9 | 0.10647767 | 0.00000000 | 3.18184E−02 | 8.20082E−04 | 5.32764E−03 | −5.64036E−04 |
| | | | 1.31256E−04 | 8.86136E−06 | 0.00000E+00 | 0.00000E+00 |
| 10 | −0.24631377 | 0.00000000 | 7.28519E−03 | 6.31497E−04 | 2.54527E−03 | −1.68396E−03 |
| | | | 4.36787E−04 | 9.26528E−06 | 0.00000E+00 | 0.00000E+00 |
| 15 | 0.25011758 | 0.00000000 | −5.21949E−03 | −9.82081E−02 | 2.76746E−02 | −9.80390E−03 |
| | | | 3.44814E−03 | −5.48024E−04 | 0.00000E+00 | 0.00000E+00 |

TABLE 7B-continued

| | | | F/1.8 NIR Imaging System | | | |
|---|---|---|---|---|---|---|
| $S_i$ | $c_i$ | K | A<br>E | B<br>F | C<br>G | D<br>H |
| 16 | 0.12787559 | 0.00000000 | 6.71293E−02<br>0.00000E+00 | −1.20622E−01<br>0.00000E+00 | 3.85482E−02<br>0.00000E+00 | −4.04129E−03<br>0.00000E+00 |

Table 8A provides optical data for the visible light imaging system embodiment shown in FIG. 24C, according to some embodiments. In this example embodiment:

f=2.035 mm, Fno=1.8, HFOV=41.5 deg, TTL=13.01 mm
Design wavelengths: 650 nm, 610 nm, 555 nm, 510 nm, 470 nm

TABLE 8A

| | | | F/1.8 Visible Imaging System | | | | | |
|---|---|---|---|---|---|---|---|---|
| $S_i$ | Component | $R_i$ | Shape | $D_i$ | Material | $N_d$ | $V_d$ | $f_i$ at 555 nm |
| 0 | Object plane | INF | FLT | INF | | | | |
| 1 | $L_1$ | 12.829 | SPH | 0.8000 | Plastic | 1.545 | 55.9 | −6.36 |
| 2 | | 2.674 | SPH | 0.8340 | | | | |
| 3 | $L_2$ | 5.919 | SPH | 0.5000 | Plastic | 1.545 | 55.9 | −12.02 |
| 4 | | 3.020 | SPH | 0.7464 | | | | |
| 5 | BS-1 | INF | FLT | 4.2000 | Glass | 1.923 | 18.9 | |
| 6 | | INF | FLT | 0.1000 | | | | |
| 7 | Aperture stop | INF | FLT | 0.1000 | | | | |
| 8 | $L_3$ | 2.199 | ASP | 1.3200 | Plastic | 1.545 | 55.9 | 2.54 |
| 9 | | −2.965 | ASP | 0.3003 | | | | |
| 10 | $L_4$ | −20.279 | ASP | 0.5000 | Plastic | 1.661 | 20.4 | −4.47 |
| 11 | | 3.522 | ASP | 0.1374 | | | | |
| 12 | $L_5$ | 3.193 | ASP | 1.1755 | Plastic | 1.545 | 55.9 | 5.19 |
| 13 | | −21.947 | ASP | 1.0464 | | | | |
| 14 | $L_6$ | 2.554 | ASP | 0.4500 | Plastic | 1.545 | 55.9 | −14.46 |
| 15 | | 1.810 | ASP | 0.3023 | | | | |
| 16 | Window/filter | INF | FLT | 0.1500 | Glass | 1.516 | 64.1 | |
| 17 | | INF | FLT | 0.3500 | | | | |
| 18 | Image plane | INF | FLT | | | | | |

Table 8B provides aspheric coefficients for the visible light imaging system embodiment shown in FIG. 24C, according to some embodiments.

TABLE 8B

| | | | F/1.8 Visible Imaging System | | | |
|---|---|---|---|---|---|---|
| $S_i$ | $c_i$ | K | A<br>E | B<br>F | C<br>G | D<br>H |
| 8 | 0.45482900 | 0.00000000 | −6.71045E−04<br>6.71399E−03 | −6.73711E−03<br>−1.34864E−03 | 1.25891E−02<br>0.00000E+00 | −1.39130E−02<br>0.00000E+00 |
| 9 | −0.33727752 | 0.00000000 | 6.61454E−02<br>1.18531E−03 | −3.98264E−02<br>−2.06363E−04 | 1.38384E−02<br>0.00000E+00 | −4.97936E−03<br>0.00000E+00 |
| 10 | −0.04931149 | 0.00000000 | 4.93108E−03<br>0.00000E+00 | −2.49872E−02<br>0.00000E+00 | 0.00000E+00<br>0.00000E+00 | 0.00000E+00<br>0.00000E+00 |
| 11 | 0.28393438 | 0.00000000 | −1.12732E−01<br>−5.54936E−03 | 1.64114E−01<br>7.77397E−04 | −9.37712E−02<br>0.00000E+00 | 2.57177E−02<br>0.00000E+00 |
| 12 | 0.31314651 | 0.00000000 | −8.99223E−02<br>1.01393E−02 | 1.76013E−01<br>−2.13906E−03 | −7.39360E−02<br>0.00000E+00 | −2.19950E−03<br>0.00000E+00 |
| 13 | −0.04556371 | 0.00000000 | −1.44041E−02<br>3.96090E−02 | 2.00900E−02<br>−9.56601E−03 | 3.56354E−02<br>0.00000E+00 | −5.54281E−02<br>0.00000E+00 |
| 14 | 0.39154231 | 0.00000000 | −1.80325E−01<br>0.00000E+00 | −1.91323E−02<br>0.00000E+00 | 7.05026E−03<br>0.00000E+00 | −5.52421E−03<br>0.00000E+00 |
| 15 | 0.55251850 | 0.00000000 | −1.51567E−01<br>0.00000E+00 | 8.52355E−03<br>0.00000E+00 | −3.74001E−04<br>0.00000E+00 | −3.63561E−04<br>0.00000E+00 |

Table 9A provides optical data for the NIR light imaging system embodiment shown in FIG. 24D, according to some embodiments. In this example embodiment:

f=2.035 mm, Fno=1.8, HFOV=41.5 deg, TTL=12.75 mm
Design wavelengths: 1014 nm, 950 nm, 940 nm, 930 nm, 852 nm

TABLE 9A

F/1.8 NIR Imaging System

| $S_i$ | Component | $R_i$ | Shape | $D_i$ | Material | $N_d$ | $V_d$ | $f_i$ at 940 nm |
|---|---|---|---|---|---|---|---|---|
| 0 | Object plane | INF | FLT | INF | | | | |
| 1 | $L_1$ | 12.829 | SPH | 0.8000 | Plastic | 1.545 | 55.9 | −6.49 |
| 2 | | 2.674 | SPH | 0.8340 | | | | |
| 3 | $L_2$ | 5.919 | SPH | 0.5000 | Plastic | 1.545 | 55.9 | −12.25 |
| 4 | | 3.020 | SPH | 0.7464 | | | | |
| 5 | BS-1 | INF | FLT | 4.2000 | Glass | 1.923 | 18.9 | |
| 6 | | INF | FLT | 0.1000 | | | | |
| 7 | Aperture stop | INF | FLT | 0.1000 | | | | |
| 8 | $L_3$ | 1.945 | ASP | 1.4259 | Plastic | 1.545 | 55.9 | 2.24 |
| 9 | | −2.322 | ASP | 0.1943 | | | | |
| 10 | $L_4$ | 19.271 | ASP | 0.5001 | Plastic | 1.661 | 20.4 | −3.06 |
| 11 | | 1.747 | ASP | 0.2176 | | | | |
| 12 | $L_5$ | 2.606 | ASP | 1.0978 | Plastic | 1.545 | 55.9 | 4.66 |
| 13 | | −49.588 | ASP | 0.7852 | | | | |
| 14 | $L_6$ | 6.091 | ASP | 0.4975 | Plastic | 1.545 | 55.9 | −12.46 |
| 15 | | 3.094 | ASP | 0.2500 | | | | |
| 16 | Window/filter | INF | FLT | 0.1500 | Glass | 1.516 | 64.1 | |
| 17 | | INF | FLT | 0.3500 | | | | |
| 18 | Image plane | INF | FLT | | | | | |

Table 9B provides aspheric coefficients for the NIR light imaging system embodiment shown in FIG. 24D, according to some embodiments.

TABLE 9B

F/1.8 NIR Imaging System

| $S_i$ | $c_i$ | K | A / E | B / F | C / G | D / H |
|---|---|---|---|---|---|---|
| 8 | 0.51402931 | 0.00000000 | −5.95163E−03 | 8.34733E−03 | −1.80621E−02 | 1.39572E−02 |
| | | | −5.37909E−03 | 5.68411E−04 | 0.00000E+00 | 0.00000E+00 |
| 9 | −0.43065125 | 0.00000000 | 9.61061E−02 | −5.42978E−02 | 2.14222E−02 | −7.95600E−03 |
| | | | 1.38058E−03 | −6.34220E−05 | 0.00000E+00 | 0.00000E+00 |
| 10 | 0.05189200 | 0.00000000 | −7.64986E−02 | 4.07768E−02 | −4.78751E−02 | 1.53868E−02 |
| | | | 0.00000E+00 | 0.00000E+00 | 0.00000E+00 | 0.00000E+00 |
| 11 | 0.57254099 | 0.00000000 | −2.37974E−01 | 2.47198E−01 | −2.05788E−01 | 9.70417E−02 |
| | | | −1.90745E−02 | 0.00000E+00 | 0.00000E+00 | 0.00000E+00 |
| 12 | 0.38377665 | 0.00000000 | −4.22881E−02 | 1.21220E−01 | −8.18672E−02 | 3.08416E−02 |
| | | | −4.96031E−03 | 0.00000E+00 | 0.00000E+00 | 0.00000E+00 |
| 13 | −0.02016637 | 0.00000000 | 2.23275E−02 | 5.07407E−02 | −1.52825E−02 | 5.91598E−03 |
| | | | 2.53609E−03 | 0.00000E+00 | 0.00000E+00 | 0.00000E+00 |
| 14 | 0.16418318 | 0.00000000 | −1.23361E−01 | −3.31262E−02 | 2.39031E−02 | −1.13777E−02 |
| | | | 9.72137E−04 | −1.09122E−03 | 0.00000E+00 | 0.00000E+00 |
| 15 | 0.32322884 | 0.00000000 | −6.06591E−02 | −4.63657E−02 | 4.51070E−02 | −2.09553E−02 |
| | | | 4.74578E−03 | −4.21625E−04 | 0.00000E+00 | 0.00000E+00 |

Table 10A provides optical data for the visible light imaging system embodiment shown in FIG. 25C, according to some embodiments. In this example embodiment:
 f=2.035 mm, Fno=1.8, HFOV=41.5 deg, TTL=14.60 mm
 Design wavelengths: 650 nm, 610 nm, 555 nm, 510 nm, 470 nm

TABLE 10A

F/1.8 Visible Imaging System

| $S_i$ | Component | $R_i$ | Shape | $D_i$ | Material | $N_d$ | $V_d$ | $f_i$ at 555 nm |
|---|---|---|---|---|---|---|---|---|
| 0 | Object plane | INF | FLT | INF | | | | |
| 1 | $L_1$ | 30.500 | SPH | 0.8750 | Plastic | 1.545 | 55.9 | −7.89 |
| 2 | | 3.739 | SPH | 0.8340 | | | | |
| 3 | $L_2$ | 31.851 | SPH | 0.5500 | Plastic | 1.545 | 55.9 | −4.96 |
| 4 | | 2.482 | SPH | 0.7464 | | | | |
| 5 | $L_3$ | 9.468 | SPH | 0.5288 | Plastic | 1.545 | 55.9 | 17.33 |
| 6 | | INF | FLT | 0.2000 | | | | |
| 7 | BS-1 | INF | FLT | 4.2000 | Glass | 1.923 | 18.9 | |
| 8 | | INF | FLT | 0.1000 | | | | |

TABLE 10A-continued

| | F/1.8 Visible Imaging System | | | | | | | |
|---|---|---|---|---|---|---|---|---|
| $S_i$ | Component | $R_i$ | Shape | $D_i$ | Material | $N_d$ | $V_d$ | $f_i$ at 555 nm |
| 9 | Aperture stop | INF | FLT | 0.1000 | | | | |
| 10 | $L_4$ | 2.488 | ASP | 1.4511 | Plastic | 1.545 | 55.9 | 2.52 |
| 11 | | −2.446 | ASP | 0.3927 | | | | |
| 12 | $L_5$ | −5.758 | ASP | 0.4999 | Plastic | 1.661 | 20.4 | −4.38 |
| 13 | | 6.139 | ASP | 0.3045 | | | | |
| 14 | $L_6$ | 3.488 | ASP | 1.2156 | Plastic | 1.545 | 55.9 | 9.38 |
| 15 | | 9.568 | ASP | 1.4900 | | | | |
| 16 | L7 | 3.531 | ASP | 0.4500 | Plastic | 1.545 | 55.9 | 20.33 |
| 17 | | 4.943 | ASP | 0.1500 | | | | |
| 18 | Window/filter | INF | FLT | 0.1500 | Glass | 1.516 | 64.1 | |
| 19 | | INF | FLT | 0.3500 | | | | |
| 20 | Image plane | INF | FLT | | | | | |

Table 10B provides aspheric coefficients for the visible light imaging system embodiment shown in FIG. 25C, according to some embodiments.

TABLE 10B

| | F/1.8 Visible Imaging System | | | | | |
|---|---|---|---|---|---|---|
| $S_i$ | $c_i$ | K | A / E | B / F | C / G | D / H |
| 10 | 0.40195309 | 0.00000000 | −5.14108E−04 | 4.39788E−03 | −5.17467E−03 | 2.99766E−03 |
| | | | −1.00123E−03 | 1.10812E−04 | 0.00000E+00 | 0.00000E+00 |
| 11 | −0.40886616 | 0.00000000 | 8.11098E−02 | −3.43869E−02 | 1.21155E−02 | −3.49619E−03 |
| | | | 4.73195E−04 | −1.45161E−05 | 0.00000E+00 | 0.00000E+00 |
| 12 | −0.17366407 | 0.00000000 | 6.91290E−02 | −3.22801E−02 | −3.64583E−03 | 1.11276E−03 |
| | | | 0.00000E+00 | 0.00000E+00 | 0.00000E+00 | 0.00000E+00 |
| 13 | 0.16288569 | 0.00000000 | −1.65375E−02 | 1.06313E−01 | −7.89099E−02 | 2.18252E−02 |
| | | | −2.34915E−03 | 0.00000E+00 | 0.00000E+00 | 0.00000E+00 |
| 14 | 0.28672271 | 0.00000000 | −4.10875E−02 | 1.17674E−01 | −6.66610E−02 | 1.77840E−02 |
| | | | −1.88201E−03 | 0.00000E+00 | 0.00000E+00 | 0.00000E+00 |
| 15 | 0.10451092 | 0.00000000 | −1.07706E−02 | 2.45901E−02 | 2.40375E−04 | 0.00000E+00 |
| | | | 0.00000E+00 | 0.00000E+00 | 0.00000E+00 | 0.00000E+00 |
| 16 | 0.28324218 | 0.00000000 | −5.61037E−02 | −6.48097E−02 | 3.94517E−02 | −4.35983E−02 |
| | | | 2.47814E−02 | −5.86782E−03 | 0.00000E+00 | 0.00000E+00 |
| 17 | 0.20229531 | 0.00000000 | 1.89725E−02 | −6.40731E−02 | 1.28952E−02 | 3.53240E−03 |
| | | | −1.96002E−03 | 2.50193E−04 | 0.00000E+00 | 0.00000E+00 |

Table 11A provides optical data for the NIR light imaging system embodiment shown in FIG. 25D, according to some embodiments. In this example embodiment:

f=2.035 mm, Fno=1.8, HFOV=41.5 deg, TTL=14.81 mm

Design wavelengths: 1014 nm, 950 nm, 940 nm, 930 nm, 852 nm

TABLE 11A

| | F/1.8 NIR Imaging System | | | | | | | |
|---|---|---|---|---|---|---|---|---|
| $S_i$ | Component | $R_i$ | Shape | $D_i$ | Material | $N_d$ | $V_d$ | $f_i$ at 940 nm |
| 0 | Object plane | INF | FLT | INF | | | | |
| 1 | $L_1$ | 30.500 | SPH | 0.8750 | Plastic | 1.545 | 55.9 | −8.05 |
| 2 | | 3.739 | SPH | 0.8340 | | | | |
| 3 | $L_2$ | 31.851 | SPH | 0.5500 | Plastic | 1.545 | 55.9 | −5.06 |
| 4 | | 2.482 | SPH | 0.7464 | | | | |
| 5 | $L_3$ | 9.468 | SPH | 0.5288 | Plastic | 1.545 | 55.9 | 17.68 |
| 6 | | INF | FLT | 0.2000 | | | | |
| 7 | BS-1 | INF | FLT | 4.2000 | Glass | 1.923 | 18.9 | |
| 8 | | INF | FLT | 0.1000 | | | | |
| 9 | Aperture stop | INF | FLT | 0.1000 | | | | |
| 10 | $L_4$ | 2.712 | ASP | 1.3041 | Plastic | 1.545 | 55.9 | 2.63 |
| 11 | | −2.440 | ASP | 0.6168 | | | | |
| 12 | $L_5$ | −5.615 | ASP | 0.5000 | Plastic | 1.661 | 20.4 | −3.57 |
| 13 | | 3.929 | SPH | 0.5178 | | | | |
| 14 | $L_6$ | 2.149 | ASP | 1.6710 | Plastic | 1.545 | 55.9 | 5.77 |
| 15 | | 5.133 | ASP | 0.7581 | | | | |

TABLE 11A-continued

| | | | F/1.8 NIR Imaging System | | | | | |
|---|---|---|---|---|---|---|---|---|
| $S_i$ | Component | $R_i$ | Shape | $D_i$ | Material | $N_d$ | $V_d$ | $f_i$ at 940 nm |
| 16 | $L_7$ | 6.609 | ASP | 0.5000 | Plastic | 1.545 | 55.9 | 12.34 |
| 17 | | INF | FLT | 0.2500 | | | | |
| 18 | Window/filter | INF | FLT | 0.1500 | Glass | 1.516 | 64.1 | |
| 19 | | INF | FLT | 0.4107 | | | | |
| 20 | Image plane | INF | FLT | | | | | |

Table 11B provides aspheric coefficients for the NIR light imaging system embodiment shown in FIG. 25D, according to some embodiments.

TABLE 11B

| | | | F/1.8 NIR Imaging System | | | |
|---|---|---|---|---|---|---|
| $S_i$ | $c_i$ | K | A / E | B / F | C / G | D / H |
| 10 | 0.36866645 | 0.00000000 | −2.99425E−03 | 6.28827E−03 | −4.72012E−03 | 1.40979E−03 |
| | | | −8.33269E−05 | −2.94730E−05 | 0.00000E+00 | 0.00000E+00 |
| 11 | −0.40985935 | 0.00000000 | 6.57620E−02 | −1.42372E−02 | −1.32677E−03 | 2.02013E−03 |
| | | | −3.58915E−04 | −5.80293E−06 | 0.00000E+00 | 0.00000E+00 |
| 12 | −0.17809630 | 0.00000000 | 9.70168E−02 | −6.41702E−02 | 1.74501E−02 | −2.04520E−03 |
| | | | 0.00000E+00 | 0.00000E+00 | 0.00000E+00 | 0.00000E+00 |
| 14 | 0.46529592 | 0.00000000 | −6.06393E−02 | 2.41464E−02 | 1.28121E−03 | −2.45928E−03 |
| | | | 3.85804E−04 | 0.00000E+00 | 0.00000E+00 | 0.00000E+00 |
| 15 | 0.19483219 | 0.00000000 | −4.96939E−02 | 1.61264E−02 | −1.13516E−03 | 5.79406E−03 |
| | | | −1.49404E−03 | 0.00000E+00 | 0.00000E+00 | 0.00000E+00 |
| 16 | 0.15130928 | 0.00000000 | −1.01021E−01 | 8.17447E−04 | −1.85015E−03 | −1.35324E−02 |
| | | | 1.46005E−02 | −4.12931E−03 | 0.00000E+00 | 0.00000E+00 |

Table 12A provides optical data for the visible light imaging system embodiment shown in FIG, according to some embodiments. 26C. In this example embodiment:

f=2.035 mm, Fno=1.8, HFOV=41.5 deg, TTL=13.52 mm
Design wavelengths: 650 nm, 610 nm, 555 nm, 510 nm, 470 nm

TABLE 12A

| | | | F/1.8 Visible Imaging System | | | | | |
|---|---|---|---|---|---|---|---|---|
| $S_i$ | Component | $R_i$ | Shape | $D_i$ | Material | $N_d$ | $V_d$ | $f_i$ at 555 nm |
| 0 | Object plane | INF | FLT | INF | | | | |
| 1 | $L_1$ | 21.178 | SPH | 0.8000 | Plastic | 1.545 | 55.9 | −5.84 |
| 2 | | 2.735 | SPH | 1.0097 | | | | |
| 3 | $L_2$ | 54.752 | SPH | 0.5000 | Plastic | 1.545 | 55.9 | −6.96 |
| 4 | | 3.545 | SPH | 0.5615 | | | | |
| 5 | $L_3$ | 15.485 | SPH | 0.4288 | Glass | 1.923 | 18.9 | 16.62 |
| 6 | | INF | FLT | 0.0000 | | | | |
| 7 | BS-1 | INF | FLT | 3.4000 | Glass | 1.923 | 18.9 | |
| 8 | | INF | FLT | 0.1000 | | | | |
| 9 | Aperture stop | INF | FLT | 0.1000 | | | | |
| 10 | $L_4$ | 2.613 | ASP | 1.3630 | Plastic | 1.545 | 55.9 | 2.41 |
| 11 | | −2.157 | ASP | 0.3074 | | | | |
| 12 | $L_5$ | −1.585 | ASP | 0.4976 | Plastic | 1.661 | 20.4 | −4.03 |
| 13 | | −4.358 | ASP | 0.8586 | | | | |
| 14 | $L_6$ | 1.937 | ASP | 1.2362 | Plastic | 1.545 | 55.9 | 5.70 |
| 15 | | 3.968 | ASP | 1.1985 | | | | |
| 16 | $L_7$ | 10.408 | ASP | 0.4000 | Plastic | 1.545 | 55.9 | 19.05 |
| 17 | | INF | FLT | 0.2500 | | | | |
| 18 | Window/filter | INF | FLT | 0.1500 | Glass | 1.516 | 64.1 | |
| 19 | | INF | FLT | 0.3572 | | | | |
| 20 | Image plane | INF | FLT | | | | | |

Table 12B provides aspheric coefficients for the visible light imaging system embodiment shown in FIG. 26C, according to some embodiments.

TABLE 12B

| | | | A | B | C | D |
|---|---|---|---|---|---|---|
| $S_i$ | $c_i$ | K | E | F | G | H |
| | | | F/1.8 Visible Imaging System | | | |
| 10 | 0.38270074 | 0.00000000 | −6.29144E−03 | 3.57658E−03 | −2.10274E−02 | 2.17796E−02 |
| | | | −1.28913E−02 | 2.24467E−03 | 0.00000E+00 | 0.00000E+00 |
| 11 | −0.46367871 | 0.00000000 | 5.44274E−02 | −2.19551E−02 | 2.14644E−03 | −5.81407E−03 |
| | | | 3.35807E−03 | −6.06394E−04 | 0.00000E+00 | 0.00000E+00 |
| 12 | −0.63089537 | 0.00000000 | 8.58404E−02 | 2.58186E−02 | −2.58206E−02 | 1.32718E−02 |
| | | | −2.61654E−03 | 5.49565E−04 | 0.00000E+00 | 0.00000E+00 |
| 13 | −0.22945346 | 0.00000000 | −4.15251E−02 | 8.61665E−02 | −5.33245E−02 | 2.37794E−02 |
| | | | −4.05071E−03 | −1.56600E−04 | 0.00000E+00 | 0.00000E+00 |
| 14 | 0.51625296 | 0.00000000 | −9.77326E−02 | 3.95870E−02 | −1.29275E−02 | 3.46290E−03 |
| | | | −4.96044E−04 | 0.00000E+00 | 0.00000E+00 | 0.00000E+00 |
| 15 | 0.25200506 | 0.00000000 | −7.07836E−02 | 2.20611E−02 | −1.26157E−03 | −2.61575E−03 |
| | | | 2.06827E−03 | −3.95737E−04 | 0.00000E+00 | 0.00000E+00 |
| 16 | 0.09608366 | 0.00000000 | −9.13716E−02 | −5.17503E−03 | −2.50880E−03 | 0.00000E+00 |
| | | | 0.00000E+00 | 0.00000E+00 | 0.00000E+00 | 0.00000E+00 |

Table 13A provides optical data for the NIR light imaging system embodiment shown in FIG. 26D, according to some embodiments. In this example embodiment:
f=2.035 mm, Fno=1.8, HFOV=41.5 deg, TTL=13.50 mm
Design wavelengths: 1014 nm, 950 nm, 940 nm, 930 nm, 852 nm

TABLE 13A

| | | | F/1.8 NIR Imaging System | | | | |
|---|---|---|---|---|---|---|---|
| $S_i$ | Component | $R_i$ | Shape | $D_i$ | Material | $N_d$ | $V_d$ | $f_i$ at 940 nm |
| 0 | Object plane | INF | FLT | INF | | | | |
| 1 | $L_1$ | 21.178 | SPH | 0.8000 | Plastic | 1.545 | 55.9 | −5.95 |
| 2 | | 2.735 | SPH | 1.0097 | | | | |
| 3 | $L_2$ | 54.752 | SPH | 0.5000 | Plastic | 1.545 | 55.9 | −7.10 |
| 4 | | 3.545 | SPH | 0.5615 | | | | |
| 5 | $L_3$ | 15.485 | SPH | 0.4288 | Glass | 1.923 | 18.9 | 17.56 |
| 6 | | INF | FLT | 0.0000 | | | | |
| 7 | BS-1 | INF | FLT | 3.4000 | Glass | 1.923 | 18.9 | |
| 8 | | INF | FLT | 0.1000 | | | | |
| 9 | Aperture stop | INF | FLT | 0.1000 | | | | |
| 10 | $L_4$ | 2.727 | ASP | 1.3694 | Plastic | 1.545 | 55.9 | 2.22 |
| 11 | | −1.734 | ASP | 0.2599 | | | | |
| 12 | $L_5$ | −1.608 | ASP | 0.5000 | Plastic | 1.661 | 20.4 | −3.33 |
| 13 | | −7.510 | ASP | 0.7932 | | | | |
| 14 | $L_6$ | 1.920 | ASP | 1.5442 | Plastic | 1.545 | 55.9 | 6.30 |
| 15 | | 3.205 | ASP | 0.8343 | | | | |
| 16 | $L_7$ | 7.823 | ASP | 0.5000 | Plastic | 1.545 | 55.9 | 14.60 |
| 17 | | INF | FLT | 0.2500 | | | | |
| 18 | Window/filter | INF | FLT | 0.1500 | Glass | 1.516 | 64.1 | |
| 19 | | INF | FLT | 0.4034 | | | | |
| 20 | Image plane | INF | FLT | | | | | |

Table 13B provides aspheric coefficients for the NIR light imaging system embodiment shown in FIG. 26D, according to some embodiments.

TABLE 13B

| | | | A | B | C | D |
|---|---|---|---|---|---|---|
| $S_i$ | $c_i$ | K | E | F | G | H |
| | | | F/1.8 NIR Imaging System | | | |
| 10 | 0.36676639 | 0.00000000 | −8.65005E−03 | −3.99537E−03 | −8.06513E−03 | 9.17701E−03 |
| | | | −6.94146E−03 | 1.01649E−03 | 0.00000E+00 | 0.00000E+00 |
| 11 | −0.57672586 | 0.00000000 | 1.07429E−01 | −4.67872E−02 | 1.68792E−02 | −9.83009E−03 |
| | | | 3.72396E−03 | −5.39705E−04 | 0.00000E+00 | 0.00000E+00 |
| 12 | −0.62177665 | 0.00000000 | 1.23289E−01 | −2.15749E−03 | −1.34804E−02 | 7.11163E−03 |
| | | | 0.00000E+00 | 0.00000E+00 | 0.00000E+00 | 0.00000E+00 |
| 13 | −0.13316350 | 0.00000000 | −6.69483E−02 | 1.13361E−01 | −7.68952E−02 | 3.36698E−02 |
| | | | −6.07390E−03 | 0.00000E+00 | 0.00000E+00 | 0.00000E+00 |

TABLE 13B-continued

| | | | F/1.8 NIR Imaging System | | | |
|---|---|---|---|---|---|---|
| $S_i$ | $c_i$ | K | A / E | B / F | C / G | D / H |
| 14 | 0.52085042 | 0.00000000 | −1.09013E−01 | 5.19360E−02 | −1.84153E−02 | 4.77689E−03 |
| | | | −6.50159E−04 | 0.00000E+00 | 0.00000E+00 | 0.00000E+00 |
| 15 | 0.31199811 | 0.00000000 | −9.13359E−02 | 3.67283E−02 | −9.24492E−03 | 1.58936E−03 |
| | | | 5.37547E−04 | 0.00000E+00 | 0.00000E+00 | 0.00000E+00 |
| 16 | 0.12782856 | 0.00000000 | −1.07661E−01 | −1.90834E−03 | −4.47709E−03 | 6.08342E−04 |
| | | | 0.00000E+00 | 0.00000E+00 | 0.00000E+00 | 0.00000E+00 |

Table 14A provides optical data for the visible light imaging system embodiment shown in FIG. 27C, according to some embodiments. In this example embodiment:

f=2.035 mm, Fno=1.8, HFOV=41.5 deg, TTL=13.89 mm

Design wavelengths: 650 nm, 610 nm, 555 nm, 510 nm, 470 nm

TABLE 14A

| | | F/1.8 Visible Imaging System | | | | | | |
|---|---|---|---|---|---|---|---|---|
| $S_i$ | Component | $R_i$ | Shape | $D_i$ | Material | $N_d$ | $V_d$ | $f_i$ at 555 nm |
| 0 | Object plane | INF | FLT | INF | | | | |
| 1 | $L_1$ | 21.178 | SPH | 0.8000 | Plastic | 1.545 | 55.9 | −5.84 |
| 2 | | 2.735 | SPH | 1.0097 | | | | |
| 3 | $L_2$ | 54.752 | SPH | 0.5000 | Plastic | 1.545 | 55.9 | −6.96 |
| 4 | | 3.545 | SPH | 0.5615 | | | | |
| 5 | L3-Prism | 15.485 | SPH | 4.1288 | Glass | 1.923 | 18.9 | 16.62 |
| 6 | | INF | FLT | 0.1000 | | | | |
| 7 | Aperture stop | INF | FLT | 0.1000 | | | | |
| 8 | $L_4$ | 2.666 | ASP | 1.3630 | Plastic | 1.545 | 55.9 | 2.45 |
| 9 | | −2.202 | ASP | 0.2855 | | | | |
| 10 | $L_5$ | −1.626 | ASP | 0.4976 | Plastic | 1.661 | 20.4 | −4.47 |
| 11 | | −4.013 | ASP | 0.9329 | | | | |
| 12 | $L_6$ | 2.026 | ASP | 1.2362 | Plastic | 1.545 | 55.9 | 6.66 |
| 13 | | 3.584 | ASP | 1.2079 | | | | |
| 14 | $L_7$ | 9.183 | ASP | 0.4000 | Plastic | 1.545 | 55.9 | 16.81 |
| 15 | | INF | FLT | 0.2500 | | | | |
| 16 | Window/filter | INF | FLT | 0.1500 | Glass | 1.516 | 64.1 | |
| 17 | | INF | FLT | 0.3712 | | | | |
| 18 | Image plane | INF | FLT | | | | | |

Table 14B provides aspheric coefficients for the visible light imaging system embodiment shown in FIG. 27C, according to some embodiments.

TABLE 14B

| | | | F/1.8 Visible Imaging System | | | |
|---|---|---|---|---|---|---|
| $S_i$ | $c_i$ | K | A / E | B / F | C / G | D / H |
| 8 | 0.37505681 | 0.00000000 | −6.86846E−03 | 3.82110E−03 | −2.10344E−02 | 2.02748E−02 |
| | | | −1.13094E−02 | 1.78614E−03 | 0.00000E+00 | 0.00000E+00 |
| 9 | −0.45405702 | 0.00000000 | 4.94172E−02 | −1.85260E−02 | −7.75888E−05 | −4.69306E−03 |
| | | | 3.17856E−03 | −6.31434E−04 | 0.00000E+00 | 0.00000E+00 |
| 10 | −0.61507956 | 0.00000000 | 8.47049E−02 | 2.86922E−02 | −2.69684E−02 | 1.32526E−02 |
| | | | −2.53085E−03 | 3.99053E−04 | 0.00000E+00 | 0.00000E+00 |
| 11 | −0.24917402 | 0.00000000 | −2.54864E−02 | 7.76255E−02 | −4.89954E−02 | 2.33628E−02 |
| | | | −4.47234E−03 | −6.29302E−05 | 0.00000E+00 | 0.00000E+00 |
| 12 | 0.49363590 | 0.00000000 | −8.63370E−02 | 3.51092E−02 | −1.04005E−02 | 2.67496E−03 |
| | | | −3.72513E−04 | 0.00000E+00 | 0.00000E+00 | 0.00000E+00 |
| 13 | 0.27905520 | 0.00000000 | −7.55124E−02 | 2.41433E−02 | −1.66905E−03 | −3.17410E−03 |
| | | | 2.57893E−03 | −5.31785E−04 | 0.00000E+00 | 0.00000E+00 |
| 14 | 0.10889663 | 0.00000000 | −9.07744E−02 | −5.90957E−03 | −2.73590E−03 | 0.00000E+00 |
| | | | 0.00000E+00 | 0.00000E+00 | 0.00000E+00 | 0.00000E+00 |

Table 15A provides optical data for the NIR light imaging system embodiment shown in FIG. 27D, according to some embodiments. In this example embodiment:

f=2.035 mm, Fno=1.8, HFOV=41.5 deg, TTL=13.16 mm

Design wavelengths: 1014 nm, 950 nm, 940 nm, 930 nm, 852 nm

TABLE 15A

F/1.8 NIR Imaging System

| $S_i$ | Component | $R_i$ | Shape | $D_i$ | Material | $N_d$ | $V_d$ | $f_i$ at 940 nm |
|---|---|---|---|---|---|---|---|---|
| 0 | Object plane | INF | FLT | INF | | | | |
| 1 | $L_1$ | 21.178 | SPH | 0.8000 | Plastic | 1.545 | 55.9 | −5.95 |
| 2 | | 2.735 | SPH | 1.0097 | | | | |
| 3 | $L_2$ | 54.752 | SPH | 0.5000 | Plastic | 1.545 | 55.9 | −7.10 |
| 4 | | 3.545 | SPH | 0.5615 | | | | |
| 5 | L3-Prism | 15.485 | SPH | 4.1288 | Glass | 1.923 | 18.9 | 17.56 |
| 6 | | INF | FLT | 0.1000 | | | | |
| 7 | Aperture stop | INF | FLT | 0.1000 | | | | |
| 8 | $L_4$ | 2.110 | ASP | 1.4657 | Plastic | 1.545 | 55.9 | 2.17 |
| 9 | | −1.968 | ASP | 0.3099 | | | | |
| 10 | $L_5$ | −1.788 | ASP | 0.4989 | Plastic | 1.661 | 20.4 | −2.96 |
| 11 | | −42.161 | ASP | 0.4972 | | | | |
| 12 | $L_6$ | 1.628 | ASP | 0.8606 | Plastic | 1.545 | 55.9 | 6.09 |
| 13 | | 2.651 | ASP | 1.1649 | | | | |
| 14 | $L_7$ | 8.483 | ASP | 0.4000 | Plastic | 1.545 | 55.9 | 15.84 |
| 15 | | INF | FLT | 0.2500 | | | | |
| 16 | Window/filter | INF | FLT | 0.1500 | Glass | 1.516 | 64.1 | |
| 17 | | INF | FLT | 0.3592 | | | | |
| 18 | Image plane | INF | FLT | | | | | |

Table 15B provides aspheric coefficients for the NIR light imaging system embodiment shown in FIG. 27D, according to some embodiments.

TABLE 15B

F/1.8 NIR Imaging System

| $S_i$ | $c_i$ | K | A / E | B / F | C / G | D / H |
|---|---|---|---|---|---|---|
| 8 | 0.47397645 | 0.00000000 | −5.79006E−03 | 3.80534E−03 | −8.27019E−03 | 6.78273E−03 |
| | | | −3.94807E−03 | 6.87851E−04 | 0.00000E+00 | 0.00000E+00 |
| 9 | −0.50802103 | 0.00000000 | 1.29946E−01 | −5.10662E−02 | 9.00053E−03 | −5.65666E−03 |
| | | | 3.24375E−03 | −5.36914E−04 | 0.00000E+00 | 0.00000E+00 |
| 10 | −0.55927167 | 0.00000000 | 1.38825E−01 | −3.25146E−02 | −2.60685E−02 | 2.11269E−02 |
| | | | −2.13742E−03 | −4.31674E−04 | 0.00000E+00 | 0.00000E+00 |
| 11 | −0.02371843 | 0.00000000 | −1.70117E−01 | 2.57474E−01 | −2.24768E−01 | 1.22084E−01 |
| | | | −2.93644E−02 | 2.08643E−03 | 0.00000E+00 | 0.00000E+00 |
| 12 | 0.61436466 | 0.00000000 | −2.68168E−01 | 1.41724E−01 | −4.34887E−02 | 9.11962E−03 |
| | | | −3.80053E−04 | −4.98202E−04 | 0.00000E+00 | 0.00000E+00 |
| 13 | 0.37720393 | 0.00000000 | −1.26461E−01 | 3.60190E−02 | 4.98724E−02 | −5.50679E−02 |
| | | | 2.90791E−02 | −5.46253E−03 | 0.00000E+00 | 0.00000E+00 |
| 14 | 0.11788751 | 0.00000000 | −7.86972E−02 | −3.30975E−03 | 3.41601E−03 | 0.00000E+00 |
| | | | 0.00000E+00 | 0.00000E+00 | 0.00000E+00 | 0.00000E+00 |

Table 16A provides optical data for the visible light imaging system embodiment shown in FIG. 28C, according to some embodiments. In this example embodiment:

f=2.035 mm, Fno=1.8, HFOV=41.5 deg, TTL=13.46 mm

Design wavelengths: 650 nm, 610 nm, 555 nm, 510 nm, 470 nm

TABLE 16A

F/1.8 Visible Imaging System

| $S_i$ | Component | $R_i$ | Shape | $D_i$ | Material | $N_d$ | $V_d$ | $f_i$ at 555 nm |
|---|---|---|---|---|---|---|---|---|
| 0 | Object plane | INF | FLT | INF | | | | |
| 1 | $L_1$ | 13.128 | SPH | 0.7000 | Plastic | 1.545 | 55.9 | −7.85 |
| 2 | | 3.172 | SPH | 1.0110 | | | | |

TABLE 16A-continued

| | F/1.8 Visible Imaging System | | | | | | | |
|---|---|---|---|---|---|---|---|---|
| $S_i$ | Component | $R_i$ | Shape | $D_i$ | Material | $N_d$ | $V_d$ | $f_i$ at 555 nm |
| 3 | $L_2$ | −15.593 | SPH | 0.5000 | Plastic | 1.545 | 55.9 | −5.98 |
| 4 | | 4.179 | SPH | 0.5590 | | | | |
| 5 | BS-1 | INF | FLT | 4.0000 | Glass | 1.923 | 18.9 | |
| 6 | | INF | FLT | 0.1000 | | | | |
| 7 | Aperture stop | INF | FLT | 0.1000 | | | | |
| 8 | $L_3$ | 2.203 | ASP | 1.3630 | Plastic | 1.545 | 55.9 | 2.48 |
| 9 | | −2.743 | ASP | 0.7192 | | | | |
| 10 | $L_4$ | −1.561 | ASP | 0.4976 | Plastic | 1.661 | 20.4 | −4.05 |
| 11 | | −4.172 | ASP | 0.4007 | | | | |
| 12 | $L_5$ | 2.129 | ASP | 1.2362 | Plastic | 1.545 | 55.9 | 5.17 |
| 13 | | 6.862 | ASP | 1.1240 | | | | |
| 14 | $L_6$ | 9.914 | ASP | 0.4000 | Plastic | 1.545 | 55.9 | 18.15 |
| 15 | | INF | FLT | 0.2500 | | | | |
| 16 | Window/filter | INF | FLT | 0.1500 | Glass | 1.516 | 64.1 | |
| 17 | | INF | FLT | 0.3500 | | | | |
| 18 | Image plane | INF | FLT | | | | | |

Table 16B provides aspheric coefficients for the visible light imaging system embodiment shown in FIG. 28C, according to some embodiments.

TABLE 16B

| | | | | | | |
|---|---|---|---|---|---|---|
| | | | \multicolumn{4}{c}{F/1.8 Visible Imaging System} |
| $S_i$ | $c_i$ | K | A / E | B / F | C / G | D / H |
| 8 | 0.45400853 | 0.00000000 | −1.45195E−02 | 5.28579E−03 | −1.79063E−02 | 1.72027E−02 |
| | | | −8.19270E−03 | 1.29104E−03 | 0.00000E+00 | 0.00000E+00 |
| 9 | −0.36455174 | 0.00000000 | 3.48394E−02 | −1.21857E−02 | 8.38584E−03 | −7.05533E−03 |
| | | | 1.72452E−03 | −1.22072E−04 | 0.00000E+00 | 0.00000E+00 |
| 10 | −0.64066064 | 0.00000000 | 1.87050E−01 | −1.66138E−02 | 1.68086E−03 | −2.35114E−03 |
| | | | −4.76389E−03 | 2.61801E−03 | 0.00000E+00 | 0.00000E+00 |
| 11 | −0.23970681 | 0.00000000 | 8.07774E−03 | 1.14626E−01 | −4.87978E−02 | 1.54584E−02 |
| | | | −1.21704E−02 | 3.34179E−03 | 0.00000E+00 | 0.00000E+00 |
| 12 | 0.46970980 | 0.00000000 | −1.50200E−01 | 1.21999E−01 | −4.45716E−02 | 8.89797E−03 |
| | | | −8.14860E−04 | 0.00000E+00 | 0.00000E+00 | 0.00000E+00 |
| 13 | 0.14573415 | 0.00000000 | −8.32833E−02 | 4.15275E−02 | 3.99776E−03 | −1.20696E−02 |
| | | | 8.35090E−03 | −1.68072E−03 | 0.00000E+00 | 0.00000E+00 |
| 14 | 0.10087133 | 0.00000000 | −9.54899E−02 | 7.95876E−04 | −9.13787E−04 | 0.00000E+00 |
| | | | 0.00000E+00 | 0.00000E+00 | 0.00000E+00 | 0.00000E+00 |

Table 17A provides optical data for the NIR light imaging system embodiment shown in FIG. 28D, according to some embodiments. In this example embodiment:

f=2.035 mm, Fno=1.8, HFOV=41.5 deg, TTL=13.06 mm
Design wavelengths: 1014 nm, 950 nm, 940 nm, 930 nm, 852 nm

TABLE 17A

| | F/1.8 NIR Imaging System | | | | | | | |
|---|---|---|---|---|---|---|---|---|
| $S_i$ | Component | $R_i$ | Shape | $D_i$ | Material | $N_d$ | $V_d$ | $f_i$ at 940 nm |
| 0 | Object plane | INF | FLT | INF | | | | |
| 1 | $L_1$ | 13.128 | SPH | 0.7000 | Plastic | 1.545 | 55.9 | −8.00 |
| 2 | | 3.172 | SPH | 1.0110 | | | | |
| 3 | $L_2$ | −15.593 | SPH | 0.5000 | Plastic | 1.545 | 55.9 | −6.10 |
| 4 | | 4.179 | SPH | 0.5590 | | | | |
| 5 | BS-1 | INF | FLT | 4.0000 | Glass | 1.923 | 18.9 | |
| 6 | | INF | FLT | 0.1000 | | | | |
| 7 | Aperture stop | INF | FLT | 0.1000 | | | | |
| 8 | $L_3$ | 2.099 | ASP | 1.4657 | Plastic | 1.545 | 55.9 | 2.20 |
| 9 | | −2.036 | ASP | 0.4312 | | | | |
| 10 | $L_4$ | −2.319 | ASP | 0.4989 | Plastic | 1.661 | 20.4 | −3.16 |
| 11 | | 16.131 | ASP | 0.4964 | | | | |
| 12 | $L_5$ | 1.684 | ASP | 0.8606 | Plastic | 1.545 | 55.9 | 7.16 |
| 13 | | 2.467 | ASP | 1.1004 | | | | |

TABLE 17A-continued

F/1.8 NIR Imaging System

| $S_i$ | Component | $R_i$ | Shape | $D_i$ | Material | $N_d$ | $V_d$ | $f_i$ at 940 nm |
|---|---|---|---|---|---|---|---|---|
| 14 | $L_6$ | 4.974 | ASP | 0.4000 | Plastic | 1.545 | 55.9 | 9.29 |
| 15 | | INF | FLT | 0.2500 | | | | |
| 16 | Window/filter | INF | FLT | 0.1500 | Glass | 1.516 | 64.1 | |
| 17 | | INF | FLT | 0.4352 | | | | |
| 18 | Image plane | INF | FLT | | | | | |

Table 17B provides aspheric coefficients for the NIR light imaging system embodiment shown in FIG. 28D, according to some embodiments.

TABLE 17B

F/1.8 NIR Imaging System

| $S_i$ | $c_i$ | K | A / E | B / F | C / G | D / H |
|---|---|---|---|---|---|---|
| 8 | 0.47651240 | 0.00000000 | −1.63396E−02 | 5.00829E−03 | −1.12603E−02 | 6.75489E−03 |
| | | | −2.55977E−03 | 2.29440E−04 | 0.00000E+00 | 0.00000E+00 |
| 9 | −0.49111129 | 0.00000000 | 9.98595E−02 | −3.76022E−02 | 1.30822E−02 | −7.46182E−03 |
| | | | 2.57810E−03 | −3.68154E−04 | 0.00000E+00 | 0.00000E+00 |
| 10 | −0.43131222 | 0.00000000 | 1.24304E−01 | −7.10702E−03 | −2.18824E−02 | 1.39281E−02 |
| | | | −3.78181E−03 | 4.69283E−04 | 0.00000E+00 | 0.00000E+00 |
| 11 | 0.06199162 | 0.00000000 | −1.47423E−01 | 2.70026E−01 | −2.14684E−01 | 1.13452E−01 |
| | | | −2.60342E−02 | 7.18828E−04 | 0.00000E+00 | 0.00000E+00 |
| 12 | 0.59376856 | 0.00000000 | −2.75532E−01 | 1.59078E−01 | −3.63663E−02 | 2.78907E−03 |
| | | | −2.82717E−05 | −1.48101E−04 | 0.00000E+00 | 0.00000E+00 |
| 13 | 0.40530217 | 0.00000000 | −1.55911E−01 | 6.94992E−02 | 3.60214E−02 | −5.37324E−02 |
| | | | 3.19301E−02 | −6.41043E−03 | 0.00000E+00 | 0.00000E+00 |
| 14 | 0.20102803 | 0.00000000 | −7.88995E−02 | −1.14683E−03 | 3.07072E−03 | 0.00000E+00 |
| | | | 0.00000E+00 | 0.00000E+00 | 0.00000E+00 | 0.00000E+00 |

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An optical system, comprising:
a front lens group comprising one or more refractive lens elements;
a beam splitter;
a visible light lens group comprising one or more refractive lens elements; and
a near-infrared (NIR) lens group comprising one or more refractive lens elements;
wherein the front lens group is configured to receive visible and NIR light from an object field and refract the visible and NIR light to the beam splitter;
wherein the beam splitter is configured to direct the visible light to the visible light lens group and direct the NIR light to the NIR light lens group;
wherein the visible light lens group is configured to refract the visible light to form a visible light image at a visible light sensor;
wherein the NIR light lens group is configured to refract the NIR light to form a NIR light image at a NIR light sensor; and
wherein a field of view (FOV) of the visible light image formed by the visible light lens group at the visible light sensor is different than a FOV of the NIR light image formed by the NIR light lens group at the NIR light sensor.

2. The optical system as recited in claim 1, wherein F/number of the visible light lens group is different than F/number of the NIR light lens group.

3. The optical system as recited in claim 1, wherein the front lens group comprises two refractive lenses with negative refractive power.

4. The optical system as recited in claim 1, wherein the beam splitter comprises two prisms formed as a single unit, where a first prism has a surface that reflects NIR light and passes visible light, and wherein a second prism has a surface that reflects visible light and passes NIR light.

5. The optical system as recited in claim 1, wherein the visible light lens group and the NIR light lens group each includes four refractive lens elements.

6. The optical system as recited in claim 5, wherein the visible light lens group and the NIR light lens group each includes, from an object side of the lens group to an image side of the lens group:
- a first refractive lens element with a positive refractive power;
- a second refractive lens element with a negative refractive power;
- a third refractive lens element with a positive refractive power; and
- a fourth refractive lens element with a negative refractive power.

7. The optical system as recited in claim 5, wherein the visible light lens group and the NIR light lens group each includes an aperture stop located between a first lens element and a second lens element from an object side of the lens group.

8. The optical system as recited in claim 1, wherein the refractive lens elements in the visible light lens group are different than the corresponding refractive lens elements in the NIR light lens group.

9. The optical system as recited in claim 1, wherein the refractive lens elements in the visible light lens group are the same as the corresponding refractive lens elements in the NIR light lens group.

10. The optical system as recited in claim 1, wherein at least one lens element in the visible light lens group is the same as its corresponding lens element in the NIR light lens group, and at least one other lens element in the visible light lens group is different than its corresponding lens element in the NIR light lens group.

11. The optical system as recited in claim 1,
- wherein the visible light sensor is a 4.4 mm diagonal visible light sensor, and wherein the visible light lens group in combination with the front lens group provides a 1.96 mm effective focal length, an F/number of F/2.0, and a 120 degree FOV at the visible light sensor; and
- wherein the NIR light sensor is a 3.6 mm diagonal NIR light sensor, and wherein the NIR light lens group in combination with the front lens group provides a 2.42 mm effective focal length, an F/number of F/1.8, and a 83.17 degree FOV at the NIR light sensor.

12. The optical system as recited in claim 1,
- wherein the visible light sensor is a 4.4 mm diagonal visible light sensor, and wherein the visible light lens group in combination with the front lens group provides a 2.0 mm effective focal length, an F/number of F/2.0, and a 118.9 degree FOV at the visible light sensor; and
- wherein the NIR light sensor is a 3.6 mm diagonal NIR light sensor, and wherein the NIR light lens group in combination with the front lens group provides a 1.95 mm effective focal length, an F/number of F/1.8, and a 101 degree FOV at the NIR light sensor.

13. The optical system as recited in claim 1, wherein the beam splitter directs visible light towards the visible light lens group at a 90 degree angle from the optical axis of the front lens group, and directs NIR light towards the NIR light lens group at a 90 degree angle from the optical axis of the front lens group.

14. The optical system as recited in claim 13, wherein the NIR light lens group is positioned at 180 degrees from the visible light lens group or at 90 degrees from the visible light lens group.

15. The optical system as recited in claim 1, further comprising a MR light source that is configured to emit NIR light through the front lens group towards the object field, wherein a portion of the NIR light emitted by the NIR light source is reflected from the object field to the front lens group of the optical system.

16. A method, comprising:
- receiving, at a front lens group of an optical system, visible and near-infrared (NIR) light from an object field, the front lens group comprising one or more refractive lens elements;
- refracting, by the front lens group, the visible and the NIR light to a beam splitter;
- splitting, by the beam splitter, the visible light and the NIR light to a visible light lens group and a NIR light lens group respectively, wherein the visible light lens group comprises one or more refractive lens elements and the near-infrared (NIR) lens group comprises one or more refractive lens elements;
- refracting, by the visible light lens group, the visible light to form a visible light image at a visible light sensor; and
- refracting, by the NIR light lens group, the NIR light to form a NIR light image at a NIR light sensor;
- wherein a field of view (FOV) of the visible light image formed by the visible light lens group at the visible light sensor is different than a FOV of the NIR light image formed by the NIR light lens group at the NIR light sensor.

17. The method as recited in claim 16, wherein F/number of the visible light lens group is different than F/number of the NIR light lens group.

18. The method as recited in claim 16, wherein the beam splitter comprises two prisms formed as a single unit, where a first prism has a surface that reflects NIR light and passes visible light, and wherein a second prism has a surface that reflects visible light and passes NIR light.

19. The method as recited in claim 16, wherein the front lens group comprises two refractive lenses with negative refractive power, and wherein the visible light lens group and the NIR light lens group each includes, from an object side of the lens group to an image side of the lens group:
- a first refractive lens element with a positive refractive power;
- an aperture stop;
- a second refractive lens element with a negative refractive power;
- a third refractive lens element with a positive refractive power; and
- a fourth refractive lens element with a negative refractive power.

20. The method as recited in claim 16, wherein the refractive lens elements in the visible light lens group are different than the corresponding refractive lens elements in the NIR light lens group.

21. The method as recited in claim 16, wherein the refractive lens elements in the visible light lens group are the same as the corresponding refractive lens elements in the NIR light lens group.

22. The method as recited in claim 16, wherein at least one lens element in the visible light lens group is the same as its corresponding lens element in the NIR light lens group, and at least one other lens element in the visible light lens group is different than its corresponding lens element in the NIR light lens group.

23. The method as recited in claim 16,
- wherein the visible light sensor is a 4.4 mm diagonal visible light sensor, and wherein the visible light lens group in combination with the front lens group provides a 1.96 mm effective focal length, an F/number of F/2.0, and a 120 degree FOV at the visible light sensor; and wherein the NIR light sensor is a 3.6 mm diagonal NIR light sensor, and wherein the NIR light lens group in combination with the front lens group provides a 2.42 mm effective focal length, an F/number of F/1.8, and a 83.17 degree FOV at the NIR light sensor.

24. The method as recited in claim 16, wherein the visible light sensor is a 4.4 mm diagonal visible light sensor, and wherein the visible light lens group in combination with the front lens group provides a 2.0 mm effective focal length, an F/number of F/2.0, and a 118.9 degree FOV at the visible light sensor; and wherein the NIR light sensor is a 3.6 mm diagonal NIR light sensor, and wherein the NIR light lens group in combination with the front lens group provides a 1.95 mm effective focal length, an F/number of F/1.8, and a 101 degree FOV at the NIR light sensor.

25. A system comprising;

one or more processors;

a memory comprising program instructions; and one or more cameras, wherein at least one of the cameras includes an optical system that is configured to:
   receive visible and near-infrared (NIR) light from an object field at a front lens group that is configured to refract the visible and NIR light to a beam splitter;

wherein the beam splitter is configured to direct the visible light to a visible light lens group and directs the NIR light to a NIR light lens group;

wherein the visible light lens group is configured to refract the visible light to form a visible light image at a visible light sensor; and wherein the NIR light lens group is configured to refract the NIR light to form a NIR light image at a NIR light sensor;

wherein a field of view (FOV) of the visible light image formed by the visible light lens group at the visible light sensor is different than a FOV of the NIR light image formed by the NIR light lens group at the NIR light sensor; and wherein the program instructions are executable by the one or more processors to:
   obtain visible light images captured by the visible light sensor and the NIR light images captured by the NIR light sensor; and process the visible light images and the NIR light images to generate information about the object field, wherein the information includes depth information for the object field obtained from the NIR light images.

* * * * *